(12) United States Patent
Lu et al.

(10) Patent No.: US 12,092,850 B2
(45) Date of Patent: Sep. 17, 2024

(54) PATTERNED ANISOTROPIC FILMS AND OPTICAL ELEMENTS THEREWITH

(71) Applicant: META PLATFORMS TECHNOLOGIES, LLC, Menlo Park, CA (US)

(72) Inventors: Lu Lu, Kirkland, WA (US); Xiayu Feng, Kent, OH (US); Mengfei Wang, Seattle, WA (US); Hao Yu, Kent, OH (US); Ryan Li, Woodinville, WA (US); Yun-Han Lee, Redmond, WA (US); Junren Wang, Redmond, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 212 days.

(21) Appl. No.: 17/073,249

(22) Filed: Oct. 16, 2020

(65) Prior Publication Data
US 2021/0033770 A1 Feb. 4, 2021

Related U.S. Application Data

(63) Continuation-in-part of application No. 16/273,068, filed on Feb. 11, 2019, now Pat. No. 11,561,507.
(Continued)

(51) Int. Cl.
*G02B 5/32* (2006.01)
*G02B 5/20* (2006.01)
(Continued)

(52) U.S. Cl.
CPC .............. *G02B 5/32* (2013.01); *G02B 5/203* (2013.01); *G02B 5/3016* (2013.01);
(Continued)

(58) Field of Classification Search
CPC ........ G02B 5/32; G02B 5/203; G02B 5/3016; G03H 1/0248; G03H 1/0402;
(Continued)

(56) References Cited

U.S. PATENT DOCUMENTS 3,707,371 A 12/1972 Files et al.
3,953,212 A 4/1976 Miyano et al.
(Continued)

FOREIGN PATENT DOCUMENTS

CN 1728246 A 2/2006
CN 102005213 A 4/2011
(Continued)

OTHER PUBLICATIONS

Choi, H. Microstructure of a reflection holographic grating inscribed in an absorptive azopolymer film. Journal of the Korean Physical Society 67, 1630-1633 (2015). https://doi.org/10.3938/jkps.67.1630 (Year: 2015).*

(Continued)

*Primary Examiner* — Peter L Vajda
*Assistant Examiner* — Jayson D Cosgrove
(74) *Attorney, Agent, or Firm* — Morgan, Lewis & Bockius LLP

(57) ABSTRACT

A first layer of anisotropic material extends along a first plane and includes anisotropic components being parallel to a second plane non-parallel and non-perpendicular to the first plane. The anisotropic components are arranged in cycloidal or helical patterns. The cycloidal or helical patterns define one or more Bragg planes that are non-parallel and non-perpendicular to the first plane and either substantially parallel or substantially perpendicular to the second plane.

20 Claims, 28 Drawing Sheets

Related U.S. Application Data

(60) Provisional application No. 62/728,053, filed on Sep. 6, 2018, provisional application No. 62/659,104, filed on Apr. 17, 2018.

(51) Int. Cl.
  *G02B 5/30* (2006.01)
  *G03H 1/02* (2006.01)
  *G03H 1/04* (2006.01)

(52) U.S. Cl.
  CPC ......... *G03H 1/0248* (2013.01); *G03H 1/0402* (2013.01); *G03H 2001/0413* (2013.01); *G03H 2001/0439* (2013.01); *G03H 2260/12* (2013.01)

(58) Field of Classification Search
  CPC ... G03H 2001/0413; G03H 2001/0439; G03H 2260/12
  See application file for complete search history.

(56) References Cited

U.S. PATENT DOCUMENTS

| | | | |
|---|---|---|---|
| 3,953,303 | A | 4/1976 | Kamada et al. |
| 4,055,423 | A | 10/1977 | Bartolini et al. |
| 5,770,107 | A | 6/1998 | Hassall et al. |
| 6,280,884 | B1 | 8/2001 | Bjorklund et al. |
| 6,572,939 | B2 | 6/2003 | Kwon et al. |
| 6,721,076 | B2 | 4/2004 | King et al. |
| 7,319,550 | B2 | 1/2008 | Hayashi et al. |
| 9,360,708 | B2 | 6/2016 | Schadt et al. |
| 2004/0240012 | A1 | 12/2004 | Yasuda et al. |
| 2005/0140837 | A1 | 6/2005 | Crawford et al. |
| 2005/0227021 | A1 | 10/2005 | Harding et al. |
| 2005/0231774 | A1 | 10/2005 | Hayashi et al. |
| 2005/0233094 | A1 | 10/2005 | Sawatari et al. |
| 2006/0257586 | A1* | 11/2006 | Umeya .................. C09K 19/02 428/1.3 |
| 2008/0102378 | A1 | 5/2008 | Cole et al. |
| 2009/0225642 | A1* | 9/2009 | Tukker .................. G02B 3/14 |
| 2012/0147724 | A1 | 6/2012 | Natarajan et al. |
| 2012/0188467 | A1* | 7/2012 | Escuti .................. G02F 1/1347 349/1 |
| 2013/0331482 | A1 | 12/2013 | Tanabe et al. |
| 2014/0022615 | A1 | 1/2014 | Clemens et al. |
| 2014/0154428 | A1 | 6/2014 | Schadt et al. |
| 2015/0077700 | A1* | 3/2015 | De Sio .................. A61F 2/1635 351/159.03 |
| 2015/0178939 | A1 | 6/2015 | Bradski et al. |
| 2016/0033698 | A1* | 2/2016 | Escuti .................. G02F 1/1334 349/194 |
| 2017/0075189 | A1 | 3/2017 | Mao et al. |
| 2017/0090194 | A1 | 3/2017 | Hayes |
| 2018/0244922 | A1 | 8/2018 | Nagi |

FOREIGN PATENT DOCUMENTS

| | | |
|---|---|---|
| CN | 104090328 A | 10/2014 |
| CN | 104704406 B | 8/2017 |
| JP | S63161444 A | 7/1988 |
| JP | H11181127 A | 7/1999 |
| JP | 2004077899 A | 3/2004 |
| JP | 2005091939 A | 4/2005 |
| JP | 2005272532 A | 10/2005 |
| JP | WO2007125937 A1 | 9/2009 |
| JP | 2014146045 A | 8/2014 |
| JP | 2017090934 A | 5/2017 |
| JP | 2017102258 A | 6/2017 |
| JP | 2017146523 A | 8/2017 |
| KR | 100222355 B1 | 10/1999 |
| KR | 20160114674 A | 10/2016 |
| WO | 0196962 A2 | 12/2001 |
| WO | 2005014756 A1 | 2/2005 |
| WO | 2014017497 A1 | 1/2014 |
| WO | 2014030587 A1 | 2/2014 |
| WO | 2014136889 A1 | 9/2014 |

OTHER PUBLICATIONS

Blanche P.A., et al., "Polarization Holography Receals the Nature of the Grating in Polymers Containing Azo-dye," Optics Communications, 2000, vol. 185 (1-3), pp. 1-12.

Broer D.J., et al., "In-Situ Photopolymerization of Oriented Liquid-Crystalline acrylates, 3 Influence of a Lateral Methyl Substituent on Monomer and Oriented Polymer Network Properties of a Mesogenic Diacrylate," Macromolecular Chemistry and Physics, Dec. 1989, vol. 190 (12), pp. 3201-3215.

Choi H., "Microstructure of Reflection Holographic Grating Inscribed in an Absorptive Azopolymer Film," Department of Physics, Soongsil University, Seoul 156-743, Korea , pp. 1-12.

Crawford G.P., "Liquid-crystal Diffraction Gratings Using Polarization Holography Alignment Techniques," Journal of Applied Physics, 2005, vol. 98, pp. 123102-1-123102-10.

Du T., et al. "Complex Nanoscale-Ordered Liquid Crystal Polymer Film for High Transmittance Holographic Polarizer," Advanced Materials, Nov. 25, 2015, vol. Issue 44, pp. 7191-7195.

Escuti M.J., et al., "Simplified Spectropolarimetry using Reactive Mesogen Polarization Gratings," SPIE Proceedings, Imaging Spectrometry XI, 2006, vol. 6302, 13 pages.

Gao K., et al., "High-efficiency Large-angle Pancharatnam Phase Deflector Based on Dual-twist Design," Liquid Crystal Institute and Chemical Physics Interdisciplinary Program, Kent State University, 2017, pp. 1-9.

Honma M., et al., "Twisted Nematic Liquid Crystal Polarization Grating With the Handedness Conservation of a Circularly Polarized State," Optics Express (OSA), Jul. 30, 2012, vol. 20 (16), pp. 18449-18458.

Ishiguro M., et al., "Bragg-Type Polarization Gratings Formed in Thick Polymer Films Containing Azobenzene and Tolane Moieties," Langmuir, 2007, vol. 23 (1), pp. 332-338.

Kakichashvili D., "Method of Recording Phase Polarization Holograms," Soviet Journal of Quantum Electronics, Dec. 1974, vol. 4 (6), 5 pages.

Kawatsuki N., et al., "Formation of Polarization Gratings in Photocrosslinkable Polymer Liquid Crystals by Polarization Holography," Advanced Materials, 2003, vol. 15 (12), pp. 991-994.

Kim J., et al., "Wide-angle, Nonmechanical Beam Steering Using Thin Liquid Crystal Polarization Gratings," Proceedings of SPIE—The International Society for Optical Engineering, Aug. 26, 2008, vol. 7093, 12 pages.

Lin S.H., et al., "Volume Polarization Holographic Recording in Thick Phenanthrenequinone-Doped Poly(methyl methacrylate) Photopolymer," Optics Letters (OSA), Aug. 15, 2011, vol. 36 (16), pp. 3039-3041.

Lin S.H., et al., "Volume Polarization Holographic Recording in Thick Photopolymer for Optical Memory," Optics Express, Jun. 16, 2014, vol. 22 (12), 14 pages.

Nikolova L., et al., "Polarization Reflection Holographic Gratings in Azobenzene-containing Gelatine Films," Optics Letters (OSA), Jan. 15, 2002, vol. 27 (2), pp. 92-94.

Ono H., et al., "Multiplex Diffraction from Functionalized Polymer Liquid Crystals And Polarization Conversion," Applied Optics (OSA), Sep. 22, 2003, vol. 11 (19), 6 pages.

Popov P., et al., "Chiral Nematic Liquid Crystal Microlenses," Scientific Reports (Nature) Scientific Reports, 2017, vol. 7, 9 pages.

Rosenhauer R., et al., "Generation of Anisotropic Emission by Light-Induced Orientation of Liquid Crystalline Polymers," Macromolecules, 2011, vol. 44, pp. 1438-1449.

Sakhno O., et al., "Fabrication and Performance of Efficient Thin Circular Polarization Gratings with Bragg Properties using Bulk Photo-Alignment of a Liquid Crystalline Polymer," Applied Physics B, 2018, vol. 124 (52), 10 pages.

Schadt M., "Liquid Crystal Displays, LC-Materials and LPP Photo-Alignment," Molecular Crystals and Liquid Crystals, 2017, vol. 647 (1), pp. 253-268.

(56) References Cited

OTHER PUBLICATIONS

Stracke A., et al., "Gain Effects in Optical Storage: Thermal Induction of a Surface Relief Grating in a Smectic Liquid Crystal," Advanced Material, vol. 12 (4), pp. 282-285.
Todorov T., et al. "Polarization Holographic Gratings in Side-chain Azobenzene Polyesters with Linear and Circular Photoanisotropy," Applied Optics (OSA), 1996, vol. 35 (20), pp. 3835-3840.
Todorov T., et al., "Polarization holography. 1: A New High-efficiency Organic Material With Reversible Photoinduced Irefringence," Applied Optics (OSA), Dec. 1, 1984, vol. 23 (23), pp. 4309-4312.
Todorov T., et al., "Polarization Holography. 2: Polarization Holographic Gratings in Photoanisotropic Materials with and without Intrinsic Birefringence," Applied Optics (OSA), 1984, vol. 23 (24), pp. 4588-4591.
Weng Y., et al., "Polarization Volume Grating with High Efficiency and Large Diffraction Angle," Optics Express (OSA), Aug. 8, 2016, vol. 24 (16), 14 pages.
Yaroshchuk O., et al., "Photoalignment of Liquid Crystals: Basics and Current Trends," Journal of Materials Chemistry, 2012, vol. 22, 15 pages.
Yaroshchuk, Office Action, U.S. Appl. No. 16/273,068, Jul. 21, 2021, 15 pgs.
Emoto A., et al., "Large Birefringence and Polarization Holographic Gratings Formed in Photocross-Linkable Liquid Crystals Comprising Bistolane Mesogenic Side Groups," Journal of Applied Physics, Oct. 7, 2009, vol. 106, No. 073505, 6 pages.
Final Office Action mailed May 24, 2022 for U.S. Appl. No. 16/273,068, filed Feb. 11, 2019, 12 pages.
Machine Transaltion of JP2005-091939, 2005, 22 pages.
Machine Translation of JP63-161444, 1988, 8 pages.
Machine Translation of WO2014/017497, 2014, 21 pages.
Non-Final Office Action mailed Feb. 24, 2022 for U.S. Appl. No. 16/443,506, filed Jun. 17, 2019, 18 pages.
Non-Final Office Action mailed Jan. 28, 2022 for U.S. Appl. No. 16/273,068, filed Feb. 11, 2019, 6 pages.
Office Action mailed Mar. 23, 2022 for Chinese Application No. 201910304723.3, 15 pages.
Sakhno O., et al., "Bragg Polarization Gratings Used as Switchable Elements in AR/VR Holographic Displays," Proceedings of SPIE, May 21, 2018, vol. 10676, No. 106760F, 18 pages.
Schmitt K., et al., "Pulsed Laser Induced Holographic Gratings for Waveguides Made of Cross-Linkable Polymers", Applied Optics, Jul. 20, 1997, vol. 36, No. 21, pp. 5078-5082.
Final Office Action mailed Jul. 13, 2022 for U.S. Appl. No. 16/443,506, filed Jun. 17, 2019, 21 pages.
Machine Translation of JP2017-146523, 2017, 38 pages.
Non-Final Office Action mailed Feb. 3, 2023 for U.S. Appl. No. 17/214,736, filed Mar. 26, 2021, 8 pages.
Non-Final Office Action mailed Jan. 3, 2023 for U.S. Appl. No. 16/443,506, filed Jun. 17, 2019, 18 pages.
Notice of Allowance mailed Sep. 14, 2022 for U.S. Appl. No. 16/273,068, filed Feb. 11, 2019, 9 pages.
Notice of Allowance mailed Sep. 26, 2022 for U.S. Appl. No. 16/273,068, filed Feb. 11, 2019, 7 pages.
Emoto A., et al., "Polarization Conversion in Polarization Holographic Gratings Formed in Photocrosslinkable Polymer Liquid Crystals," The AZo Journal of Materials Online (AZojomo), Jun. 1, 2006, 12 pages.
Final Office Action mailed May 11, 2023 for U.S. Appl. No. 16/443,506, filed Jun. 17, 2019, 15 pages.
Final Office Action mailed Aug. 23, 2023 for U.S. Appl. No. 17/214,736, filed Mar. 26, 2021, 10 pages.
Kawatsuki N., et al., "Holographic Recording in a Photo-Cross-Linkable Liquid Crystalline Copolymer Using a 325 nm Laser With Various Polarizations," Reactive and Functional Polymers, 2010, vol. 70, pp. 980-985.
Non-Final Office Action mailed Jun. 6, 2023 for U.S. Appl. No. 18/101,110, filed Jan. 24, 2023, 6 pages.

* cited by examiner

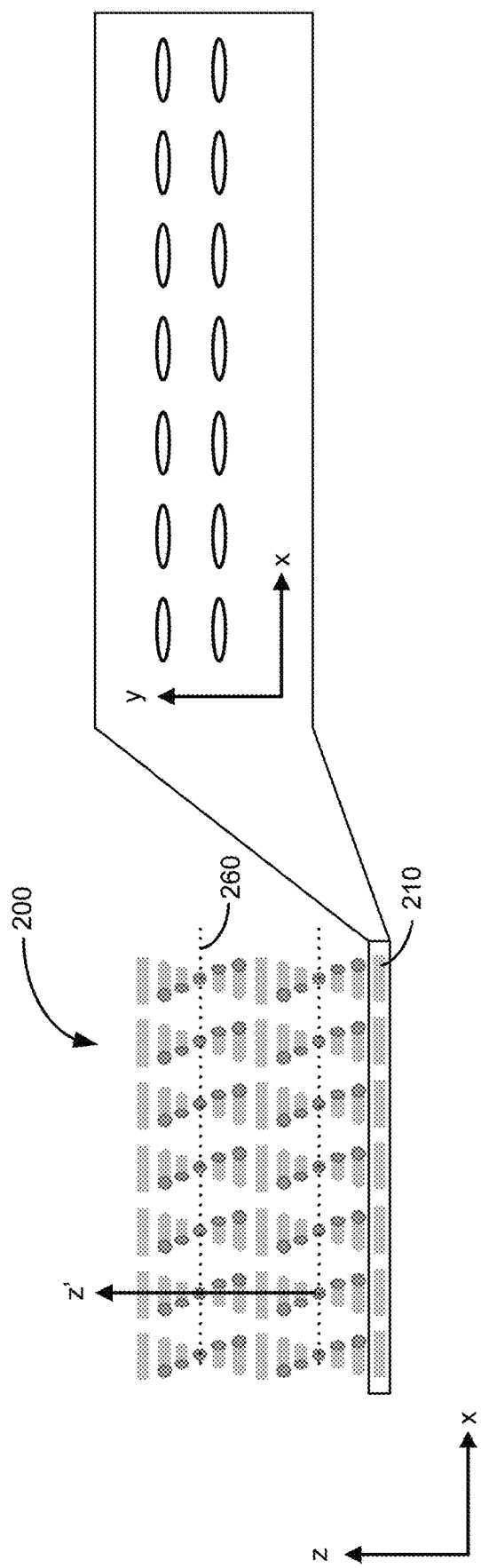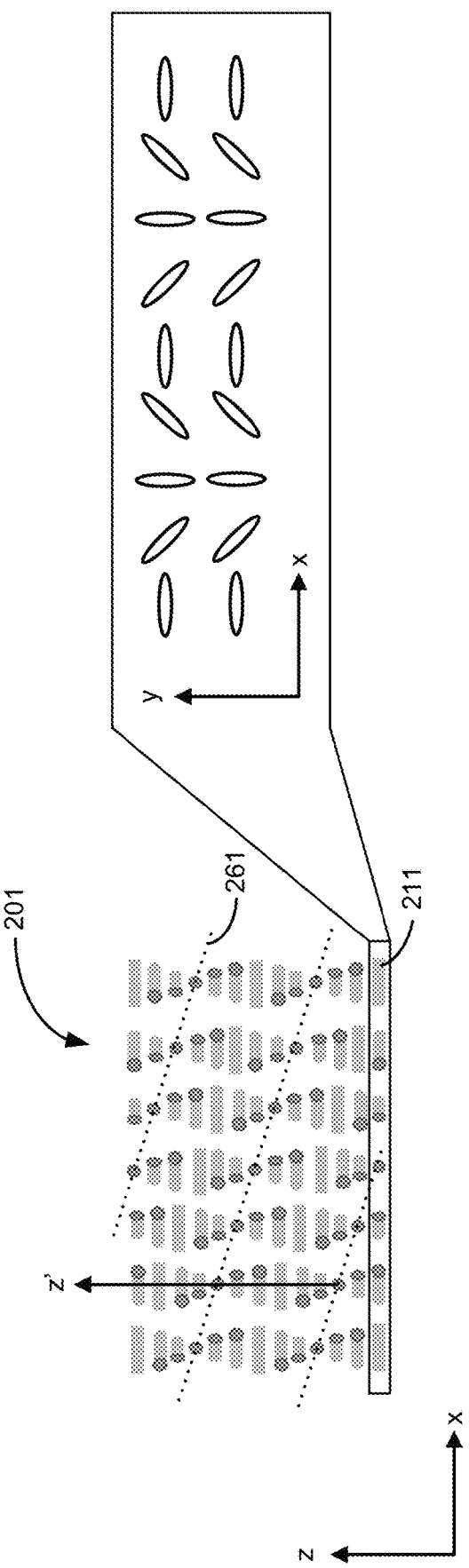
Figure 2A
Figure 2B

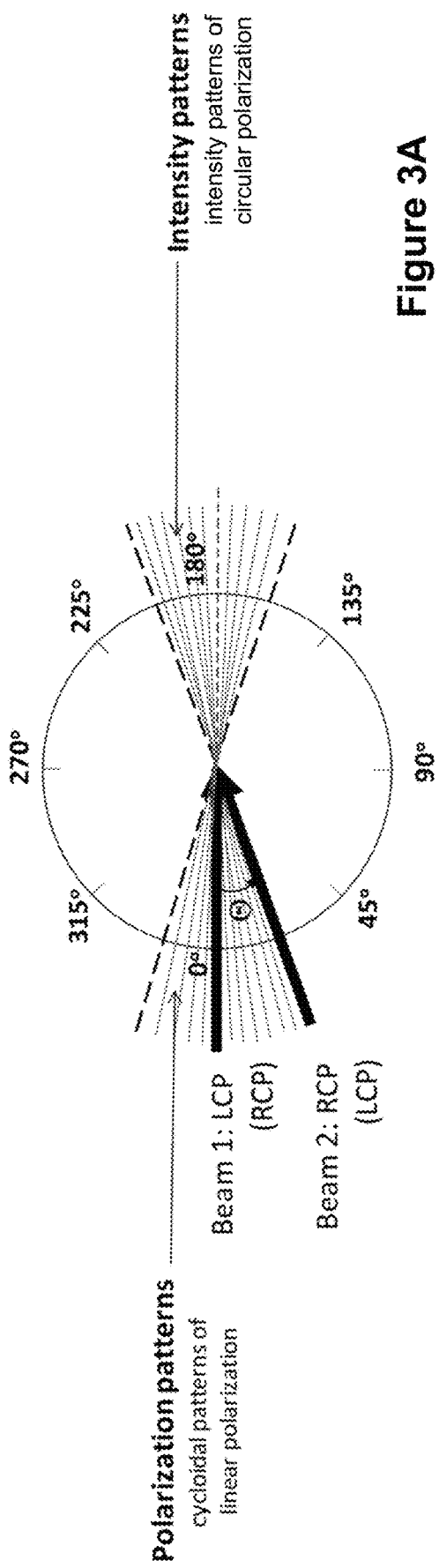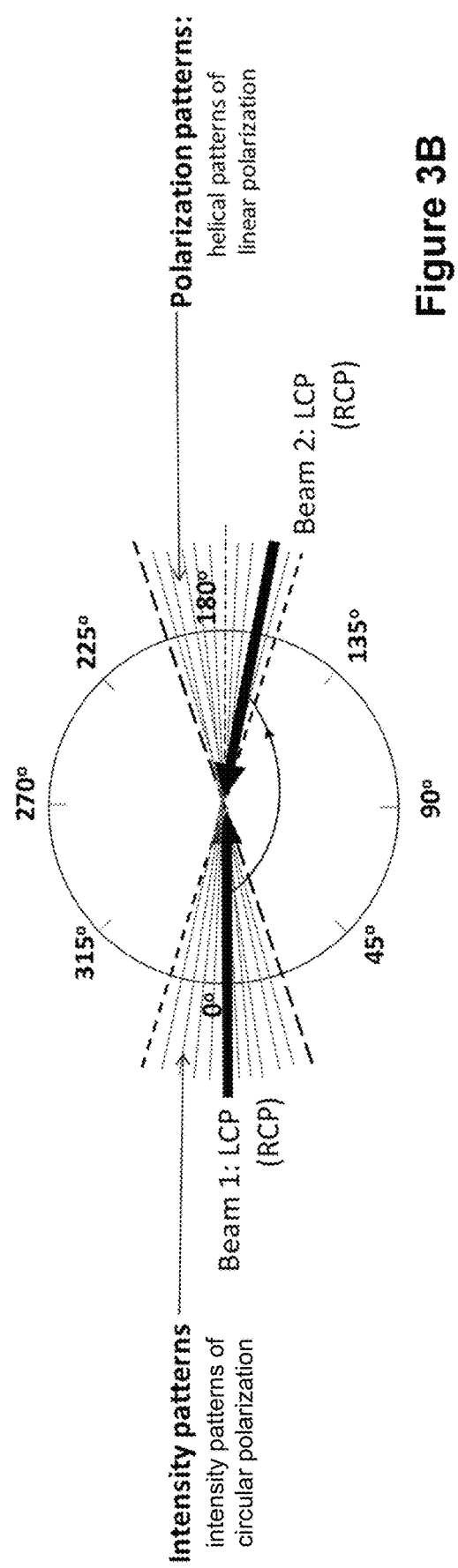
Figure 3A
Figure 3B

PATTERNED ANISOTROPIC FILMS AND OPTICAL ELEMENTS THEREWITH

RELATED APPLICATIONS

This application is a continuation-in-part of U.S. patent application Ser. No. 16/273,068, filed Feb. 11, 2019, which claims the benefit of, and priority to, U.S. Provisional Patent Application Ser. No. 62/659,104, filed Apr. 17, 2018 and U.S. Provisional Patent Application Ser. No. 62/728,053, filed Sep. 6, 2018, all of which are incorporated by reference herein in their entireties.

TECHNICAL FIELD

This relates generally to optical elements, and in particular to anisotropic optical elements.

BACKGROUND

Polarization volume gratings have gained increasing interest for applications in optics, such as beam steering devices, waveguides, and display technologies.

Conventionally, polarization volume gratings were made by patterned alignment of liquid crystals (LC) or reactive mesogens (RM) as their polymerizable version using a photoalignment layer. In this case, the photoalignment layer includes elongated anisotropically absorbing molecular units (small molecules or fragments of polymeric molecules) arranged in a particular periodic pattern usually produced by holographic technique, and liquid crystal is deposited on the photoalignment layer so that the liquid crystal molecules are aligned along the local alignment direction of said molecular units in photoaligning layer. However, when the photoalignment layer is used, liquid crystals can be arranged in only certain three-dimensional configurations (e.g., liquid crystals having helical or cycloidal patterns perpendicular to a plane defined by the photoalignment layer).

SUMMARY

Polarization volume holographic (PVH) elements having anisotropic components (e.g., liquid crystals) arranged in helical or cycloidal patterns that are slanted with respect to a plane defined by the PVH element have properties that are not available for PVH elements made by conventional methods. In particular, a PVH element with anisotropic components arranged in slanted helical or cycloidal patterns have a high optical efficiency, high polarization-, angular-, and wavelength selectivity, and low polarization deviation. Such properties make them desirable for a variety of optical applications.

In accordance with some embodiments, a first layer of anisotropic material extends along a first plane and includes anisotropic components being parallel to a second plane non-parallel and non-perpendicular to the first plane. The anisotropic components are arranged in cycloidal or helical patterns. The cycloidal or helical patterns define one or more Bragg planes that are non-parallel and non-perpendicular to the first plane and either substantially parallel or substantially perpendicular to the second plane.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 2A illustrates a non-slanted polarization volume grating obtained by alignment of liquid crystal with a photoaligning layer.

FIG. 2B illustrates a slanted polarization volume grating obtained by alignment of liquid crystal with a photoaligning layer with holographically induced cycloidal alignment patterns.

FIG. 3A is a schematic representation of the interference modes of two coherent beams having orthogonal circular polarizations depending on the convergence angle and polarization state of the beams.

FIG. 3B is a schematic representation of the interference modes of two coherent beams having the same circular polarization depending on the convergence angle and polarization state of the beams.

Figure 1:
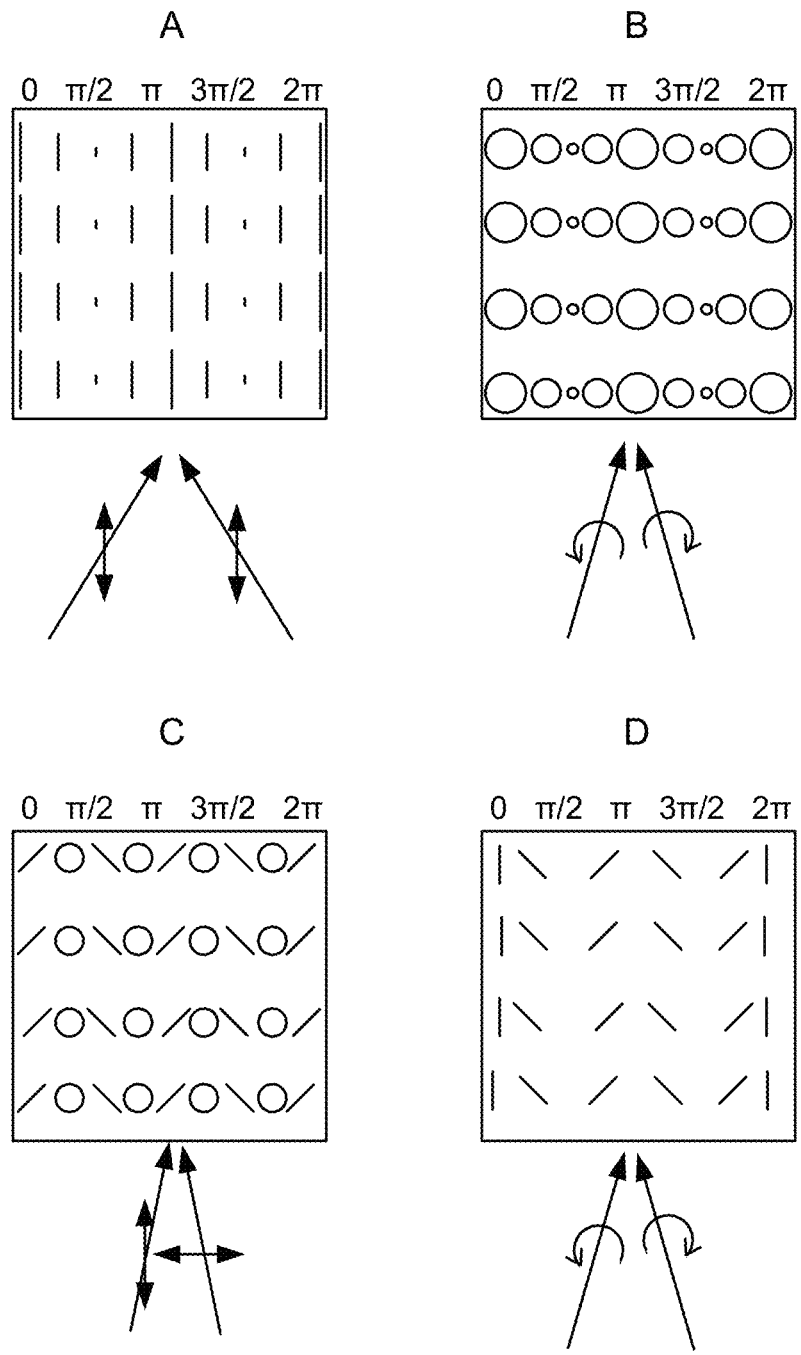
FIG. 1 illustrates interference patterns formed on a two-dimensional plane by polarized light.

These figures are not drawn to scale unless indicated otherwise.

DETAILED DESCRIPTION

The present disclosure describes method for making spatial periodic orientational patterns, methods and devices for making optical elements from an optically recordable and polarization sensitive medium, which includes photocrosslinkable and photoalignable molecules or molecular fragments. The method includes concurrently illuminating the optically recordable medium with two coherent beams of light having same or different polarization properties. In some embodiments, a polarization volume holographic element is made by such methods and devices.

Holographic volume gratings (HVG) are diffractive elements including a periodic pattern of absorption or phase stretching throughout the entire volume of the element. Such a grating formed by interference pattern of light in an optical recordable material. Typically, such materials are optically isotropic photo-polymeric compositions in which the induced contrast of refractive index achieves 0.03-0.04. The diffraction efficiency of these gratings can be close to 100% if the Bragg condition is met, which in case of recording beams and testing beam with flat wave fronts has the form:

$$2N\Lambda \sin(\theta+\varphi)=\lambda_B$$

where N is a positive integer, $\Lambda$ is the grating period, $\theta$ is the incident angle of the testing beam (the angle between the incident beam and the normal of the entrance surface, n, $\varphi$ is the angle between the normal and the grating vector $k_G$, and $\lambda_B$ is the wavelength of diffracted light. The light which does not match Bragg condition will pass through the grating without diffraction. This property determines high selectivity of wavelength, wave front and incidence angle of HVG, and large information capacity. Based on these features, the following applications of HVG has been developed: optical correlators, spectroscopy, distributed feedback lasers, fiber Bragg gratings, high density holographic data storage.

Achieving of the Bragg regime of a diffraction grating is usually determined by Klein parameter Q:

$$Q = \frac{2\pi\lambda d}{n\Lambda^2},$$

where d is a thickness of the grating, $\lambda$ is the wavelength of light, $\Lambda$ is the grating period, and n is the refractive index of the recording medium. As a rule, Bragg property is achieved if Q>>1, typically, Q≥10. Thus, to meet Bragg condition, thickness of diffraction grating should be higher than some value determined by parameters of grating, recording medium and light. Because of this, HVG is also called Bragg grating and thick grating. On the contrary, the grating with Q<1 is usually considered as a thin one, which typically demonstrates many diffraction orders (Raman-Nath diffraction regime).

When the above gratings are recorded in polarization insensitive materials, the resulting gratings are also polarization insensitive. Radically new properties can be achieved when recording gratings in the materials sensitive to polarization of light, which show effect of photoinduced anisotropy. In contrast to the above-mentioned photopolymers sensitive only to the intensity of recording light, these materials are sensitive to both light intensity and polarization. Under action of linearly polarized light, the anisotropic photosensitive units of these materials arrange in some preferential direction, usually perpendicular or parallel to polarization direction of light. This in turn results in optical birefringence and dichroism. Exposing these materials by interference pattern results in periodic orientational patterns having similar features. Noteworthy that despite the highest efficiency of photoalignment for linearly polarized light, this effect can also be observed for partially polarized and elliptically polarized light of a suitable spectrum.

Interference patterns for the case of two collimated beams of polarized light propagating in similar directions are presented in FIG. 1. In case of same linear or circular polarization of the beams, their interference results in intensity patterns while keeping polarization of interfering beams (cases A and B). The gratings recorded by these light patterns are usually called intensity gratings. In case of orthogonal linear polarizations or orthogonal circular polarizations of the beams, intensity modulation does not occur, but light polarization is patterned (cases C and D). These types of patterns do not induce grating in polarization insensitive materials. At the same time, in polarization sensitive materials, the patterns of light polarization induce modulation of optical axis due to photoalignment of anisotropic photosensitive units. The gratings induced by polarization patterns are usually called polarization gratings.

Commonly, to create these gratings, geometry D in FIG. 1 is used, which provides pure modulation of linear polarization. These patterns are called cycloidal. Alignment of photosensitive units along or perpendicular to the local polarization of light will create similar orientational configuration which is also called herein cycloidal. The grating holographically inscribed in the layer of polarization sensitive material can be further enhanced by coating layer of liquid crystal (LC) or reactive mesogen as its polymerizable counterpart above the said layer with the recorded grating. LC mimics orientational patterns in the first layer and thus enhances overall thickness of the grating and thus grating efficiency. In the latter case, irradiated layer of polarization sensitive material plays a role of photoalignment layer for LC. This alignment procedure is known as a surface mediated photoalignment.

The polarization-sensitive counterparts of holographic volume gratings, so named polarization volume gratings (PVG) or more generally, polarization volume holograms (PVH) (e.g., PVH 200 and PVH 201 in FIGS. 2A and 2B, respectively), are usually created by the said photoalignment method (e.g., by using photoalignment layers 210 and 211 in FIGS. 2A and 2B, respectively). In case of chiral nematic LC, uniformly aligned by aligning substrates, Grandjean (planar) structure can be achieved, which can operate as an optical grating. The fringes of the formed gratings considered as the planes (e.g., Bragg planes 260 in FIG. 2A) with the same refractive index are parallel to the layer of recordable material, see FIG. 2A. If thickness of LC layer is set high enough and period of grating (half pitch of LC helix), the condition Q≥10 is met and the grating can be considered as a thick one. To realize gratings with slanted fringes (e.g., Bragg planes 261 in FIG. 2B), chiral nematic LC is usually aligned on the photoaligning layer in which cycloidal patterns are recorded. In this case, tilt of the grating fringes occurs due to superposition of a cycloidal structure imposed by photoalignment layer and a helical structure intrinsic for cholesteric LCs, FIG. 2B. However, preparation procedure of polarization volume gratings based on surface mediated photoalignment of LCs has several shortcomings. First of all, the resulted gratings provide a limited number of alignment patterns and thus a limited set of optical responses. For example, LC molecules align in these gratings parallel to alignment surface so that chirality of LCs is needed to obtain slanted gratings. Furthermore, preparation procedure of these gratings is rather complicated and includes rather long chain of technological steps.

The other method to manufacture PVGs can be based on phenomenon of bulk mediated photoalignment, when photoalignment of photosensitive units occurs in a volume of optically recordable and polarization sensitive material. When irradiation is provided with holographically created polarization patterns of light, the alignment patterns occur immediately in the layer of optically recordable material. To achieve Bragg diffraction typical for volume gratings, this layer should be thick enough to attain Q>>1.

To analyze orientational patterns created by two interfering beams in a real three-dimensional (3D) space, 3D polarization patterns need to be considered, which might be created by these beams. According to theory, interference pattern of polarized light depends on polarization and convergence angle of interfering beams. In case of orthogonal circular polarizations of the beams the best conditions for the patterns of linear polarization are created when angle Θ between the beams is small) (Θ≤40°). As the angle Θ increases, the resultant pattern starts to pick up more and more intensity variation and polarization ellipticity. The system picks up the ellipticity in a quadratic way, meaning it changes rather rapidly from linear to circular when Θ passes 45°. When the angle further increases, the intensity of circularly polarized light becomes modulated and the highest contrast of this periodic circularly polarized intensity pattern is reached when Θ=180°±20°, see FIG. 3A. When circular polarizations of interfering beams are the same, the situation is reversed. In case of small angle between the beams the conditions for high-contrast interference pattern of circular polarization are met, while the case Θ=180°±20° corresponds to highly efficient patterns of linear polarization, FIG. 3B.

Consider now characteristics of polarization patterns. The patterns created by two plane waves of coherent light in two geometries mentioned above are presented in FIG. 4. The following features can be distinguished.

(1) The generated pattern structures are one-dimensional. The lines of same polarization (fringes of light field) are aligned along bisectrix of the angle between the interfering beams. This means that polarization gratings recorded by these light patterns will also be one-dimensional with the same symmetry that distinguishes them from the gratings obtained by surface alignment of liquid crystals, which have more complicated structure and are essentially three-dimensional.

(2) The structure of polarization patterns depends on geometry. In case of a small angle between the beams and their orthogonal polarizations, the light polarization axis rotates around bisectrix of the angle and simultaneously translates in perpendicular direction in the incidence plane of the beams. Since this movement obeys cycloidal law, the corresponding structure is usually called cycloidal. On the other hand, in case the angle between the beams is close to 180°, the light polarization axis rotates around the axis perpendicular to the bisectrix of the angle with translation in the same direction thus creating a helical structure.

Figure 4:
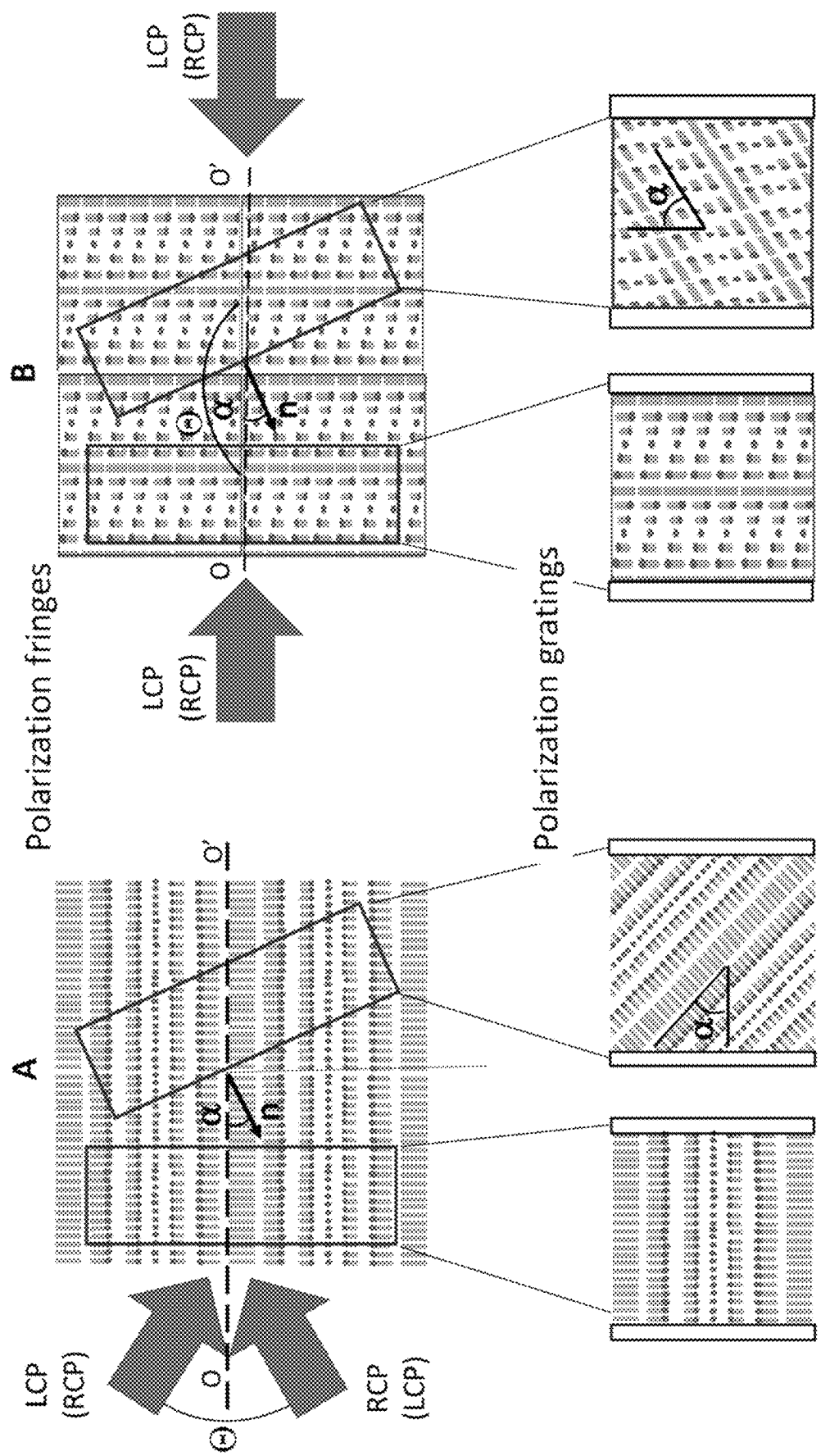
FIG. 4 illustrates patterns of linear polarizations generated by two plane waves of coherent light with circular polarization (upper row) and orientational structures induced in layer of optically recordable polarization sensitive material (bottom row). A: the two plane waves have orthogonal circular polarizations. B: the two plane waves have the same circular polarization.

The layer of optically recordable material placed in intersection area of interfering beams cuts out part of interference pattern, which induce corresponding pattern of polarization grating. FIG. 4 shows that orientation of the grating pattern in the layer depends on orientation of this layer in interference field during recording process and can be characterized by angle α varied in full range 0-360 degrees. It is evident that in contrast to structures created by aligned liquid crystals, which may combine cycloidal and helical order (see FIG. 2B), the structures created by bulk mediated holographic alignment may be either cycloidal or helical. The most efficient photoalignment of photosensitive units occurs in case of patterns of linear polarization, which are created in case of Θ≤40° (orthogonal circular polarizations of recording beams) or Θ=180°±20° (same circular polarization). However, photoalignment effects occur even in case of elliptically polarized light with pronounced ellipticity so that the range of angles Θ acceptable for creation of orientational patterns in polarization sensitive recordable materials can be essentially broader; it can be considered as Θ≤90° and Θ=180°±45° in case of orthogonal and same polarizations of the recording beams, respectively.

Figure 5A:
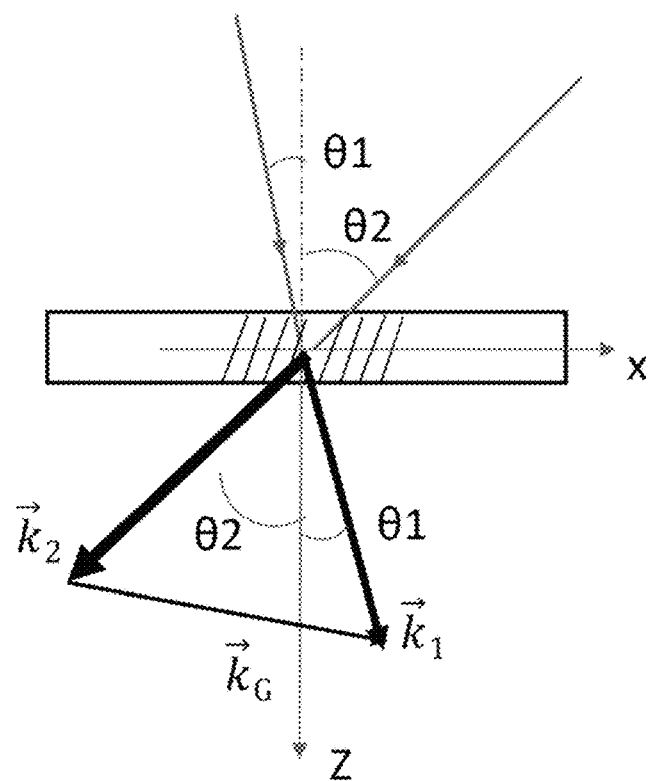
FIG. 5A illustrates geometries for recording polarization volume gratings with beams impinging upon the recording material from the same side.

From practical viewpoint it is usually convenient to associate coordinate system with the recordable layer and consider interference patterns in terms of incident angles of the interfering beams. In this case, grating parameters for different exposure geometries can be estimated based on a theoretical model. For two circularly polarized plane waves with wave vectors $k_1$ and $k_2$ propagating in an x-z plane toward the same side of the optically recordable medium and impinge on the surface of this medium under angles θ1 and θ2, as shown in FIG. 5A, the interference equations can be described as follows:

$$k_1 = (\sin\theta_1, 0, \cos\theta_1) \quad k_2 = (\sin\theta_2, 0, \cos\theta_2)$$

$$E_{1,local} = (1, , i, 0) \quad E_{2,local} = (1, -i, 0) \text{ or } (1, i, 0)$$

$$E_1 = (\cos\theta_1, i, -\sin\theta_1) \quad E_2 = (\cos\theta_2, -i, -\sin\theta_2) \text{ or } (\cos\theta_2, i, -\sin\theta_2)$$

Here $E_{1,local}$ and $E_{2,local}$ are the electric fields of light in the coordinates associated with ray directions $k_1$ and $k_2$, while $E_1$ and $E_2$ are the electric fields represented in global coordinate system associated with holographic layer. The formulas above show that electric field vectors $E_{1,local}$ ($E_1$) and $E_{2,local}$ ($E_2$) depend on handedness of circular polarization. The angles θ counted from surface normal direction are positive for counterclockwise rotation and negative for clockwise rotation. Then, the total electric field $E_{total}$ and the intensity I can be described with the following equations:

$$E_{total} = E_1 e^{i\frac{2\pi}{\lambda}(x\sin\theta_1 + z\cos\theta_1)} + E_2 e^{i\frac{2\pi}{\lambda}(x\sin\theta_2 + z\cos\theta_2)}$$

$$I = E_1 E_1^* + E_2 E_2^* + E_1 E_2^* e^{i\frac{2\pi}{\lambda}[x(\sin\theta_1 - \sin\theta_2) + z(\cos\theta_1 - \cos\theta_2)]} + E_2 E_1^* e^{i\frac{2\pi}{\lambda}[x(-\sin\theta_1 + \sin\theta_2) + z(-\cos\theta_1 + \cos\theta_2)]}$$

where $E_1 E_2^* = E_2 E_1^* = \mp 1 + \cos\theta_1\cos\theta_2 + \sin\theta_1\sin\theta_2 = \mp 1 + \cos(\theta_1 - \theta_2)$ $$I = E_1 E_1^* + E_2 E_2^* + 2[\cos(\theta_1 - \theta_2) \mp 1]$$

$$\cos\left(\frac{2\pi}{\lambda}[x(\sin\theta_1 - \sin\theta_2) + z(\cos\theta_1 - \cos\theta_2)]\right) = 2 + 2 +$$

$$2[\cos(\theta_1 - \theta_2) \mp 1]\cos\left[\frac{2\pi}{\lambda}[x(\sin\theta_1 - \sin\theta_2) + z(\cos\theta_1 - \cos\theta_2)]\right] =$$

$$4 + 2[\cos(\theta_1 - \theta_2) \mp 1]\cos\left(\frac{2\pi}{\lambda}[x(\sin\theta_1 - \sin\theta_2) + z(\cos\theta_1 - \cos\theta_2)]\right)$$

From these equations, the maximum and minimum intensity, $I_{max}$ and $I_{min}$, and the visibility of the intensity fringes are as follows:

$$I_{min\ or\ max} = 4 + 2\cos(\theta_1 - \theta_2) \mp 2$$

$$I_{max\ or\ min} = 4 + 2\cos(\theta_1 - \theta_2) \pm 2$$

Intensity fringe visibility $$V_{intensity} = \frac{I_{min} - I_{max}}{I_{min} + I_{max}} = \frac{1 \mp \cos(\theta_1 - \theta_2)}{2}$$

The plus sign in the last formula corresponds to same circular polarization of interfering beams, while the minus sign corresponds to the orthogonal circular polarizations of the beams. The parameter $V_{intensity}$ shows how close the induced grating is to the ideal polarization grating ($V_{intensity}=0$) or to the ideal intensity grating ($V_{intensity}=1$).

Figure 5B:
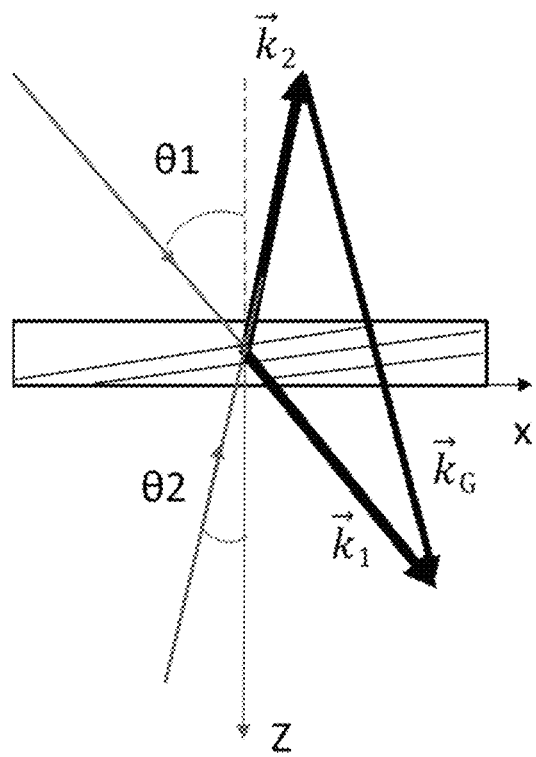
FIG. 5B illustrates geometries for recording polarization volume gratings with beams impinging upon the recording material from opposite sides, where $k_1$ and $k_2$ are wave vectors of interfering beams, and $k_G$ is a grating vector.

Despite of unidimensional nature, the slanted gratings of this type show periodicity in both x and z directions associated with the film (FIGS. 5A and 5B). The fringe periods in the x direction and in the z direction, $T_x$ and $T_z$, and the slope angle of fringes α (the angle between the normal of the entrance surface and fringes direction) are as follows:

$$T_x = \left|\frac{\lambda}{\sin\theta_1 - \sin\theta_2}\right|$$

$$T_z = \left|\frac{\lambda}{\cos\theta_1 - \cos\theta_2}\right|$$

$$\tan\alpha = T_x / T_z$$

For example, when λ=360 nm, $\theta_1=5°$ and angle $\theta_2=-45°$ (FIG. 5C, case B), $T_x=0.46$ μm, $T_z=1.24$ μm, α=20° and $V_{intensity}=0.17$. Since the angle between the interfering beams is relatively large (Θ=50°) the visibility parameter is noticeable. The calculations for $\theta_1=15°$ and angle $\theta_2=45°$ (FIG. 5C, case A) give $T_x=0.8$ μm, $T_z=1.38$ μm, and $V_{intensity}=0.07$ are generated. The inclination angle of the fringes is ~30°. The low value of $V_{intensity}$ means that interference fringes are almost ideal polarization patterns. This agrees well with relatively small angle between the beams Θ=30°.

Figure 5C:
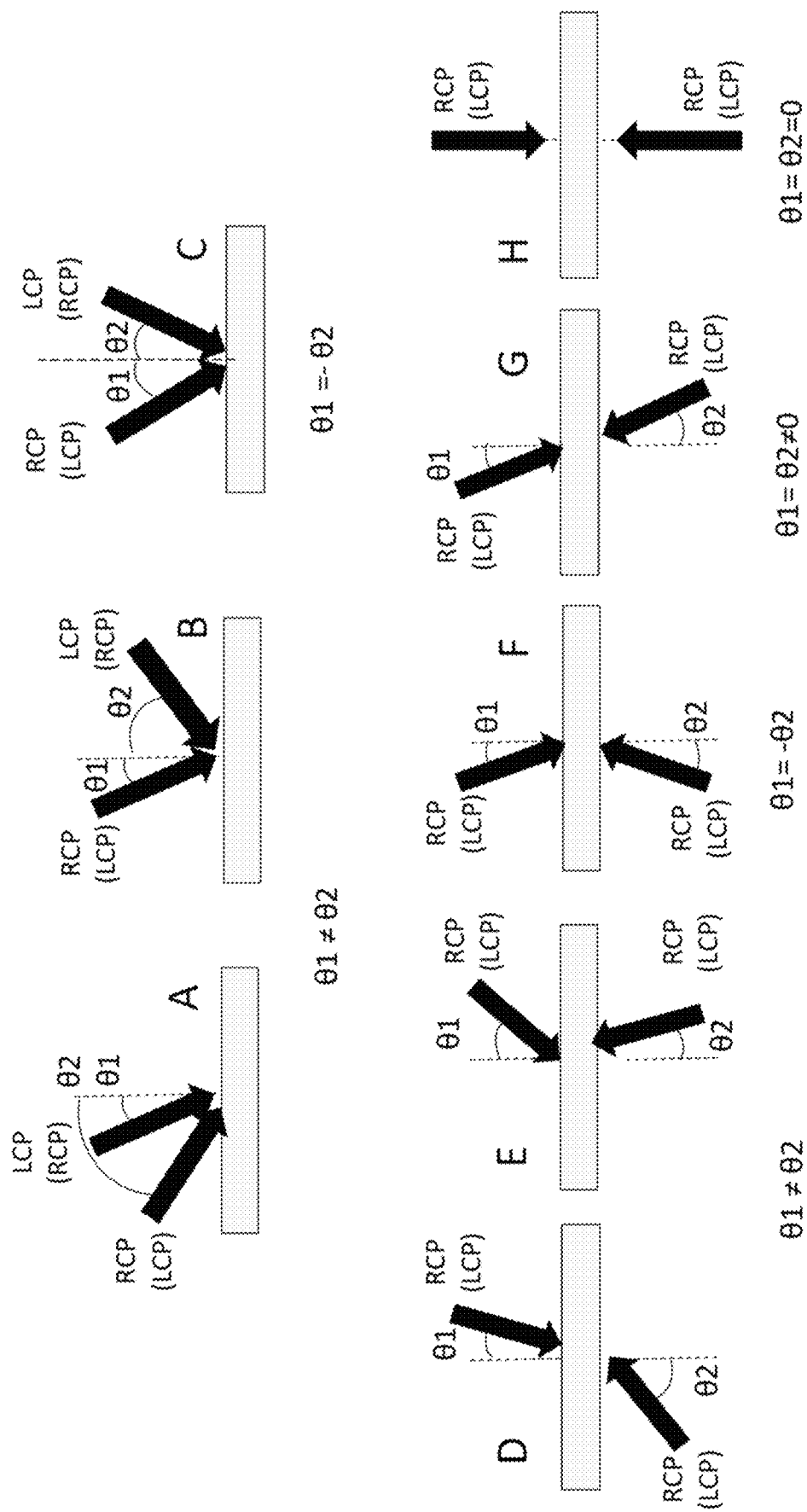
FIG. 5C illustrates example geometries for recording polarization volume gratings with two beams.

When $\theta_1=-\theta_2$, as shown by FIG. 5C, case C, $T_x$, $T_z$, and $V_{intensity}$ are as follows:

$$T_x = \lambda/2 \sin\theta$$

$$T_z \to \infty$$

$$V_{intensity} = 0$$

$$\alpha = 0.$$

Thus, a polarization grating with a grating vector in the x-direction is formed (e.g., the fringes are perpendicular to the surface of the optically recordable medium).

For two beams propagating in an x-z plane toward the opposite sides of the optically recordable medium and impinging the opposite surfaces of the recording medium under angles $\theta_1$ and $\theta_2$ as shown in FIG. 3B, the visibility parameter is as follows:

$$V_{intensity} = \frac{1 \mp \cos(\theta_1 - \theta_2)}{2}$$

The plus sign in this formula corresponds to orthogonal circular polarizations of interfering beams, while the minus sign corresponds to the same circular polarizations of the beams. Same as above, the parameter $V_{intensity}$ shows how close the induced grating is to the ideal intensity grating ($V_{intensity}=1$) or ideal polarization grating ($V_{intensity}=0$).

The fringe periods in the x direction and in the z direction, $T_x$ and $T_z$, and the slope angle of fringes α are as follows:

$$T_x = \left|\frac{\lambda}{\sin\theta_1 + \sin\theta_2}\right|$$

$$T_z = \left|\frac{\lambda}{\cos\theta_1 + \cos\theta_2}\right|$$

$$\tan\alpha = T_z / T_x$$

For example, when light having a wavelength λ of 360 nm impinges on optically recordable medium at angle $\theta_1=5°$ and angle $\theta_2=30°$, fringes having $T_x=0.61$ μm, $T_z=0.19$ μm, $V_{intensity}=0.05$ and α=17° are generated. This means that practically pure polarization helical patterns are induced, which may induce similar orientational patterns in optically responding material.

When light having a wavelength λ of 360 nm impinges on optically recordable medium at angle $\theta_1=-30°$ and angle $\theta_2=10$ (FIG. 5C, case E), fringes having $T_x=1.1$ μm, $T_z=0.24$ μm, α=12° and $V_{intensity}=0.11$ are generated.

When $\theta_1 = -\theta_2$ ($|\theta_1| = |\theta_2| = \theta$), as shown in FIG. 5C, case F, $T_x$, $T_z$, and $V_{intensity}$ are as follows:

$T_x \to \infty$ $T_z = \lambda/2 \cos\theta$ $V_{intensity} = (1 - \cos 2\theta)/2$ When $\theta_1$ and $\theta_2$ are small, $V_{intensity}$ can be approximated as 0°.

Thus, helical polarization pattern with the helical axis oriented in z direction are formed. These light patterns induce similar orientational patterns in the optically recordable medium, e.g., polarization sensitive polymer. If for example $\theta_1 = 15°$ and $\theta_2 = -15°$ then $T_z = 0.19$ μm and $V_{intensity} = 0.07$.

When first light beam and second light beam counter-propagate to each other (e.g., first light beam and second light beam are parallel to each other and propagate in opposite directions) and when $\theta_1 = \theta_2 \neq 0$ (FIG. 5C, case G), the grating fringes are tilted relative to the surface of the optically recordable medium and $T_x$, $T_z$, and $V_{intensity}$ are as follows:

$$T_x = \left|\frac{\lambda}{2\sin\theta}\right|$$

$$T_z = \left|\frac{\lambda}{2\cos\theta}\right|$$

$$V_{intensity} = 0$$

When, for example, $\theta_1 = \theta_2 = 45°$, then $T_x = 255$ nm and $T_z = 255$ nm, $\alpha = 45°$.

When $\theta_1 = \theta_2 = 0$ (FIG. 5C, case H), $T_x$, $T_z$, and $V_{intensity}$ are as follows:

$T_x \to \infty$ $T_z = \lambda/2$ $V_{intensity} = 0$

Thus, a polarization grating with a grating vector in the z-direction is formed (e.g., the fringes are parallel to the surface of the optically recordable medium).

Figure 6A:
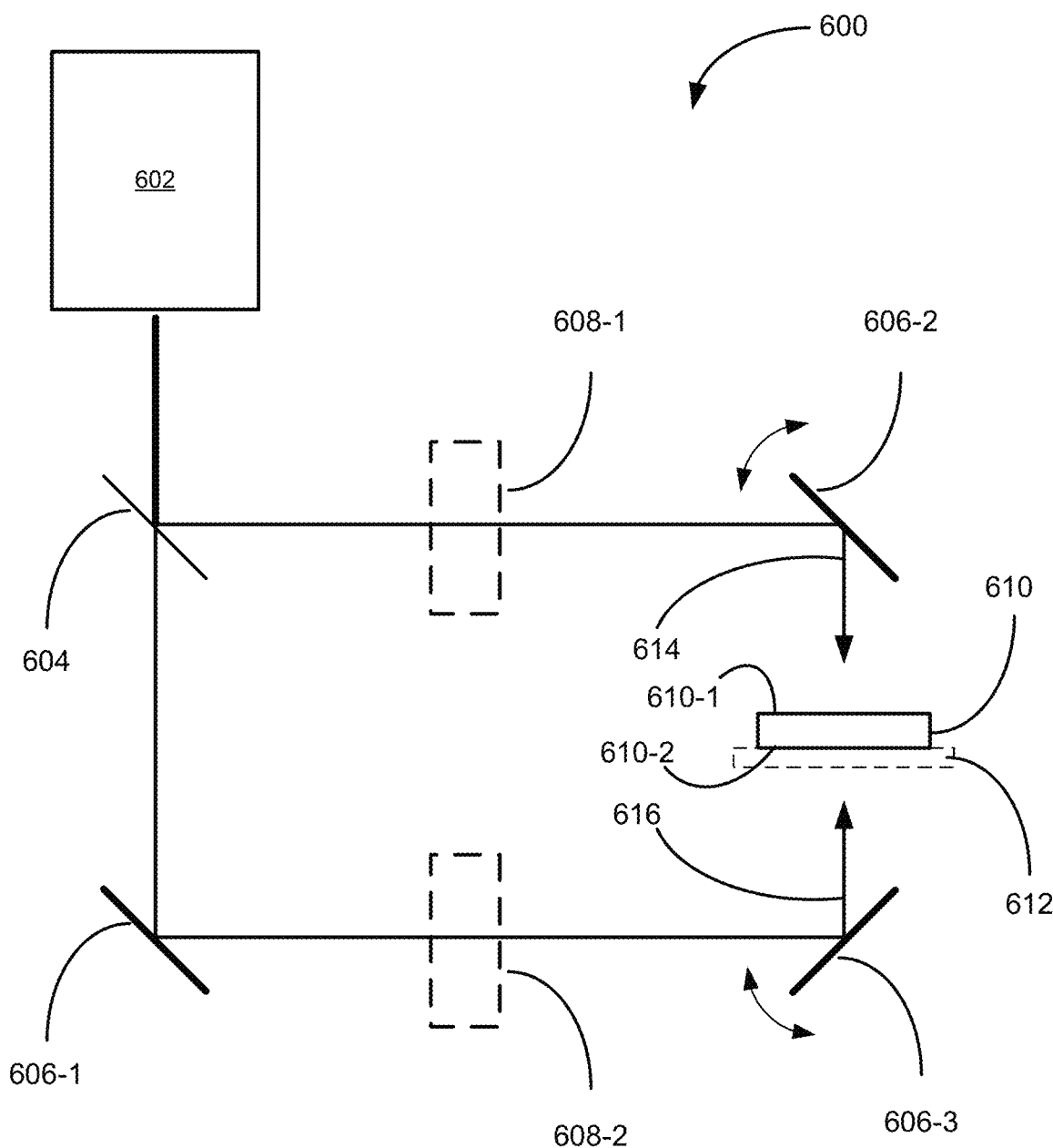
FIG. 6A illustrates exemplary optical setup for making a polarization volume holographic element with two beams impinging on a same side of an optically recordable medium.

FIG. 6A illustrates exemplary optical setup 600 for making a polarization volume holographic element in accordance with some embodiments (e.g., in accordance with exposure geometry shown in FIG. 5B).

Optical setup 600 includes light source 602 configured to emit light and beam splitter 604 configured to spatially separate light received by beam splitter 604. For example, when light source 602 emitted by light source 602 has a mixed polarization, in some cases, beam splitter 604 separates the received light into two directions (e.g., beam splitter 604 reflects first light 614 having a first polarization and transmits second light 616 having a second polarization). In some embodiments, light source 602 is configured to emit coherent light (e.g., light source 602 is a laser).

In some embodiments, optical setup 600 includes one or more polarization elements 608-1 and 608-2. For example, optical setup 600 may include polarization element 608-1 without polarization element 608-2, may include polarization element 608-2 without polarization element 608-1, or may include both polarization elements 608-1 and 608-2. In some embodiments, polarization element 608-1, when included, is configured to change the polarization of first light 614 (e.g., converts a linearly polarized light to a circularly polarized light and/or change a phase of a circularly polarized light). In some embodiments, polarization element 608-2, when included, is configured to change the polarization of second light 616 (e.g., converts a linearly polarized light to a circularly polarized light and/or change a phase of a circularly polarized light). In some embodiments, at least one of the one or more polarization elements 608-1 and 608-2 is a half-wave plate.

In some embodiments, optical setup 600 includes one or more mirrors 606 (e.g., mirrors 606-1, 606-2, and 606-3) configured to reflect light. One or more mirrors 606 are used to steer various light used with optical setup 600 (e.g., first light 614 and second light 616). In some embodiments, at least a subset of one or more mirrors 606 is tiltable (e.g., mirror 606-2 is at least partially rotatable so that an incident angle of first light 614 on mirror 606-2 can be changed without changing the direction of first light 614 before impinging on mirror 606-2; similarly, mirror 606-3 is at least partially rotatable so that an incident angle of first light 616 on mirror 606-3 can be changed without changing the direction of first light 616 before impinging on mirror 606-3).

As shown in FIG. 6A, optical setup 600 is configured to illuminate optically recordable medium 610 with first light 614 and second light 616. In FIG. 6A, first light 614 illuminates optically recordable medium 610 from first surface 610-1 (e.g., a planar surface) of optically recordable medium 610 and second light 616 illuminates optically recordable medium 610 from second surface 610-2 (e.g., a planar surface) of optically recordable medium 610 that is opposite to first surface 610-1 of optically recordable medium 610.

In some embodiments, optically recordable medium 610 is positioned on (or over) mount 612. In some embodiments, mount 612 is transparent to at least second light 616.

In some embodiments, prior to impinging on optically recordable medium 610, first light 614 and second light 616 have a same polarization. For example, first light 614 is a left-handed circularly polarized light and second light 616 is also a left-handed circularly polarized light, or first light 614 is a right-handed circularly polarized light and second light 616 is also a right-handed circularly polarized light.

As shown in FIG. 6A, optical setup 600 allows concurrent illumination of optically recordable medium 610 with cross-propagating first light 614 and second light 616. The concurrent illumination with cross-propagating first light 614 and second light 616 causes interference of first light 614 and second light 616, which generates holographic patterns in optically recordable medium 610. By adjusting the directions of first light 614 and/or second light 616, different holographic patterns can be recorded in optically recordable medium 610. When holographic patterns generated by optical setup 600 are recorded in optically recordable medium 610, optically recordable medium 610 typically operates as a reflective holographic polarization volume grating.

Figure 6B:
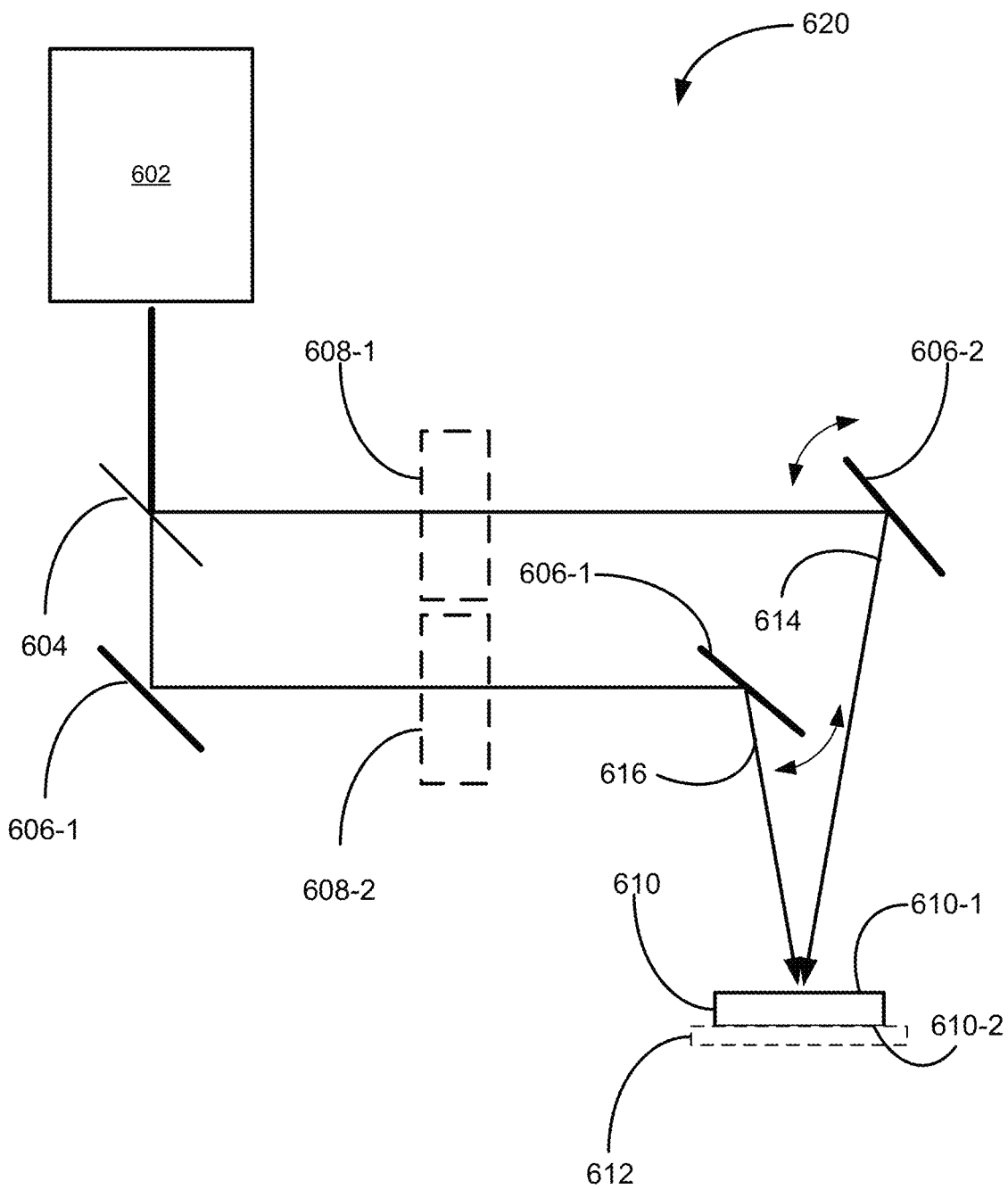
FIG. 6B illustrates exemplary optical setup for making a polarization volume holographic element with two beams impinging on opposite sides of an optically recordable medium.

FIG. 6B illustrates exemplary optical setup 620 for making a polarization volume holographic element in accordance with some embodiments (e.g., in accordance with exposure geometry shown in FIG. 5A).

Optical setup 620 shown in FIG. 6B is similar to optical setup 600 shown in FIG. 6A, except that first light 614 and second light 616 illuminate first surface 610-1 of optically recordable medium 610.

When holographic patterns generated by optical setup 620 are recorded in optically recordable medium 610, optically recordable medium 610 typically operates as a transmissive holographic polarization volume grating.

In some embodiments, prior to impinging on optically recordable medium 610, first light 614 and second light 616 have orthogonal polarizations. For example, first light 614 is a left-handed circularly polarized light and second light 616 is a right-handed circularly polarized light, or first light 614 is a right-handed circularly polarized light and second light 616 is also a left-handed circularly polarized light.

Figure 7:
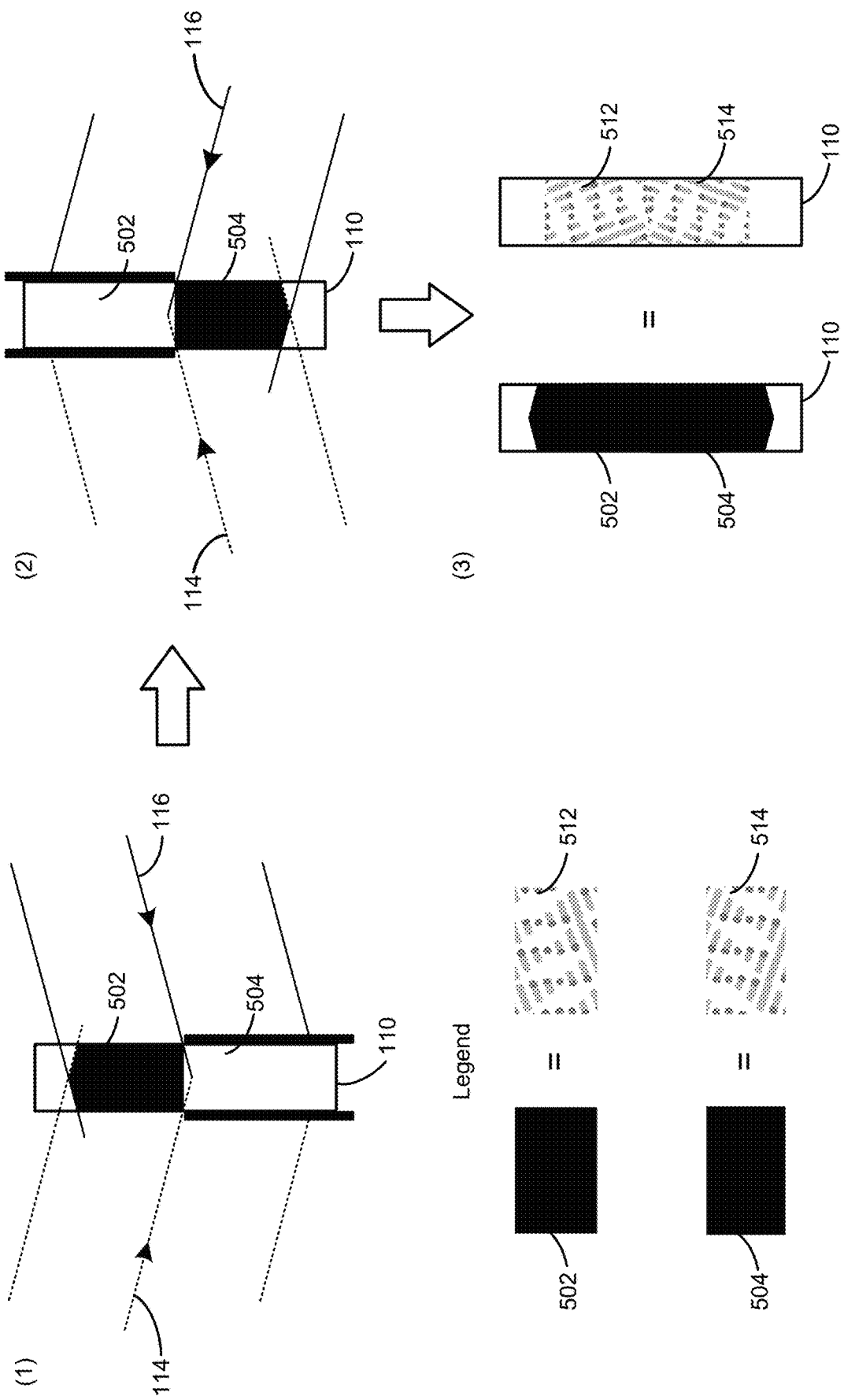
FIG. 7 illustrates making an optical element by sectionally illuminating an optically recordable medium in accordance with some embodiments.

FIG. 7 illustrates making an optical element by sectionally illuminating an optically recordable medium in accordance with some embodiments.

FIG. 7 shows that, at a first time, second portion 504 of optically recordable medium 110 is masked so that first light 114 and second light 116 illuminate first portion 502 of optically recordable medium 110 at a first set of angles without illuminating second portion 504 of optically recordable medium 110. As a result, polymers in first portion 502 of optically recordable medium 110 have a first pattern (e.g., helical structures 512 that correspond to a grating with a grating vector in a first direction).

FIG. 7 also shows that, at a second time different from the first time (e.g., the second time is subsequent to the first time), first portion 502 of optically recordable medium 110 is masked so that first light 114 and second light 116 illuminate second portion 504 of optically recordable medium 110 at a second set of angles different from the first set of angles (e.g., by changing the direction of first light 114 and/or the direction of second light 116 between the first time and the second time) without illuminating first portion 502 of optically recordable medium 110. As a result, polymers in second portion 504 of optically recordable medium 110 have a second pattern that is distinct from the first pattern (e.g., helical structures 514 that correspond to a grating with a grating vector in a second direction).

As a result, optically recordable medium 110 includes at least two portions with distinct optical properties.

In some embodiments, masking a portion of optically recordable medium 110 includes masking a first surface of optically recordable medium 110 without masking a second surface of optically recordable medium 110 that is opposite to the first surface of optically recordable medium 110. In some embodiments, masking a portion of optically recordable medium 110 includes masking the second surface of optically recordable medium 110 without masking the first surface of optically recordable medium 110. In some embodiments, masking a portion of optically recordable medium 110 includes masking both the first surface of optically recordable medium 110 and the second surface of optically recordable medium 110.

Figure 8:
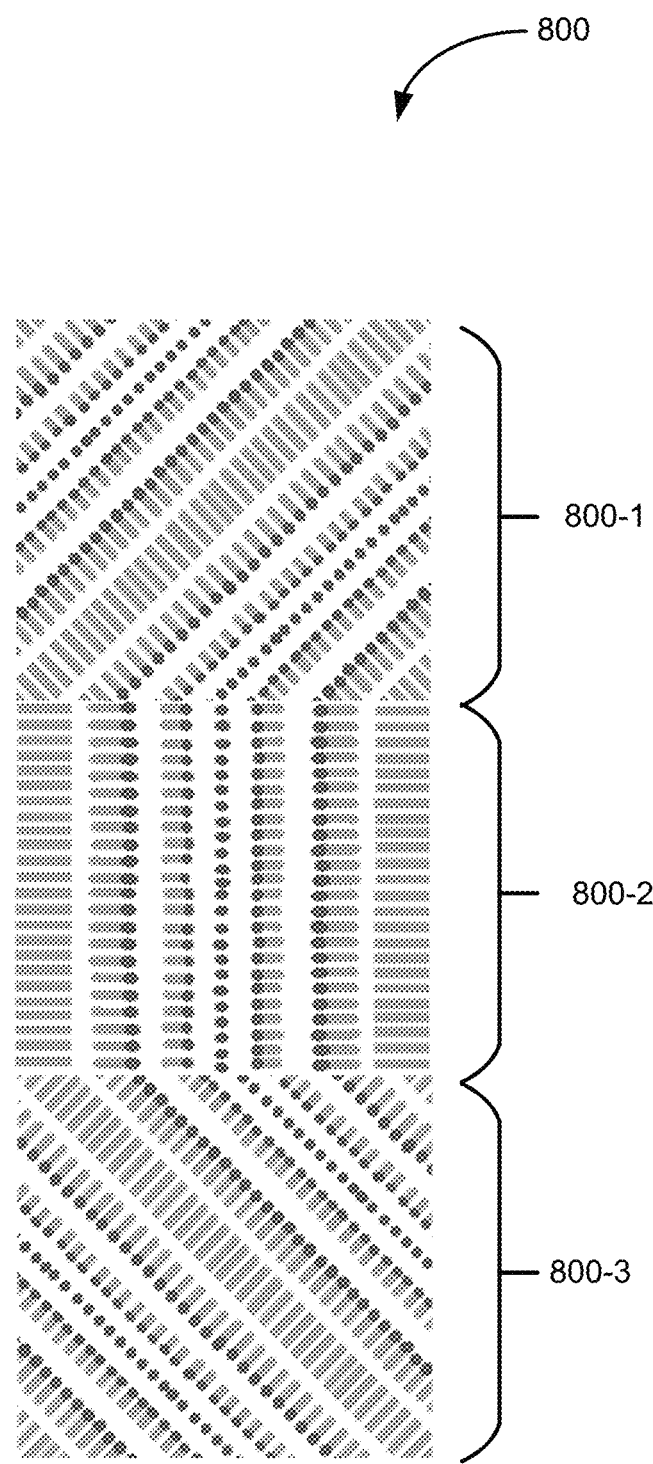
FIG. 8 illustrates a polarization volume holographic element including multiple layers of optically recordable material with different alignment patterns.

FIG. 8 illustrates polarization volume holographic element 800 in accordance with some embodiments. Polarization volume holographic element 800 shown in FIG. 8 includes three regions, namely first region 800-1, second region 800-2, and third region 800-3. In some embodiments, polarization volume holographic element 800 is formed by stacking first region 800-1, second region 800-2, and third region 800-3. In some embodiments, polymers in first region 800-1 are oriented in directions distinct from polymers in second region 800-2 and polymers in third region 800-3. Polymers in second region 800-2 are oriented in directions distinct from polymers in third region 800-3. For example, as shown in FIG. 8, polymers in first region 800-1 are arranged in cycloidal patterns along a first plane, polymers in second region 800-2 are arranged in cycloidal patterns along a second plane that is not parallel to the first plane, and polymers in third region 800-3 are arranged in cycloidal patterns along a third plane that is not parallel to the first plane and the second plane.

Figure 9:
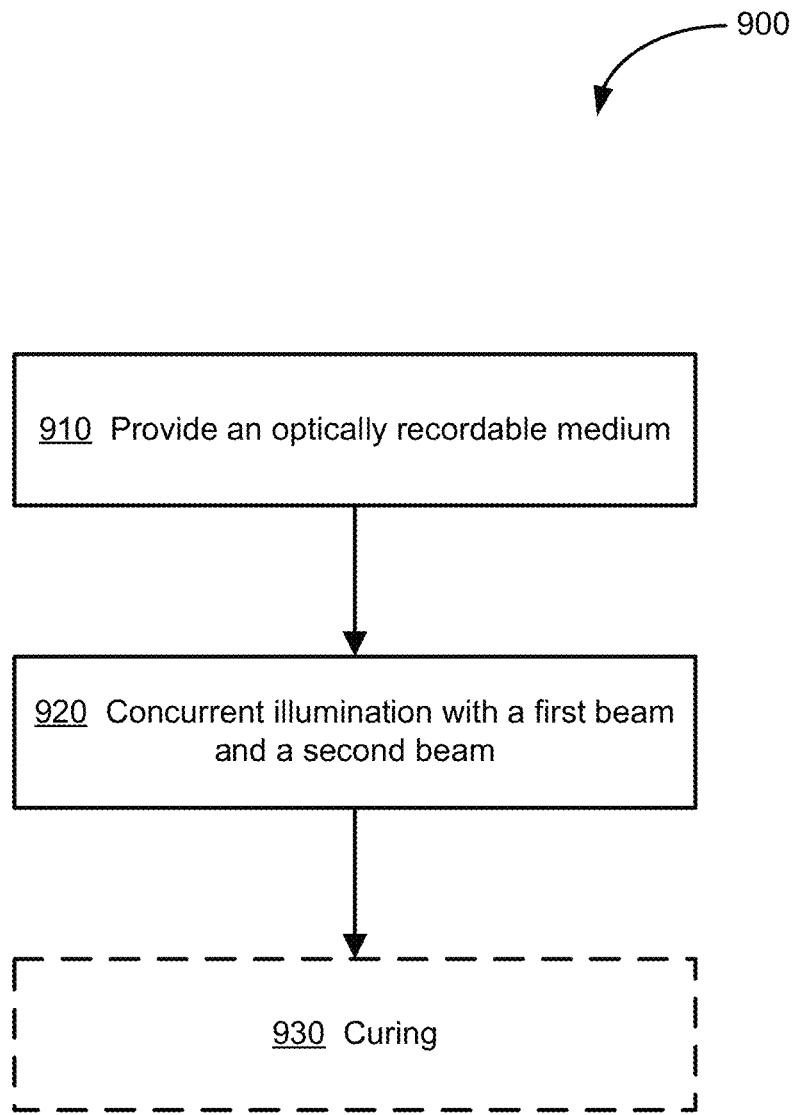
FIG. 9 illustrates a method of making a polarization volume holographic element in accordance with some embodiments.

FIG. 9 illustrates method 900 of making a polarization volume holographic element in accordance with some embodiments.

The method includes providing (910) an optically recordable medium having the Klein parameter Q that is greater than, or equal to, a predefined criterion (e.g., Q is greater than 10). The optically recordable medium has a first surface and a second surface that is opposite to the first surface.

In some embodiments, the Klein parameter Q is greater than, or equal to 5. In some embodiments, the Klein parameter Q is greater than, or equal to 10. In some embodiments, the Klein parameter Q is greater than, or equal to 15. In some embodiments, the Klein parameter Q is greater than, or equal to 20. In some embodiments, the Klein parameter Q is greater than, or equal to 25. In some embodiments, the Klein parameter Q is greater than, or equal to 30. In some embodiments, the Klein parameter Q is greater than, or equal to 35. In some embodiments, the Klein parameter Q is greater than, or equal to 40. In some embodiments, the Klein parameter Q is greater than, or equal to 45. In some embodiments, the Klein parameter Q is greater than, or equal to 50. In some embodiments, the Klein parameter Q is greater than, or equal to 60. In some embodiments, the Klein parameter Q is greater than, or equal to 70. In some embodiments, the Klein parameter Q is greater than, or equal to 80. In some embodiments, the Klein parameter Q is greater than, or equal to 90. In some embodiments, the Klein parameter Q is greater than, or equal to 100. In some embodiments, the Klein parameter Q is greater than, or equal to 200.

In some embodiments, the optically recordable medium includes photopolymers and/or liquid crystal polymers.

The PVGs based on bulk mediated photoalignment were induced in azopolymers. However, these materials absorb visible light so that orientational patterns are optically unstable. Our invention extends the range of recording media to the class of photocrosslinking materials. Besides, it extends a plurality of orientational patterns generated by polarization patterns created by two interfering light beams.

In some embodiments, the optically recordable medium includes less than 10% of azo polymers by weight. Although azo polymers may be used as photopolymers, azo polymers have significant absorption, which in turn interferes with the use of the optical elements as see-through components in displays. In some embodiments, the optically recordable medium includes little or no azo polymers. For example, in some cases, the optically recordable medium includes less than 9%, 8%, 7%, 6%, 5%, 4%, 3%, 2%, 1%, 0.5% or 0.1% of azo polymers by weight. The optically recordable photocrosslinking materials may also include other additives, such as photosensitizers, photoinitiators, crosslinkers, reactive mesogens, etc.

The method also includes concurrently illuminating (920) the optically recordable medium (i) with a first beam having a first polarization and (ii) with a second beam having a second polarization, thereby obtaining the polarization volume holographic element.

In some embodiments, the first beam and the second beam have the same wavelength (e.g., the wavelength of the first beam and the second beam is 325 nm or 360 nm).

In some embodiments, the first beam has plane wave front and the second beam has plane wave front.

In some embodiments, the first beam has plane wave front and the second beam has spherical wave front.

In some embodiments, the first beam has spherical wave front and the second beam has spherical wave front.

In some embodiments, the first polarization corresponds to left-handed circular polarization and the second polarization corresponds to left-handed circular polarization. In some embodiments, the first polarization corresponds to right-handed circular polarization and the second polarization corresponds to right-handed circular polarization.

In some embodiments, the first polarization corresponds to left-handed circular polarization and the second polarization corresponds to right-handed circular polarization. In some embodiments, the first polarization corresponds to right-handed circular polarization and the second polarization corresponds to left-handed circular polarization.

In some embodiments, the first beam and the second beam have slightly elliptical polarization close to circular polarization.

In some embodiments, the first polarization corresponds to a first linear polarization (e.g., horizontal polarization) and the second polarization corresponds to a second linear polarization (e.g., vertical polarization) orthogonal to the first linear polarization.

In some embodiments recording beams have orthogonal circular polarizations and the angle between the beams is less than 90 degrees, preferably less than 60 degrees, most preferably less than 40 degrees so that the formed polarization patterns are cycloidal patterns (FIG. 4, section A).

In some embodiments recording beams have same circular polarizations and angle between the beams is 180±45 degrees, preferably 180±30 degrees, most preferably 180±20 degrees so that the formed polarization patterns are helical patterns (FIG. 4, section B).

In some embodiments, the optically recordable medium is concurrently illuminated with the first beam and the second beam through the same surface of the optically recordable medium.

In some embodiments, the optically recordable medium is concurrently illuminated with the first beam through the first surface of the optically recordable medium and the second beam through the second surface of the optically recordable medium (e.g., the first beam and the second beam illuminate opposite sides of the optically recordable medium).

In some embodiments, an incidence angle of the first beam and an incidence angle of the second beam on the layer of recordable material are equal in value and sign.

In some embodiments, the incidence angle of the first beam and the incidence angle of the second beam on the layer of recordable material are equal in value and non-equal in sign.

In some embodiments, the incidence angle of the first beam and the incidence angle of the second beam on the layer of recordable material are equal in sign and non-equal in value.

In some embodiments, the incidence angle of the first beam and the incidence angle of the second beam on the layer of recordable material are non-equal in sign and non-equal in value.

In some embodiments, the first incidence angle is zero and the second incidence angle is zero.

In some embodiments, intensity fringes formed by concurrently illuminating the optically recordable medium with the first beam and the second beam have intensity variation below a predefined threshold (e.g., $V_{intensity}$ below a predefined threshold, such as V≤0.25, for intensity fringes formed by concurrently illuminating the optically recordable medium).

In some embodiments, the method includes curing (930) the optically recordable medium after concurrently illuminating the optically recordable medium with the first beam and the second beam. In some embodiments, the curing includes thermal annealing. In some embodiments, the curing includes exposing the optically recordable medium to ultraviolet light.

In some embodiments, the first surface of the optically recordable medium is substantially flat and the second surface of the optically recordable medium is substantially flat.

In some embodiment, fringes of formed volume polarization gratings are perpendicular to the layer of optically recordable material.

In some embodiment, fringes of formed volume polarization gratings are parallel to the layer of optically recordable material.

In some embodiment, fringes of formed volume polarization gratings are tilted to the plane of layer of optically recordable material (slanted grating).

In some embodiments, periodic orientational patterns formed in optically recordable material under holographic exposure are cycloidal patterns.

In some embodiments, periodic orientational patterns formed in optically recordable material under holographic exposure are helical patterns.

In some embodiments, the polarization volume holographic element does not include a photoalignment layer (e.g., compare the optical elements that include alignment layers as shown in FIGS. 2A and 2B).

In some embodiments, the periodic orientational patterns include variation in the orientation of the optically recordable material along each axis of the Cartesian coordinate system, where one axis of the Cartesian coordinate system is perpendicular to the first surface. For example, the polarization gratings shown in FIG. 4, where α is between 0° and 90° (not including 0° and)90°, have variation in the orientation of the optically recordable material in all three Cartesian coordinate system where one axis of the Cartesian coordinate system is perpendicular to one of the surfaces of the optically recordable material. This is different from the optical elements formed by using alignment layers, as shown in FIGS. 2A and 2B.

In accordance with some embodiments, a polarization volume holographic element includes a first optical medium that satisfies the condition Q≥10.

In some embodiments, the layer of optically recordable medium is at a first time concurrently illuminated with first and second coherent beams in first exposure geometry thereby recording first grating, and then at a second time concurrently illuminated with the third and the fourth coherent beams in second exposure geometry thereby recording the second grating. The wavelength of third and fourth coherent beams used in second exposure step can be different from wavelength of first and second coherent beams used in first exposure step. This process is usually called grating multiplexing.

In some embodiments, the first portion of the optically recordable medium is concurrently illuminated in first exposure geometry with first and the second coherent beams while the second portion of the optically recordable medium is masked (and the first portion of the optically recordable medium is not masked), and the second portion of the optically recordable medium is concurrently illuminated in second exposure geometry with third and fourth coherent beams while the first portion of the optically recordable medium is masked (and the second portion of the optically recordable medium is not masked) (e.g., FIG. 7). The wavelength of the third and fourth coherent beams used in second exposure step can be different from wavelength of the first and second coherent beams used in first exposure step. By this way multidomain gratings can be attained.

The layer of first optical medium includes photosensitive components (e.g., fragments of polymer molecules) arranged in a first plurality of orientational patterns and the layer of second optical medium adjacent to the first layer includes photosensitive components arranged in a second plurality of orientational patterns. A first layer with a first plurality of orientational patterns is positioned in a first direction on a reference plane and a second layer with a second plurality of orientational patterns is positioned in a second direction distinct from the first direction on the reference plane. This process is usually called stacking of holographic gratings.

In some embodiments, the volume holographic element includes a layer of third optical medium. In some embodiments, each optical medium is illuminated with two beams as described herein and stacked together to form a stacked hologram (FIG. 8). In some embodiments, first optical medium is illuminated and cured, and the second optical medium is added, illuminated and cured on top of the first optical medium. In some embodiments, the polarization volume holographic medium with multiple optical mediums is prepared with a single illumination.

In some embodiments, the first plurality of periodical orientational patterns has a first period and the second plurality of periodical orientational patterns has a second period. The first optical medium is configured to diffract light of a first wavelength and transmit light of wavelengths other than the first wavelength, and the second optical medium is configured to diffract light of a second wavelength distinct from the first wavelength and transmit light of wavelengths other than the second wavelength. In some embodiments, the first wavelength corresponds to red light and the second wavelength corresponds to green light. In some embodiments, the first wavelength corresponds to red light and the second wavelength corresponds to blue light. In some embodiments, the first wavelength corresponds to blue light and the second wavelength corresponds to green light. In some embodiments, the first wavelength corresponds to visible light and the second wavelength corresponds to infrared light.

In some embodiments, the stack of polarization volume holograms prepared according to methods described herein includes one or more art holograms based on aligned liquid crystal layer as shown in FIGS. 2A and 2B.

In accordance with some embodiments, a polarization volume holographic element is made by any method described herein.

Some embodiments may be described with reference to the following description:

In accordance with some embodiments, a method of creating orientational patterns in a bulk of photosensitive materials comprises providing a layer of optically recordable polarization sensitive and photocrosslinkable material having a thickness that is greater than, or equal to, a predefined thickness, a first surface and a second surface that is opposite to the first surface; and concurrently illuminating the layer of optically recordable material with two coherent beams of polarized light thereby inducing periodic orientational patterns.

In some embodiments, the beams are circularly polarized.

In some embodiments, convergence angle of the beams is less than 90°, preferably less than 60° and most preferably less than 40°, and the beams have orthogonal circular polarizations thereby inducing cycloidal orientational patterns in the layer of optically recordable material.

In some embodiments, the beams impinge on the same surface of the layer of recordable material.

In some embodiments, the beams impinge on the opposite surfaces of the layer of recordable material.

In some embodiments, the convergence angle of the beams is 180±45°, preferably 180±30°, and most preferably 180±20°, and the beams have same circular polarizations thereby inducing helical orientational patterns in the layer of optically recordable material.

In some embodiments, the beams impinge on the opposite surfaces of the layer of recordable material.

In some embodiments, the beams impinge on the same surface of the layer of recordable material.

In some embodiments, incidence angles of the recording beams are equal.

In some embodiments, incidence angles of the recording beams are not equal.

In some embodiments, beams are collimated (e.g., the beams have plane wave fronts).

In some embodiments, one beam has a plane wave front and another beam has a spherical wave front.

In some embodiments, both beams have spherical wave fronts.

In some embodiments, the optically recordable polarization sensitive and photocrosslinkable material is a monomer or oligomer including a photosensitive fragment undergoing cycloaddition reaction.

In some embodiments, the optically recordable polarization sensitive and photocrosslinkable material is a polymer or copolymer including a photosensitive fragment undergoing cycloaddition reaction.

In some embodiments, a photosensitive fragment is a cinnamate fragment.

In some embodiments, a polymer is a liquid crystal polymer.

In some embodiments, a polymer is an amorphous polymer.

In some embodiments, the patterns are created at an ambient temperature.

In some embodiments, the patterns are created at a temperature corresponding to liquid crystal phase.

In some embodiments, a layer of optically recordable material with the created patterns is annealed at a temperature corresponding to liquid crystal phase, thereby enhancing orientational patterns.

In some embodiments, a hologram based on the layer of optically recordable material with periodic orientational patterns induced according to any of the methods described herein.

In some embodiments, a hologram having periodic orientational patterns, wherein the hologram satisfies a condition that Klein parameter Q is greater than or equal to 10, wherein the Klein parameter Q is defined as follows:

$$Q = \frac{2\pi \lambda d}{\Lambda^2 n},$$

where d is a hologram thickness, $\lambda$ is a wavelength of light, $\Lambda$ is an averaged period of holographic grating and n is an averaged refractive index of the recordable medium.

In some embodiments, the hologram further has orientational patterns induced by any of the methods described herein.

In some embodiments, a polarization volume holographic element made by any of the methods described herein.

In some embodiments, the polarization volume holographic element does not include a photoalignment layer.

In some embodiments, a polarization volume holographic element, comprising a layer of optically recordable material that contains two and more areas in which single holograms are recorded under different exposure conditions.

In some embodiments, a polarization volume holographic element, comprising a layer of optically recordable material that contains multiple holograms recorded at the same location under different exposure conditions.

In some embodiments, a polarization volume holographic element, including two and more layers of optically recordable media coupled with one another so that the layers contain holograms recorded under same or different exposure conditions.

In some embodiments, one or more stacked holograms are made of reactive mesogen or liquid crystal aligned by a patterned alignment layer.

The methods of fabricating polarization volume hologram (PVH) elements described herein enable fabrication of PVH elements with a variety of configurations. In particular, PVH elements having anisotropic components (e.g., liquid crystals) arranged in helical or cycloidal patterns tilted with respect to a surface of the PVH element have high optical efficiency and high polarization selectivity, and cause low polarization deviation. FIGS. 10A-19B describe a variety of PVH elements having anisotropic components arranged in the tilted helical or cycloidal patterns and operations of such elements. Such optical elements may have high angular and/or wavelength selectivity, or may be configured for wide angle and/or large bandwidth of incident light.

Figure 10A:
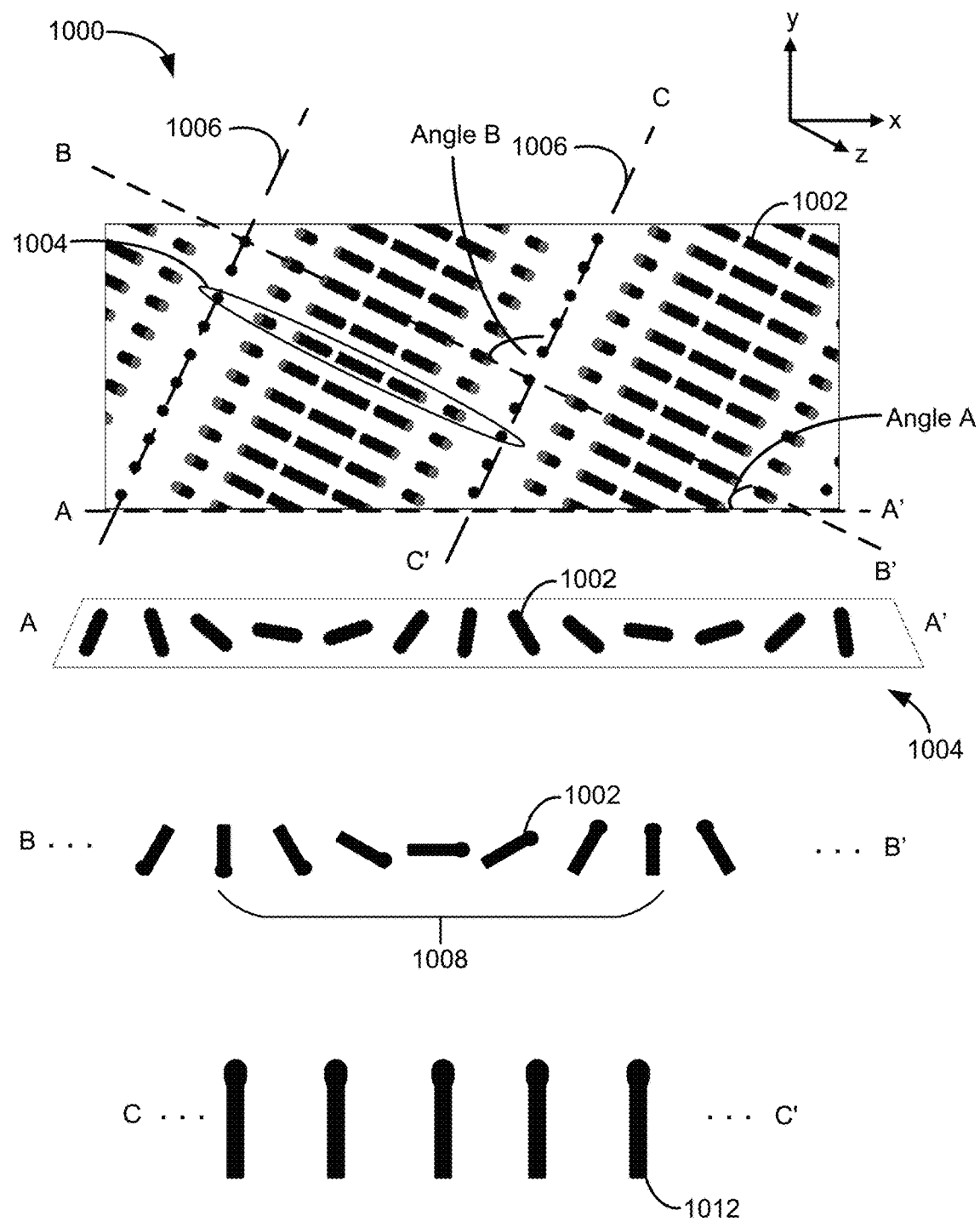
FIG. 10A illustrates a transmissive polarization volume holographic element with slanted patterns in accordance with some embodiments.

With respect to the following description of FIGS. 10A-19B, it should be noted that the figures are described independently of one another. For example, a pattern called a first pattern with respect to FIG. 10A is not necessarily the same pattern as a pattern called a first pattern with respect to FIG. 10B.

FIG. 10A illustrates transmissive PVH element 1000 with slanted patterns in accordance with some embodiments. In some embodiments, transmissive PVH element 1000 is made by the methods described above with respect to FIGS. 4-6B. Transmissive PVH element 1000 includes anisotropic material including anisotropic components 1002 (e.g., molecules, such as liquid crystal molecules, or fragments of one or more molecules). In some embodiments, anisotropic components 1002 have birefringence. In some embodiments, anisotropic components 1002 have a rod shape, a bend shape, a disc shape, or a nunchaku-style molecular shape. In FIG. 10A, anisotropic components 1002 are arranged in cycloidal patterns 1004. In some embodiments, transmissive PVH element 1000 defines a plane parallel to its surface (e.g., reference plane AA' parallel to a top or bottom surface of transmissive PVH element 1000). FIG. 10A also includes a perspective view of anisotropic components 1002 on the reference plane AA' in accordance with some embodiments. Cycloidal patterns 1004 define one or more reference planes (e.g., reference plane BB'). Reference plane BB' (also called a rotator plane) corresponds to a plane on which anisotropic components 1002 are arranged rotatingly in a cycloidal pattern, as illustrated in the cross-sectional view of reference plane BB' in FIG. 10A. In the cycloidal pattern, anisotropic components 1002 remain parallel to reference plane BB'. As shown in FIG. 10A, cycloidal patterns 1004 (and the anisotropic components arranged in the cycloidal patterns 1004) are slanted with respect to the reference plane AA' so that an angle (e.g., angle A) defined by reference plane AA' and reference plane BB' is greater than zero degrees and less than 90 degrees (e.g., cycloidal patterns 1004 are oriented non-parallel and non-perpendicular to the plane parallel to the surface of transmissive PVH element 1000). In some embodiments, all of the anisotropic components arranged in the cycloidal patterns 1004 are slanted with respect to the reference plane AA'. In some embodiments, cycloidal patterns 1004 define one or more Bragg planes 1006 (e.g., diffractive planes). Bragg planes 1006 are separated by distance 1008 corresponding to a pitch of cycloidal pattern 1004. A pitch of a cycloidal pattern corresponds to a distance for the anisotropic components 1002 to rotate 180 degrees along its reference axis. In some embodiments, Bragg planes 1006 are substantially perpendicular to the cycloidal patterns 1004 so that an angle (e.g., angle B) defined by Bragg plane 1006 and reference plane BB' is substantially 90 degrees. In some embodiments, angle B defined by Bragg plane 1006 and reference plane BB' is 90 degrees. In some embodiments, angle B defined by Bragg plane 1006 and reference plane BB' ranges from 75 degrees to 105 degrees, from 80 degrees to 100 degrees, from 85 degrees to 95 degrees, from 86 degrees to 94 degrees, from 87 degrees to 93 degrees, from 88 degrees to 92 degrees, or from 89 degrees to 91 degrees. Bragg planes 1006 represent planes from which incident light is reflected to have constructive interference, which, in turn, redirects incident light based on a polarization, incident angle, and/or wavelength of the incident light. FIG. 10A also shows that anisotropic materials 1002 are oriented in a same direction on the plane CC', which is parallel to Bragg planes 1006. In some embodiments, the arrangement of anisotropic materials 1002 in FIG. 10A is repeated in the Z direction.

Figure 10B:
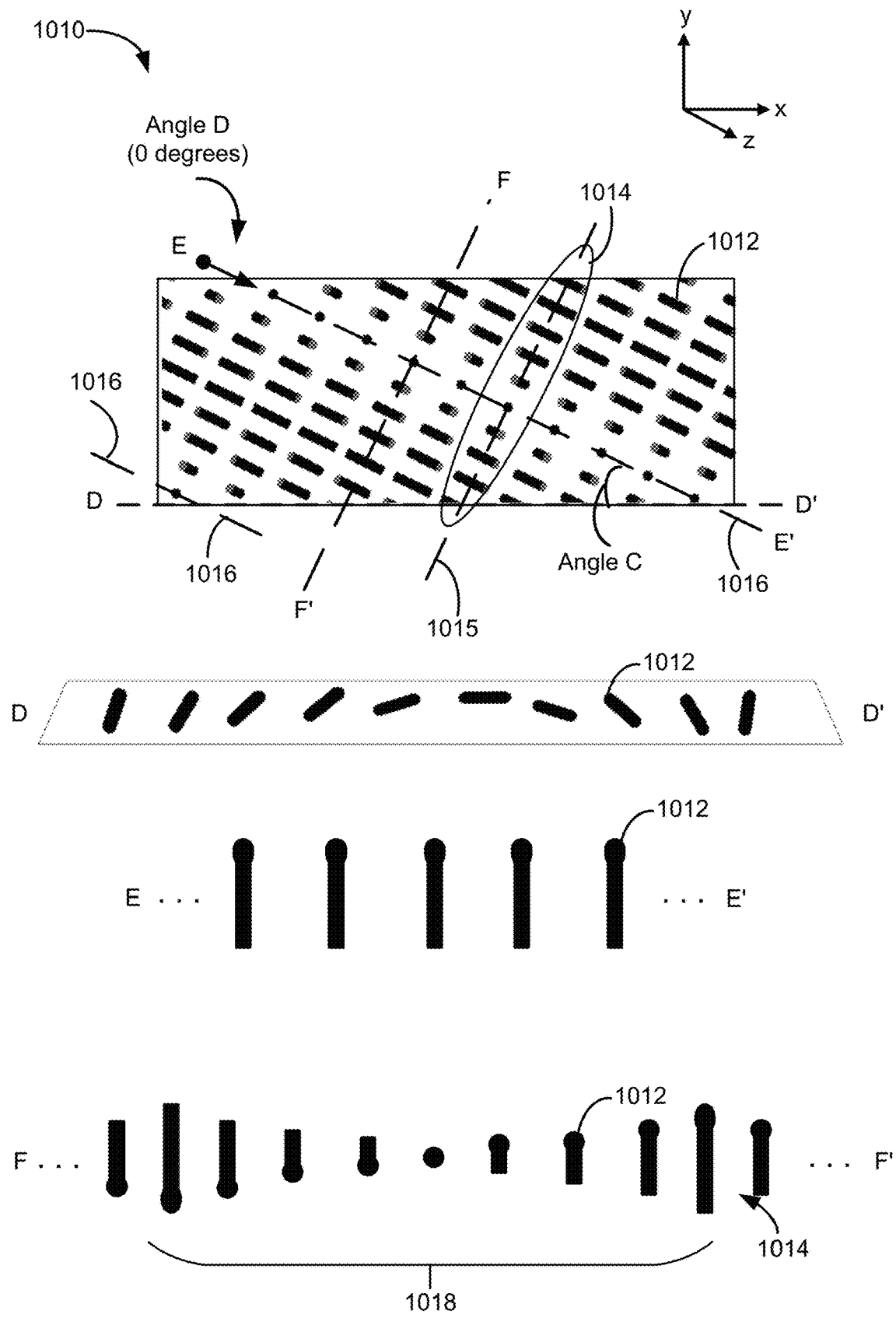
FIG. 10B illustrates a reflective polarization volume holographic element with slanted patterns in accordance with some embodiments.

FIG. 10B illustrates reflective PVH element 1010 with slanted patterns in accordance with some embodiments. In some embodiments, reflective PVH element 1010 is made by the methods described above with respect to FIGS. 4-6B. While transmissive PVH element 1000 shown in FIG. 10A includes cycloidal patterns 1004, reflective PVH element 1010 shown in FIG. 10B includes anisotropic material including anisotropic components 1012 (e.g., liquid crystal molecules) arranged in helical patterns 1014. In some embodiments, anisotropic components 1012 correspond to anisotropic components 1012 described with respect to FIG. 10A. In some embodiments, reflective PVH element 1010 defines a plane parallel to its surface (e.g., reference plane DD' parallel to a top or bottom surface of reflective PVH element 1010). FIG. 10B also includes a perspective view of anisotropic components 1012 on the reference plane DD' in accordance with some embodiments. Helical patterns 1014 define one or more reference planes (e.g., reference plane EE'). Reference plane EE' corresponds to a plane on which anisotropic components 1012 are positioned parallel to one another (and thus have no rotation relative to one another), as illustrated in the cross-sectional view of reference plane EE'. As shown in FIG. 10B, helical patterns 1014 are slanted with respect to the reference plane DD' so that an angle (e.g., angle C) defined by reference plane DD' and reference plane EE' is greater than zero degrees and less than 90 degrees (e.g., helical patterns 1014 and their helical axes 1015 are oriented non-parallel and non-perpendicular to the plane parallel to the surface of reflective PVH element 1010). Helical patterns 1014 further define one or more Bragg planes 1016 (e.g., diffractive planes). As shown in FIG. 10B, Bragg planes 1016 are defined along reference plane EE', which is parallel to the plane on which anisotropic components 1012 are oriented in a same direction (e.g., anisotropic components 1012 do not rotate on the reference plane EE' or any plane that is perpendicular to the reference plane EE').

In FIG. 10B, Bragg planes 1016 are separated by a distance corresponding to a pitch (e.g., distance 1018) of helical pattern 1014. A pitch of a helical pattern corresponds to a distance for the anisotropic components 1012 to rotate 180 degrees along its helical axis (e.g., a pitch indicated with respect to helical axis FF'). In some embodiments, Bragg planes 1016 are substantially parallel to reference plane EE' so that an angle (e.g., angle D) defined by Bragg plane 1016 and reference plane EE' is substantially zero degrees. In some embodiments, angle D defined by Bragg plane 1016 and reference plane EE' is zero degrees. In some embodiments, angle D defined by Bragg plane 1016 and reference plane EE' ranges from 15 degrees to minus 15 degrees, from ten degrees to minus ten degrees, from five degrees to minus five degrees, or from two degrees to minus two degrees. Bragg planes 1016 are configured to reflect light based on polarization, incident angle, and/or wavelength of an incident light. In some embodiments, the arrangement of anisotropic materials 1012 in FIG. 10B is repeated in the Z direction.

The anisotropic materials having cycloidal or helical patterns with reference planes (e.g., plane BB' or EE', respectively) non-parallel and non-perpendicular to a surface of the optical elements (e.g., reference planes AA' and DD', respectively) provide for an increased polarization selectivity compared to anisotropic materials having cycloidal or helical patterns with reference planes perpendicular to the surface (e.g., compare to helical structures shown in FIGS. 2A-2B). In particular, such anisotropic materials including slanted patterns reduce or eliminate polarization deviation, thereby enhancing polarization selectivity.

Figure 10C:
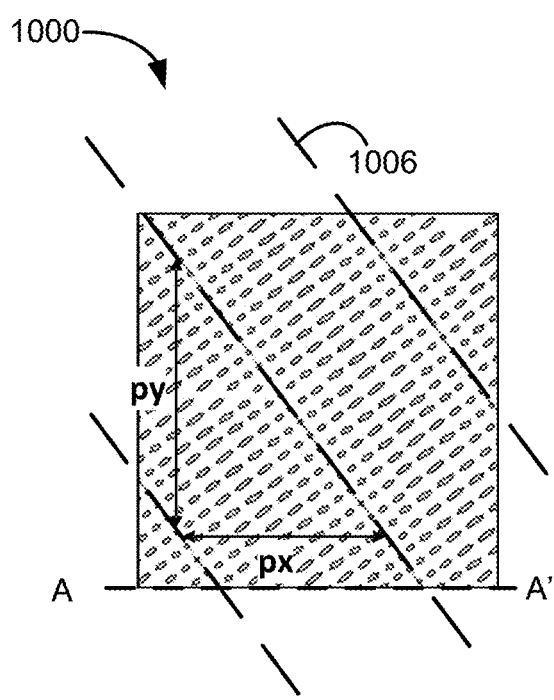
FIG. 10C illustrates Bragg planes of a transmissive PVH element in accordance with some embodiments.

FIG. 10C illustrates Bragg planes 1006 of transmissive PVH element 1000 in accordance with some embodiments. In FIG. 10C, Bragg planes 1006 has a vertical pitch $P_y$ corresponding to a distance between distinct Bragg planes 1006 in a direction perpendicular to a surface of transmissive PVH element 1000 (e.g., perpendicular to plane AA'). Bragg planes 1006 also has a horizontal pitch $P_x$ corresponding to a distance between distinct Bragg planes 1006 in a direction parallel to the surface of transmissive PVH element 1000. The pitch $P_t$ of transmissive PVH element 1000 (corresponding to distance 1008 shown in FIG. 10A) satisfies the following:

$$1/P_t^2 = 1/P_x^2 + 1/P_y^2$$

Figure 10D:
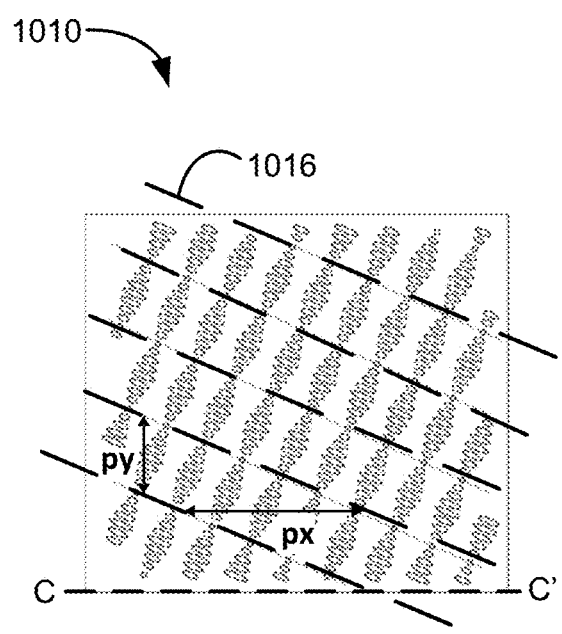
FIG. 10D illustrates Bragg planes of a reflective PVH element in accordance with some embodiments.

FIG. 10D illustrates Bragg planes 1016 of reflective PVH element 1010 in accordance with some embodiments. In FIG. 10D, Bragg planes 1016 has a vertical pitch Py corresponding to a distance between distinct Bragg planes 1016 in a direction perpendicular to a surface of reflective PVH element 1010 (e.g., perpendicular to plane DD'). Bragg planes 1016 also has a horizontal pitch $P_x$ corresponding to a distance between distinct Bragg planes 1016 in a direction parallel to the surface of reflective PVH element 1010. The pitch $P_r$ of reflective PVH element 1010 (corresponding to distance 1018 shown in FIG. 10B) satisfies the following:

$$1/P_r^2 = 1/P_x^2 + 1/P_y^2$$

The horizontal pitches $P_x$ in FIGS. 10A and 10B are defined by Equation (1):

$$P_x = \frac{\lambda_0}{\sin(\theta_{def})},$$ (Equation 1)

where $\lambda_0$ is a wavelength of incident light and $\theta_{def}$ is a diffraction angle of incident light that is normal to a surface of a PVH element. A Bragg plane angle θ corresponding to an angle between a Bragg plane and a surface normal can be derived from Equation (2):

$$\tan\theta = \frac{P_y}{P_x}.$$ (Equation 2)

A PVH element meets a Bragg condition when $\theta_{def}$ is two times the Bragg plane angle θ. The Bragg gratings define the wavelength selectivity of a respective optical element by Equation (3):

$$\lambda_B = 2nP_B \cos(\theta_{inc}),$$ (Equation 3)

where $\lambda_B$ corresponds to a wavelength (e.g., Bragg wavelength) that the PVH element is configured to redirect and angle $\theta_{inc}$ is defined as an angle between incident light that is normal to a surface of a PVH element and a Bragg plane normal.

A distance between Bragg planes $P_B$ is defined by Equation (4):

$$\frac{1}{P_B^2} = \frac{1}{P_x^2} + \frac{1}{P_y^2}.$$ (Equation 4)

Figure 10E:
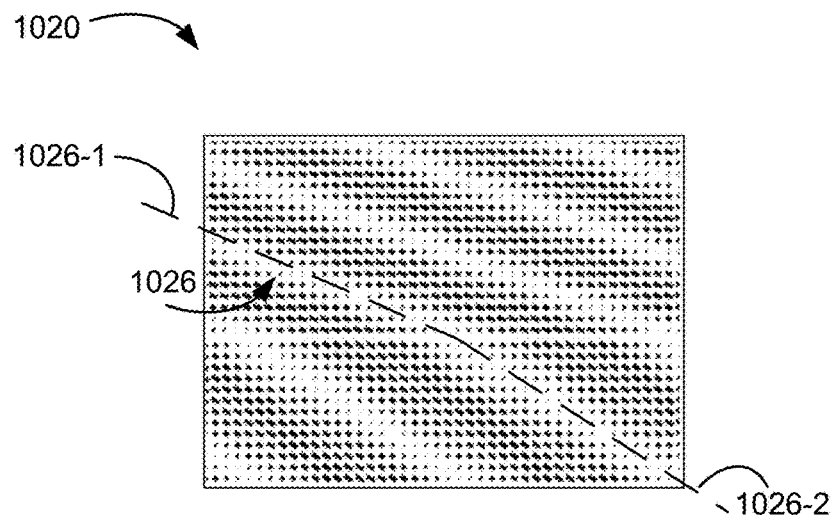
FIG. 10E illustrates a reflective PVH element having non-parallel Bragg planes in accordance with some embodiments.

FIG. 10E illustrates reflective PVH element 1020 having continuous, non-parallel Bragg planes in accordance with some embodiments. In some embodiments, reflective PVH element 1020 corresponds to reflective PVH element 1010 except that reflective PVH element 1020 defines a plurality of joined Bragg planes (e.g., Bragg plane 1026 having portions 1026-1 and 1026-2 that are in contact with each other). For example, portion 1026-2 of Bragg plane 1026 is non-parallel to portion 1026-2 of Bragg plane 1026. Portion 1026-2 intercepts with portion 1026-1 so that Bragg plane 1026 has two portions 1026-1 and 1026-2 that are in contact with each other. Portions 1026-1 and 1026-2 may be linear or curved.

Figure 10F:
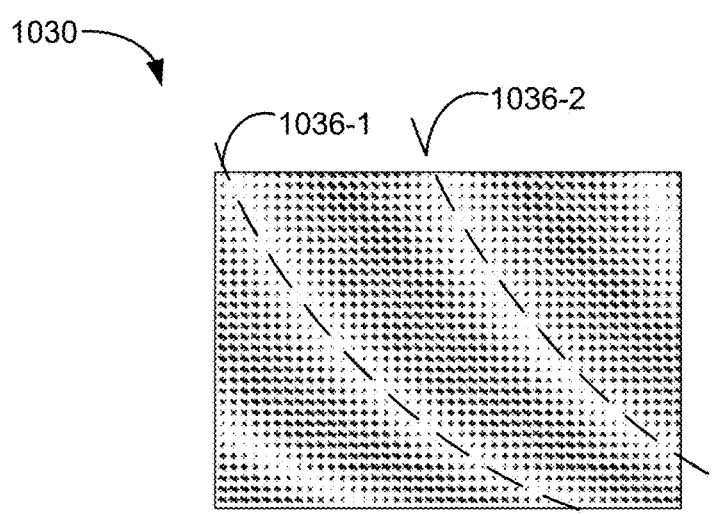
FIG. 10F illustrates a reflective PVH element having continuously curved Bragg planes in accordance with some embodiments.

FIG. 10F illustrates reflective PVH element 1030 having curved Bragg planes in accordance with some embodiments. In some embodiments, reflective PVH element 1030 corresponds to reflective PVH element 1010 except that reflective PVH element 1030 defines a plurality of curved Bragg planes (e.g., Bragg planes 1036-1 and 1036-2). In contrast, Bragg planes 1016 in FIG. 10B are linear. In some embodiments, as shown in FIG. 10F, Bragg plane 1036-1 is distinct and non-parallel to Bragg plane 1036-2. In some embodiments, Bragg planes 1036-1 and 1036-2 have distinct curvatures. In some embodiments, Bragg planes 1036-1 and 1036-2 have a corresponding curvature.

Figure 10G:
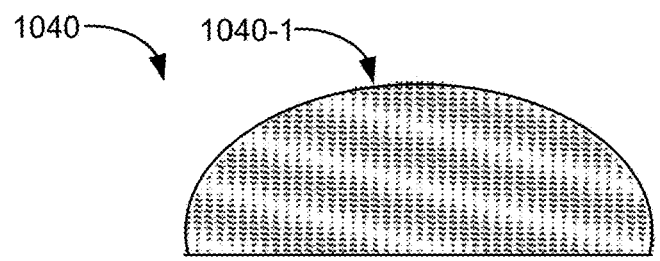
FIG. 10G illustrates a reflective PVH element having a curved surface in accordance with some embodiments.

FIG. 10G illustrates reflective PVH element 1040 having a curved surface in accordance with some embodiments. In some embodiments, reflective PVH element 1040 corresponds to reflective PVH element 1010 except that reflective PVH element 1040 includes one or two curved surfaces (e.g., a non-flat surface such as surface 1040-1). In some embodiments, curved surface 1040-1 has a concave, convex, spherical, aspherical, meniscus, free-form, or other non-flat shape.

Figure 11A:
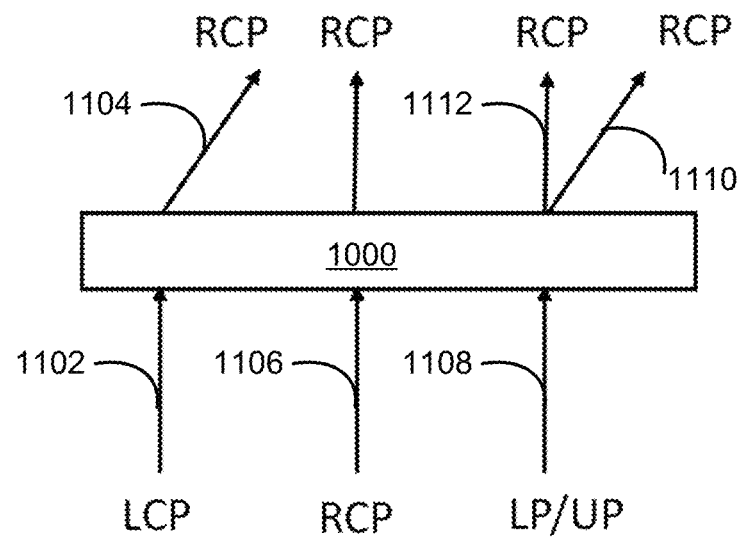
FIG. 11A illustrates operation of a transmissive polarization volume holographic element in accordance with some embodiments.
Figure 11B:
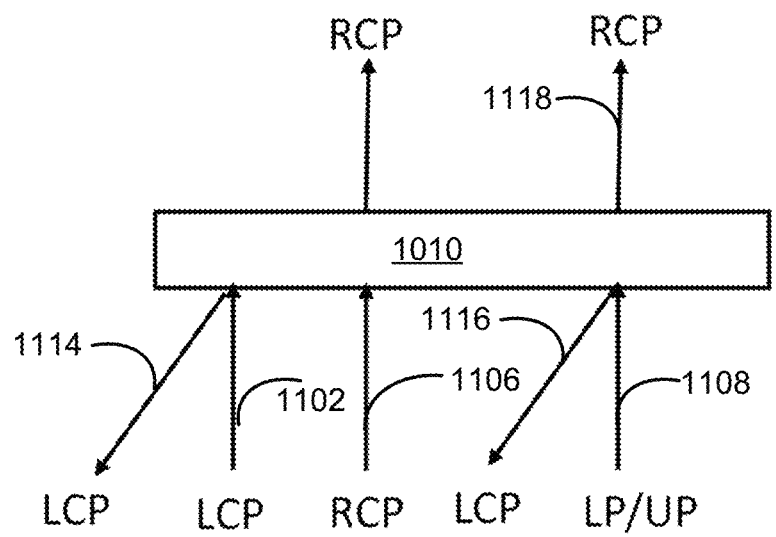
FIG. 11B illustrates operation of a reflective polarization volume holographic element in accordance with some embodiments.

FIGS. 11A and 11B illustrate operations of transmissive PVH element 1000 and reflective PVH element 1010 in accordance with some embodiments. As described above, PVH elements, such as transmissive PVH element 1000 and reflective PVH element 1010, are selective with respect to polarization of light incident thereon. In addition, the PVH elements may be selective with respect to incident angle and/or wavelength range of the incident light. For example, when state (handedness) of a circularly polarized light matches the handedness of a helical pattern of the PVH, the circularly polarized light is redirected (e.g., reflected, refracted or diffracted) by the PVH element. Concurrently, while changing the direction of the light, a transmissive PVH element also changes the polarization of the light. In contrast, while changing the direction of the light, a reflective PVH element maintains the polarization of the light. In some embodiments, a PVH element is configured to redirect (e.g., diffract or reflect) light having a first polarization while transmitting light having a second polarization distinct from the first polarization while maintaining its direction (e.g., without redirecting the light). For example, the PVH element may redirect light having the first polarization corresponding to right-handed circular polarization (RCP) and transmit light having the second polarization corresponding to left-handed circular polarization (LCP), or vice versa.

In FIG. 11A, transmissive PVH element 1000 is configured for interacting with light having a first circular polarization (e.g., LCP). In such embodiments, light 1102 having LCP, when incident upon LCP transmissive PVH element 1000, is redirect as light 1104, and the polarization of the light is converted from LCP to RCP (e.g., light 1104 has RCP). In contrast, light 1106 having RCP, when incident upon LCP transmissive PVH element 1000, is transmitted without changing its direction and while maintaining its polarization. Light 1108 corresponding to linearly polarized (LP) light or un-polarized light (UP) is divided into two components by LCP transmissive PVH element 1000. A first portion of light 1108 having LCP is redirected as light 1110 with RCP and a second portion of light 1108 having RCP is transmitted as light 1112 without changing its direction and while maintaining its polarization. In some embodiments, transmissive PVH element 1000 having the slanted configuration described with respect to FIG. 10A may redirect approximately 99% of incident light 1102 (having the corresponding circular polarization) as light 1104. Similarly, transmissive PVH element 1000 may redirect approximately 49% of linearly polarized or unpolarized light 1108 as light 1110. Although FIG. 11A illustrates operation of transmissive PVH element 1000 configured for interacting with LCP light, transmissive PVH element 1000 configured for interacting with RCP light operates in an analogous manner. Such details are not repeated herein for brevity.

In FIG. 11B, reflective PVH element 1010 is configured for interacting with light having the first circular polarization (e.g., LCP). In such embodiment, light 1102 having LCP is redirected (e.g., reflected or reflectively diffracted) as light 1114. The polarization of the reflected light 1114 remains as LCP. In contrast, a conventional reflector (e.g., a mirror) converts the polarization of a circularly polarized light upon reflection (e.g., LCP light is reflected into RCP light). Light 1106 having RCP is transmitted without changing its direction and while maintaining its polarization. Light 1108 corresponding to linearly polarized (LP) light or un-polarized (UP) light is divided into two components by reflective PVH element 1010. A first portion of light 1108 having LCP component of light 1108 is redirected (e.g., reflected) as light 1116 having LCP and a second portion of light 1108 having RCP is transmitted as light 1118 without changing its direction while maintaining its polarization. In some embodiments, reflective PVH element 1010 having the slanted configuration described with respect to FIG. 10B may redirect approximately 99% of incident light 1102 (having the corresponding circular polarization) as light 1114. Similarly, reflective PVH element 1010 may redirect approximately 49% of linearly polarized or unpolarized light 1108 as light 1116. Although FIG. 11B illustrates operation of reflective PVH element 1000 configured for interacting with LCP light, reflective PVH element 1000 configured for interacting with RCP light operates in an analogous manner. Such details are not repeated herein for brevity.

Figure 11C:
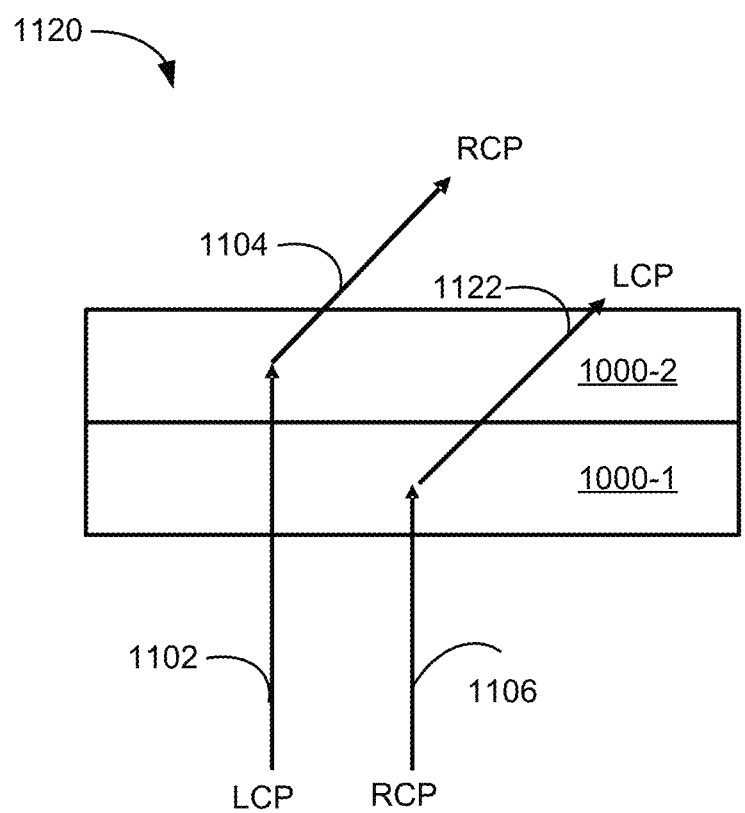
FIG. 11C illustrates an operation of a stack of transmissive polarization volume hologram elements in accordance with some embodiments.

FIG. 11C illustrates an operation of stack 1120 of transmissive PVH elements 1000 in accordance with some embodiments. As described above with respect to FIG. 8, two or more PVH elements can be stacked together (e.g., two, three, four, five, etc.). For example, two or more PVH elements with distinct properties are positioned adjacent to each other to form a single optical component. In some embodiments, each of the two or more PVH elements includes anisotropic elements arranged in distinct patterns. In FIG. 11C, stack 1120 of PVH elements includes transmissive PVH elements 1000-1 and 1000-2. In some embodiments, transmissive PVH element 1000-1 is configured to interact with light having a first polarization (e.g., RCP) while transmitting light having a second polarization distinct from (e.g., orthogonal to) the first polarization (e.g., LCP). In some embodiments, transmissive PVH element 1000 -2 is configured to interact with light having the second polarization (e.g., LCP) while transmitting light having the first polarization (e.g., RCP). Additionally, in some embodiments, at least transmissive PVH element 1000-2 is selective with respect to an incident angle of the incident light. For example, a transmissive optical element redirects light having an incident angle within a particular incident angle range while transmitting light having an incident angle outside the particular incident angle range. In some embodiments, transmissive PVH elements 1000-1 and 1000-2 are selective with respect to a wavelength of the incident light. For example, a transmissive optical element redirects light having a wavelength within a particular wavelength range while transmitting light having a wavelength outside the particular wavelength range. FIG. 11C shows that light 1102 having LCP and light 1106 having RCP impinge on stack 1120 of PVH elements. Transmissive PVH element 1000-1 is configured to transmit light 1102 having LCP without changing its polarization or direction while redirecting light 1106 having RCP as light 1122. Transmissive PVH element 1000-1 further converts the polarization of light 1106 from RCP to LCP so that light 1122 has LCP. Transmissive PVH element 1000-2 is configured to redirect light 1102 having LCP as light 1104. Transmissive PVH element 1000-2 further converts the polarization of light 1102 from LCP to RCP so that light 1104 has RCP. Transmissive PVH element 1000-2 is positioned to receive the light 1122 having LCP passed through transmissive PVH element 1000-1. However, in some implementations, light 1122 impinges on transmissive PVH element 1000-2 at an incident angle outside of the incident angle range for transmissive PVH element 1000-2. Therefore, transmissive PVH element 1000-2 does not interact with light 1122 and light 1122 is transmitted through transmissive PVH element 1000-2 while maintaining its polarization and direction.

In some embodiments, three of more PVH elements are stacked together for redirecting light with distinct parameters. For example, a stack may include a first PVH element (e.g., transmissive PVH element 1000-1) for redirecting light with a first wavelength range (e.g., green light) while transmitting light having a wavelength outside the first wavelength range, a second PVH element (e.g., transmissive PVH element 1000-2) for redirecting light with a second wavelength range (e.g., red light) while transmitting light having a wavelength outside the second wavelength range, and a third PVH element for redirecting light with a third wavelength range (e.g., blue) while transmitting light having a wavelength outside the third wavelength range. In some embodiments, a stack of PVH elements includes reflective PVH elements (e.g., reflective PVH elements 1010 described with respect to FIG. 10B).

Figure 11D:
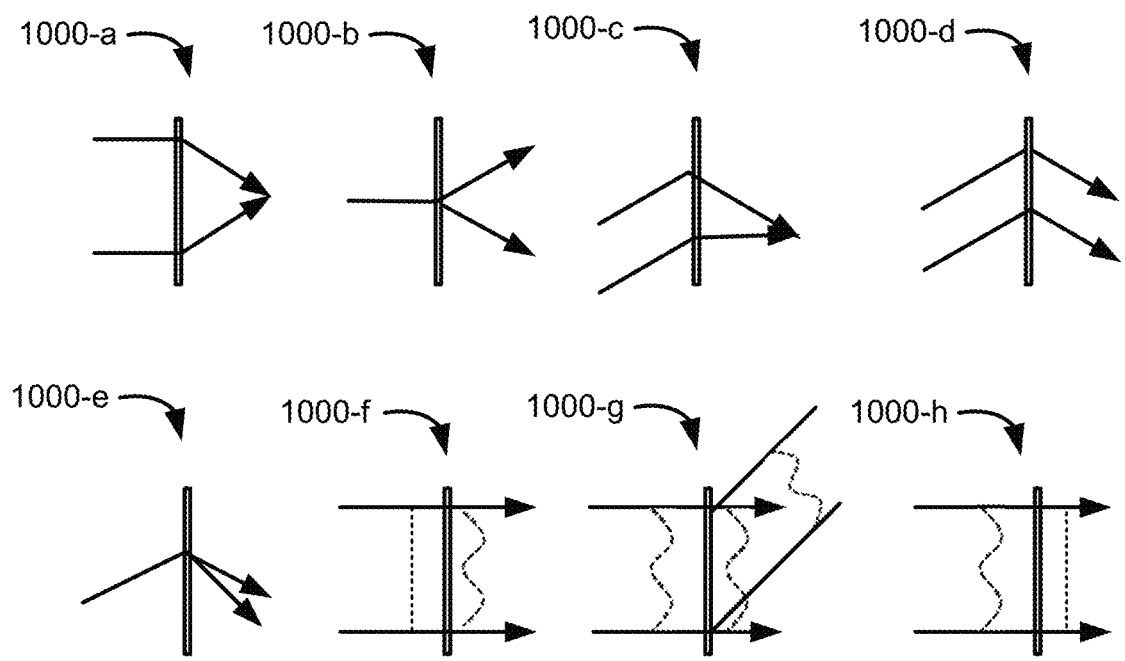
FIG. 11D illustrates different configurations of polarization volume holographic elements and their applications in accordance with some embodiments.

FIG. 11D illustrates different configurations of PVH elements and their applications in accordance with some embodiments. In FIG. 11D, the applications are illustrated with respect to a transmissive PVH element (e.g., transmissive PVH element 1000 described with respect to FIG. 11A) but it is understood that reflective PVH elements may be used for similar applications.

In FIG. 11D, transmissive PVH element 1000-*a* is a lens that converges or diverges light. In some embodiments, transmissive PVH element 1000-*a* is a spherical lens, an aspherical lens, a freeform lens, a concave lens, a convex lens, an axicon lens, or a positive or negative meniscus lens. The lens may be an on-axis lens or an off-axis lens. Transmissive PVH element 1000-*b* is a beam splitter (e.g., a polarization or wavelength selective beam splitter). For example, a beam splitter divides an incident beam into distinct portions based on polarization, wavelength range, or incident angle range. Transmissive PVH element 1000-*c* is used in an optical scanner. For example, an optical scanner refers to a device that receives image information and translates the image information to a digital information. Transmissive PVH element 1000-*d* is a deflector or a grating. For example, a deflector or a grating redirects light without converging or diverging the light. Transmissive PVH element 1000-*e* is a disperser configured to disperse incident light (e.g., based on chromaticity of the incident light). Transmissive PVH element 1000-*f* is an aspheric wavefront modulator. For example, an aspheric wavefront modifier is applied to an optical system to modify a wavefront of the transmitted light (e.g., to compensate for wavefront distortion caused by other optical elements). Transmissive PVH element 1000-*g* is a wavefront sampler configured to redirect a portion of incident light while maintaining the wavefront of the redirected light. Transmissive PVH element 1000-*h* is a null corrector (e.g., an optical element applicable for testing and/or adjusting aspherical optical components). The PVH elements described herein may be fabricated in different sizes. In some embodiments, any of the PVH elements described herein has at least one dimension (e.g., a diameter) of few centimeters (e.g., 1, 2, 3, 4, 5, or more centimeters). In some embodiments, any of the PVH elements described herein is a micro-sized optical element having at least one a dimension (e.g., diameter) ranging from one micrometer to hundreds of micrometers (e.g., 2, 3, 4, 5, 6, 7, 8, 9, 10, 20, 30, 40, 50, 60, 70, 80, 90, 100, 200, 300, 400, 500, 600, 700, 800, 900, or an interval between any two of the aforementioned values). Also, any of the PVH elements described herein may be configured to form an array (e.g., microlens arrays, micrograting arrays, microdeflector arrays, etc.). The PVH elements described herein may be fabricated to have different shapes (e.g., circular, rectangular, square, polygonal, or freeform shapes).

Figure 12:
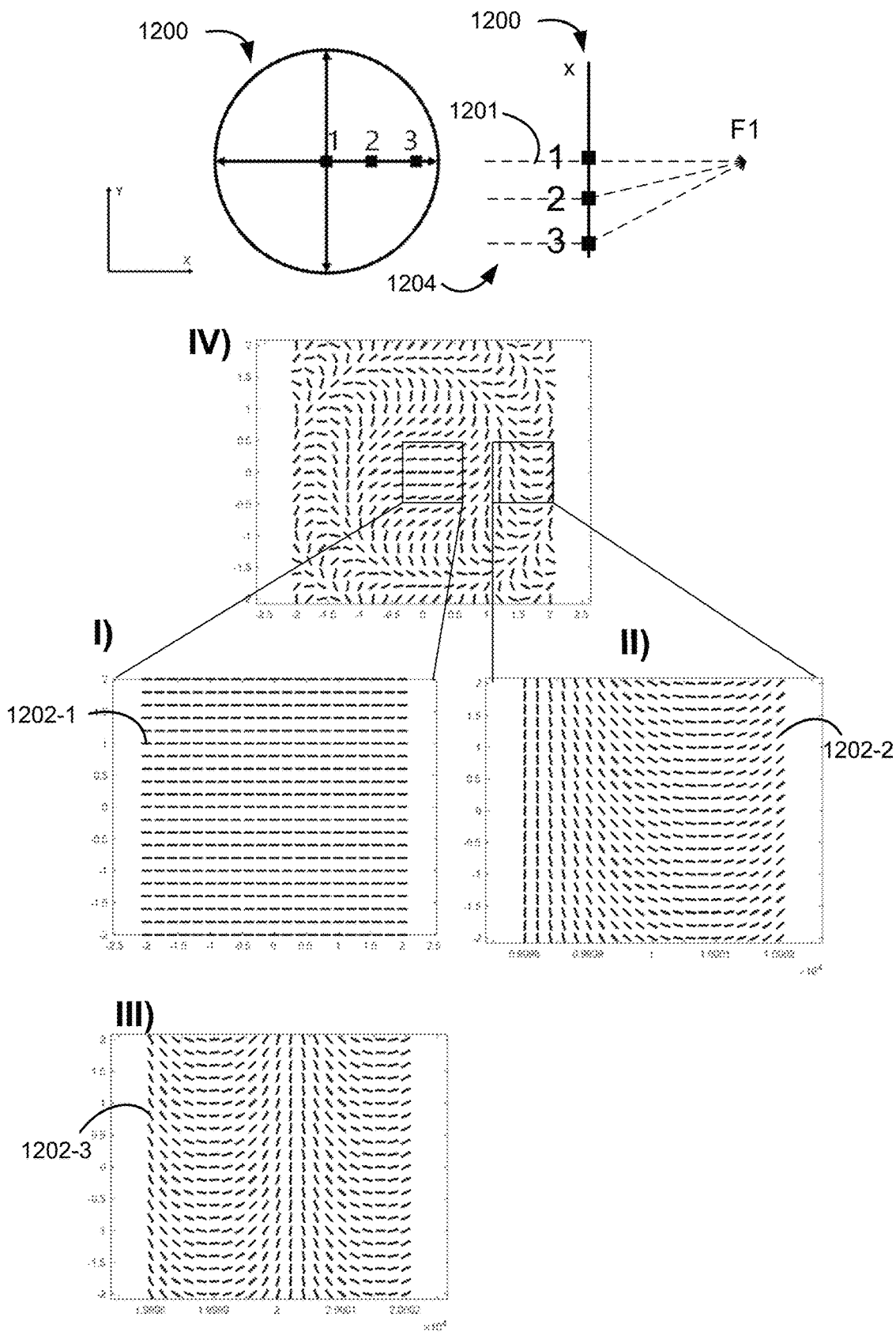
FIG. 12 illustrates a spherical polarization volume holographic lens in accordance with some embodiments.

FIG. 12 illustrates spherical PVH lens 1200 in accordance with some embodiments. In some embodiments, PVH lens 2000 is a transmissive lens including anisotropic components (e.g., anisotropic components 1202) arranged in cycloidal patterns as described above with respect to FIG. 10A. PVH lens 1200 includes a plurality of regions (e.g., regions 1, 2, and 3 shown in the front and cross-sectional views of PVH lens 1200 in FIG. 12) having the anisotropic components arranged in distinct cycloidal patterns. Region 1 is positioned at a center (e.g., a geometric center) of PVH lens 1200. Optical axis 1201, of PVH lens 1200, that is perpendicular to a plane defined by PVH lens 1200 passes through region 1. Region 2 is positioned at a first distance from the center of PVH lens 1200 and region 3 is positioned at a second distance from the center of PVH lens 1200 greater than the first distance. In some embodiments, region 1 includes anisotropic components 1202-1 arranged in a first pattern (e.g., as shown in Section I), region 2 includes anisotropic components 1202-2 arranged in a second pattern (e.g., as shown in Section II), and region 3 includes anisotropic components 1202-3 arranged in a third pattern (e.g., as shown in Section III). Section IV shows the first pattern shown in Section I, at least a portion of the second pattern shown in Section II, and the transition between the two patterns. The first pattern, the second pattern, and the third pattern are distinct from each other. As shown, region 1 shown in Section I has anisotropic components 1202-1 aligned substantially linearly. Region 1 transmits light passing through region 1 while maintaining its direction (e.g., light propagating along optical axis 1201 prior to impinging on spherical PVH lens 1200 continues to propagate along optical axis 1201 after being transmitted through spherical PVH lens 1200). The cycloidal pattern of region 2 shown in Section II has a first Bragg plane and the cycloidal pattern of region 3 shown in Section III has a second Bragg plane distinct from the first Bragg plane. In particular, the first Bragg plane and the second Bragg plane define distinct angles with respect to a plane defined by PVH lens 1200 (e.g., respective local Bragg planes define distinct angles with respect to reference plane AA' described with respect to FIG. 10A). Thus, regions 2 and 3 are configured to redirect portions of incident light (e.g., incident light 1204) in distinct directions so that light 1204 incident upon PVH lens 1200 is focused at a common focal point (e.g., focal point F1). As shown in the cross-sectional view of PVH lens 1200, region 1 transmits a portion of light 1204 (incident upon region 1) along optical axis 1201 without changing direction of the light, region 2 redirects a portion of light 1204 (incident upon region 2) in a first direction toward focal point F1, and region 3 redirects a portion of light 1204 (incident upon region 3) in a second direction toward focal point F1.

PVH lens 1200 may be fabricated in different sizes. In some embodiments, PVH lens 1200 has a diameter of few centimeters (e.g., 1, 2, 3, 4, 5, or more centimeters). In some embodiments, PVH lens 1200 is a microlens having a diameter ranging from one micrometer to hundreds of micrometers.

Section IV of FIG. 12 illustrates an alignment pattern of a microlens corresponding to PVH lens 1200. As shown, an alignment pattern of the anisotropic components varies across a surface of PVH lens 1200.

A phase profile Φ (representing an orientation of an anisotropic component) of a spherical PVH lens 1200 across its area of the spherical PVH lens 1200 across the surface of the spherical PVH lens 1200 is defined by Equation (5):

$$\Phi = \frac{\pi(x^2 + y^2)}{2 \times f \times \lambda} \qquad \text{(Equation 5)}$$

where f is a focal length of the lens, x and y correspond to a distance from a geometric center of the lens in x- and y-directions along a plane defined by the lens, respectively, and λ is a wavelength of an incident light (e.g., an incident light having a wavelength within a wavelength range that a respective PVH lens is designed to redirect).

Figure 13:
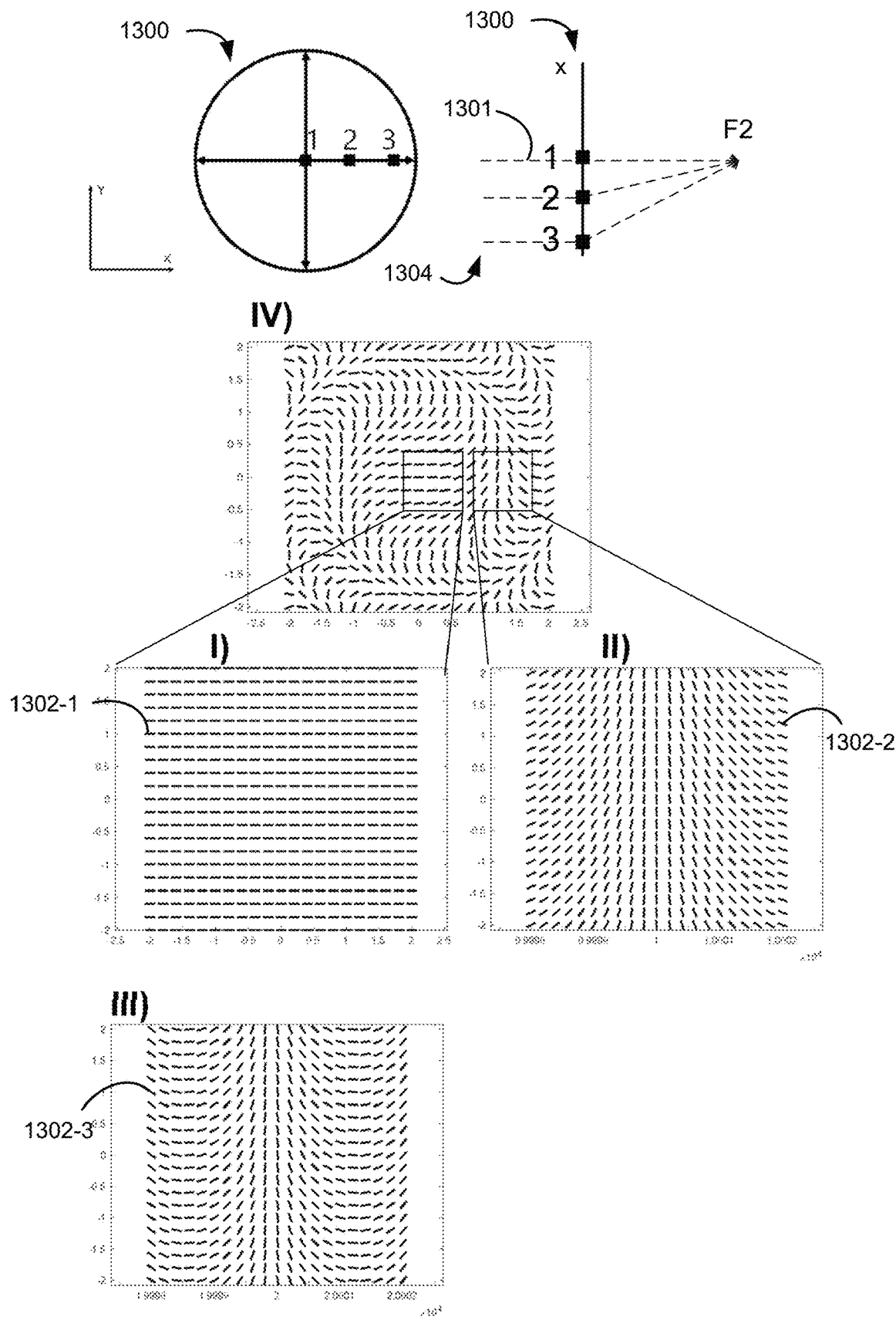
FIG. 13 illustrates an aspherical polarization volume holographic lens in accordance with some embodiments.

FIG. 13 illustrates aspherical PVH lens 1300 in accordance with some embodiments. In some embodiments, PVH lens 1300 is a transmissive lens including anisotropic components (e.g., anisotropic components 1302) arranged in cycloidal patterns as described above with respect to FIG. 10A. In comparison to the spherical PVH lens 1200 described with respect to FIG. 12, PVH lens 1300 has an aspherical phase profile. In some embodiments, an aspherical lens is used instead of a spherical lens to reduce spherical aberrations. PVH lens 1300 includes a plurality of regions (e.g., regions 1, 2, and 3 shown in the front and cross-sectional views of PVH lens 1300 in FIG. 13) having the anisotropic components arranged in distinct cycloidal patterns. Region 1 is positioned at a center (e.g., geometric center) of PVH lens 1300. Optical axis 1301, of PVH lens 1300, that is perpendicular to a plane defined by PVH lens 13200 passes through region 1. Region 2 is positioned at a first distance from the center of PVH lens 1300 and region 3 is positioned at a second distance from the center of PVH lens 1300 greater than the first distance. In some embodiments, region 1 includes anisotropic components 1302-1 arranged in a first pattern (e.g., as shown in Section I), region 2 includes anisotropic components 1302-2 arranged in a second pattern (e.g., as shown in Section II), and region 3 includes anisotropic components 1302-3 arranged in a third pattern (e.g., as shown in Section III). Section IV shows the first pattern shown in Section I, at least a portion of the second pattern shown in Section II, and the transition between the two patterns. The first pattern, the second pattern, and the third pattern are distinct from each other. As explained above with respect to FIG. 12, the pattern of region 1 shown in Section I includes anisotropic components aligned substantially linearly and thus, region 1 transmits light while maintaining its direction. The cycloidal pattern of region 2 shown in Section II has a first Bragg plane and the cycloidal pattern of region 3 shown in Section III has a second Bragg plane distinct from the first Bragg plane. In particular, the first Bragg plane and the second Bragg plane define distinct angles with respect to a plane defined by PVH lens 1300 (e.g., respective local Bragg planes define distinct angles with respect to reference plane AA' described with respect to FIG. 10A). Thus, regions 2 and 3 are configured to redirect incident light (e.g., incident light 1304) in distinct directions so that the light 1304 incident upon PVH lens 1300 is focused at a common focal point (e.g., focal point F2). As shown in the cross-sectional view of PVH lens 1300, region 1 transmits a portion of light 1304 (incident upon region 1) along optical axis 1301 without changing direction of the light, region 2 redirects a portion of light 1304 (incident upon region 2) in a first direction toward focal point F2, and region 3 redirects a portion of light 1304 (incident upon region 3) in a second direction toward focal point F2.

It is noted that regions 2 and 3 of aspherical PVH lens 1300 have distinct cycloidal patterns from respective regions 2 and 3 of spherical PVH lens 1200 described with respect to FIG. 10A. Region 1 of the aspherical PVH lens 1300 may include a pattern similar to the region 1 of spherical PVH lens 1200.

In some embodiments, PVH lens 1300 has a diameter of few centimeters (e.g., 1, 2, 3, 4, 5, or more centimeters). In some embodiments, PVH lens 1300 is a microlens having a diameter ranging from one micrometer to hundreds of micrometers.

A phase profile Φ (representing an orientation of an anisotropic component) of an aspherical PVH lens 1300 along a cross-section of the aspheric PVH lens 1300 across the surface of the aspheric PVH lens 1300 is defined by Equation (6):

$$\Phi = \frac{\pi(\sqrt{x^2 + y^2 + f^2} - f)}{\lambda} \qquad \text{(Equation 6)}$$

where f is a focal length of the lens, x and y correspond to a distance from a geometric center of the lens in x- and y-directions along a plane defined by the lens, respectively, and λ is a wavelength of an incident light.

Figure 14:
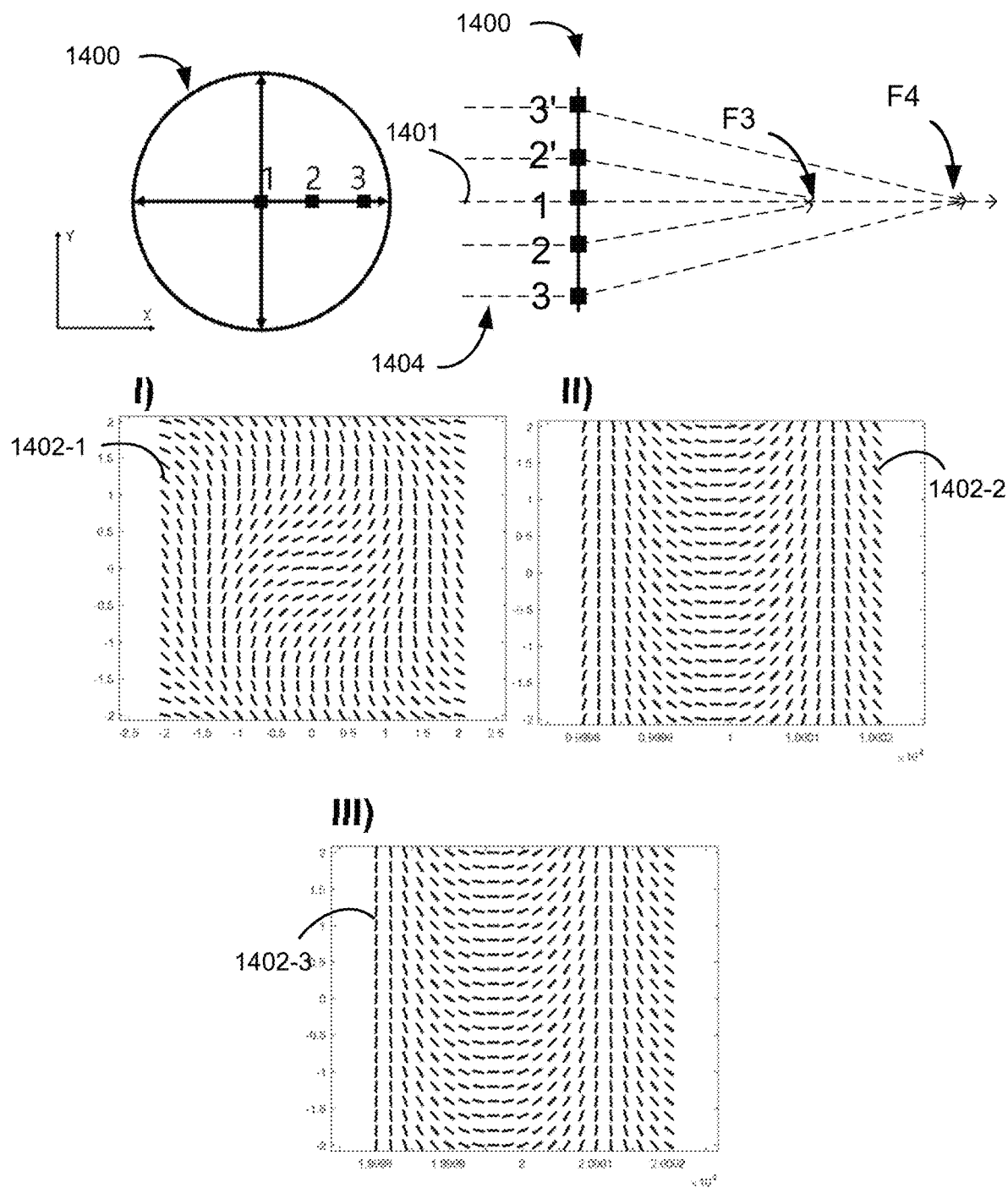
FIG. 14 illustrates a polarization volume holographic axicon in accordance with some embodiments.

FIG. 14 illustrates PVH axicon 1400 in accordance with some embodiments. An axicon refers to a lens having a conical phase profile. An axicon lens is configured to generate an annular light distribution, which is constant along an optical axis of the axicon over a focal distance range. For example, a first portion of light impinging on a first portion of an axicon lens at a first distance from a geometric center of the axicon lens is focused at a first focal distance while a second portion of light impinging on a second portion of the axicon lens at a second distance, greater than the first distance, from the geometric center of the axicon lens is focused at a second focal distance greater than the first focal distance. The first focal distance and the second focal distance belong to a continuous range of focal distances defined by the axicon lens.

In some embodiments, PVH axicon 1400 is a transmissive lens including anisotropic components (e.g., anisotropic components 1402) arranged in cycloidal patterns as described above with respect to FIG. 10A. PVH axicon 1400 includes a plurality of regions (e.g., regions 1, 2, and 3 shown in the front and cross-sectional views of PVH axicon 1400 in FIG. 14) having the anisotropic components arranged in cycloidal patterns. Region 1 is positioned at a center (e.g., geometric center) of PVH axicon 1400 and optical axis 1401 of PVH axicon 1400 passes through region 1. Region 2 is positioned at a first distance from the center of PVH axicon 1400 and region 3 is positioned at a second distance, greater than the first distance, from the center of PVH axicon 1400. In some embodiments, region 1 includes anisotropic components 1402-1 arranged in a first pattern (e.g., as shown in Section I). In an instance of an axicon, region 2 includes anisotropic components 1401-2 and region 3 includes anisotropic components 1402-3 arranged in a second cycloidal pattern (e.g., as shown in Sections II and III). The second pattern includes the anisotropic components arranged in cycloidal patterns. The cycloidal pattern of regions 2 and 3 define Bragg planes (e.g., local Bragg planes) and thus, regions 2 and 3 are configured to redirect incident light (e.g., incident light 1404) in a common direction so that a portion of light 1404 incident upon region 2 of PVH axicon 1400 interacts with an optical axis (e.g., optical axis 1401) at focal point F3 while a portion of light 1404 incident upon region 3 of PVH axicon 1400 interacts with the optical axis at focal point F4. Focal point F4 is further away from PVH axicon 1400 than focal point F3. If it noted that regions 2' and 3', positioned at the same distance from optical axis 1401 of PVH axicon 1400 as regions 2 and 3 but on an opposite side of the optical axis, respectively, also have anisotropic components arranged in a common pattern. The pattern of regions 2' and 3' corresponds to a mirror image of the pattern of regions 2 and 3, thereby making PVH axicon axisymmetric.

A conical phase profile Φ of a PVH axicon lens 1400 along a cross-section of the PVH axicon lens 1400 across the surface of the PVH axicon lens 1400 is defined by Equation (7):

$$\Phi = \sqrt{x^2 + y^2} \times \frac{\sin(\beta)}{\lambda} \times \pi \quad \text{(Equation 7)}$$

where x and y correspond to a distance from a geometric center of the lens in x- and y-directions along a plane defined by the lens, respectively, β corresponds to an angle defined by an optical axis and light redirect by the axicon (e.g., angle defined by optical axis 1401 and light 1404 after being redirected by PVH axicon 1400), and λ is a wavelength of an incident light.

It is noted that although FIGS. 12-14 describe transmissive lenses, spherical, aspherical, and axicon lenses may be fabricated as reflective lenses including slanted helical patterns described with respect to FIG. 10B.

Figure 15A:
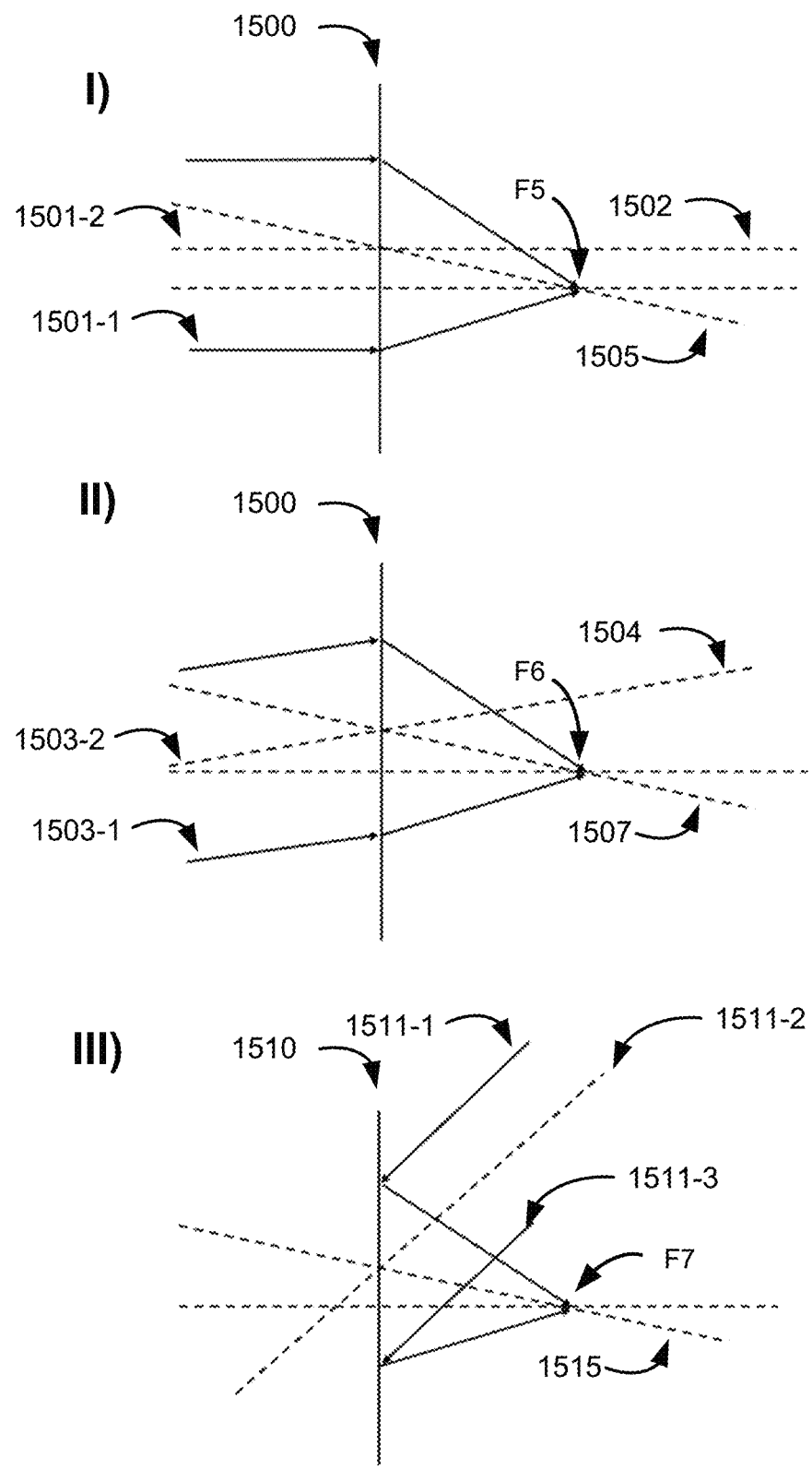
FIG. 15A illustrates operation of off-axis lenses in accordance with some embodiments.

FIG. 15A illustrates operation of off-axis lenses in accordance with some embodiments. The PVH elements illustrated in FIGS. 12-14 illustrated symmetric (on axis) lenses having an optical axis perpendicular to a plane defined by the lens and passing through a geometric center of the lens. In some embodiments, PVH elements are fabricated to operate as off-axis lenses (e.g., off-axis spherical, aspherical, or axicon lenses). An off-axis lens refers to a lens having an optical axis non-perpendicular to a plane defined by the lens.

Section I of FIG. 15A illustrates an operation of transmissive PVH off-axis lens 1500. In some embodiments, PVH off-axis lens 1500 includes anisotropic components arranged in cycloidal patterns as described above with respect to FIG. 10A. In some embodiments, PVH off-axis lens 1500 defines an axis (e.g., axis 1505) that is non-perpendicular to a plane (e.g., reference plane AA' in FIG. 10A) defined by PVH off-axis lens 1500. For example, the axis 1505 is non-perpendicular to a surface of PVH off-axis lens 1500 having a flat shape. In some embodiments, axis 1505 passes through a geometric center of PVH off-axis lens 1500. In some embodiments, off-axis lens 1500 is configured to redirect (e.g., focus) light (e.g., both central ray 1501-2 and marginal ray 1501-1) propagating in a direction perpendicular to the plane defined by PVH off-axis lens 1500 (e.g., propagating along central ray axis 1502) and impinging on PVH off-axis lens 1500 to focal point F5 along axis 1505.

Section II of FIG. 15A illustrates PVH off-axis lens 1500 redirecting (e.g., focusing) light (e.g., both central ray 1503-2 and marginal ray 1503-1) propagating in a direction non-perpendicular to the plane defined by PVH off-axis lens 1500 (e.g., propagating along central ray axis 1504) and impinging on PVH off-axis lens 1500 to focal point F6 along axis 1507. The axis 1507 is non-perpendicular to a surface of PVH off-axis lens 1500 having a flat shape. In some embodiments, axis 1507 passes through a geometric center of PVH off-axis lens 1500.

Section III of FIG. 15A illustrates an operation of reflective PVH off-axis lens 1510. In some embodiments, reflective PVH off-axis lens 1510 includes anisotropic components arranged in helical patterns as described above with respect to FIG. 10B. Reflective PVH off-axis lens 1510 defines axis 1515 that is non-perpendicular to a plane (e.g., plane DD' in FIG. 10B) defined by reflective PVH off-axis lens 1510. For example, the axis 1515 is non-perpendicular to a surface of PVH off-axis lens 1510 having a flat shape (e.g., a disc shape). As shown, reflective PVH off-axis lens 1510 is configured to redirect (e.g., reflect or reflectively diffract) light (e.g., both central ray 1511-2 and marginal rays 1511-1 and 1511-3) impinging on a surface of reflective PVH off-axis lens 1510 toward focal point F7 on the axis 1515.

Figure 15B:
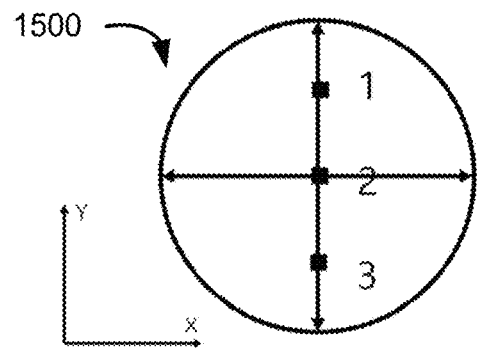
FIG. 15B illustrates a transmissive polarization volume holographic off-axis lens in accordance with some embodiments.
Figure 15B:
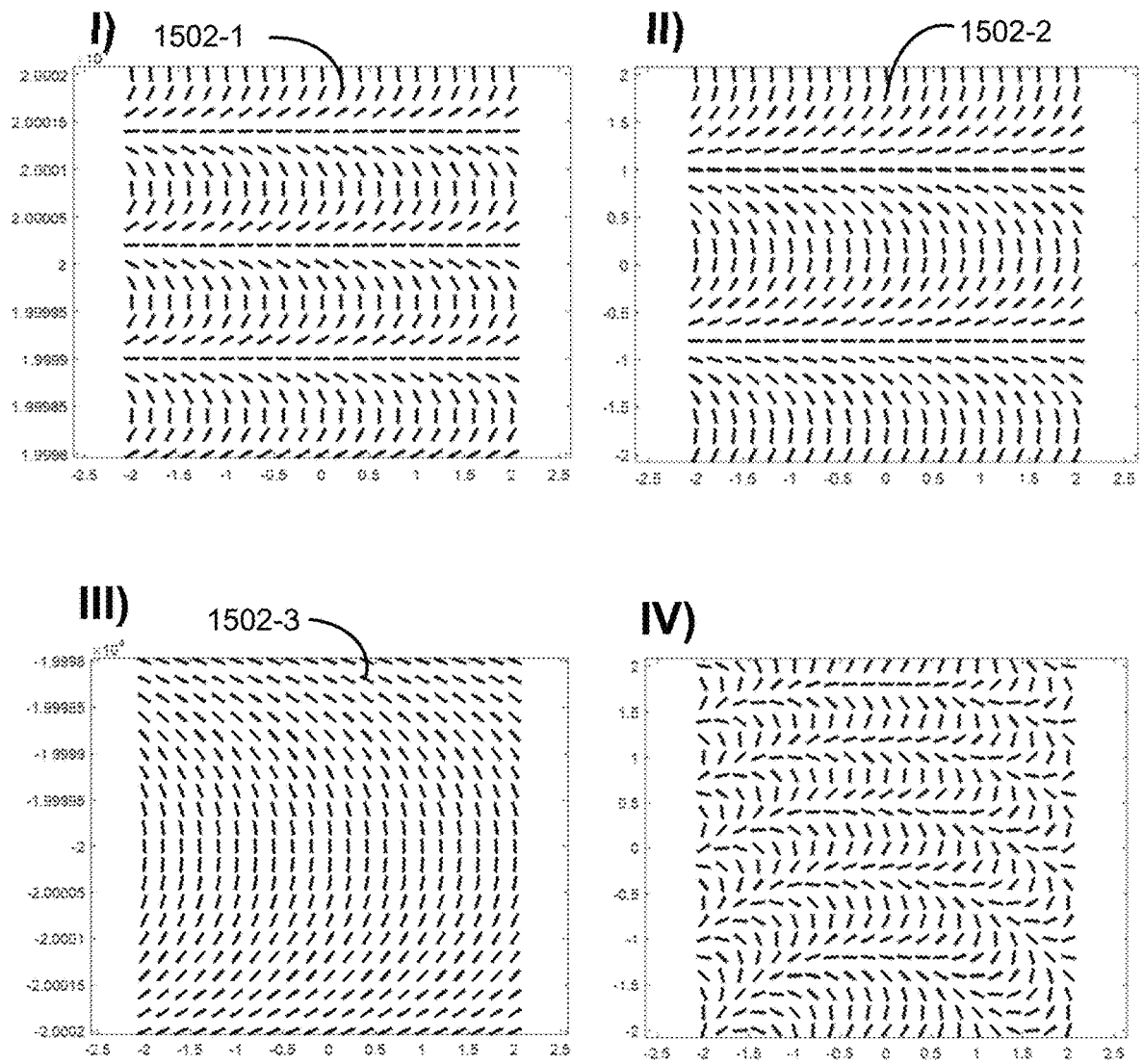

FIG. 15B illustrates transmissive PVH off-axis lens 1500 in accordance with some embodiments. In some embodiments, PVH off-axis lens 1500 is a transmissive lens including anisotropic components (e.g., anisotropic components 1202) arranged in cycloidal patterns as described above with respect to FIG. 10A. PVH off-axis lens 1500 includes a plurality of regions (e.g., regions 1, 2, and 3 shown in the front and cross-sectional views of PVH off-axis lens 1500 in FIG. 15B) having the anisotropic components arranged in distinct cycloidal patterns. In FIG. 15B, region 2 is positioned at a geometric center of PVH off-axis lens 1500 and an optical axis of PVH off-axis lens 1500 passes through region 1. As described above, an off-axis lens redirects a central ray along an axis non-perpendicular to a plane defined by the lens. Regions 1 and 3 are positioned at a first distance from the geometric center of PVH off-axis lens 1500 on opposite sides of the geometric center (e.g., regions 1 and 3 correspond to geometrically asymmetric positions on PVH off-axis lens 1500). In some embodiments, region 1 includes anisotropic components 1502-1 arranged in a first cycloidal pattern (e.g., as shown in Section I), region 2 includes anisotropic components 1502-2 arranged in a second cycloidal pattern (e.g., as shown in Section II), and region 3 includes anisotropic components 1502-3 arranged in a third cycloidal pattern (e.g., as shown in Section III). The first pattern, the second pattern, and the third pattern are distinct from each other. In some embodiments, the cycloidal pattern of region 1 shown in Section I has a first Bragg plane, the cycloidal pattern of region 2 shown in Section II has a second Bragg plane, and the cycloidal pattern of region 3 shown in Section III has a third Bragg plane. In some embodiments, the first Bragg plane, the second Bragg plane, and the third Bragg plane are distinct from one another and define distinct angles with respect to a plane defined by PVH off-axis lens 1500 (e.g., respective local Bragg planes define distinct angles with respect to reference plane AA' described with respect to FIG. 10A). Thus, regions 1, 2 and 3 are configured to redirect portions of incident light in distinct directions so that light incident upon PVH off-axis lens 1500 is focused at a common focal point that is not located on an optical axis of the PVH off-axis lens 1500 (e.g., as shown in Sections I and II of FIG. 15A).

It is noted that region 2 shown in Section II corresponding to the geometric center of PVH off-axis lens 1500 includes anisotropic components 1502-2 arranged in a cycloidal pattern to redirect light. In comparison, a center region of an on-axis lens may not include anisotropic components arranged in cycloidal patterns (or weakly cycloidal pattern, such as region 1 of PVH lens 1200 in FIG. 12). As a further distinction from a symmetric on-axis lens, regions 1 and 3 positioned symmetrically with respect to the geometric center of PVH off-axis lens 1500 have anisotropic components arranged in distinct patterns that are not mirror images of each other (e.g., PVH off-axis lens 1500 is an asymmetric lens). Regions 1 and 3 are configured to redirect incident light toward a common off-axis focal point (e.g., focal point F5 in Section I of FIG. 15A).

In some embodiments, PVH off-axis lens 1500 has a diameter of few centimeters (e.g., 1, 2, 3, 4, 5, or more centimeters). In some embodiments, PVH off-axis lens 1500 is a microlens having a diameter ranging from one micrometer to a few hundred micrometers. Section IV of FIG. 15B illustrates an alignment pattern of a transmissive off-axis microlens, having a diameter of 4 microns and a focal length of 3 microns, where the focal point is offset from an optical axis by 3 microns.

An alignment pattern of the anisotropic components varies across a surface of PVH off-axis lens 1500. A phase profile Φ a spherical PVH off-axis lens 1500 along a cross-section of spherical PVH off-axis lens 1500 is defined by Equation (8):

$$\Phi = \frac{\pi\left(\sqrt{(x-xf)^2 + (y-yf)^2 + f^2} - f\right)}{\lambda} \quad \text{(Equation 8)}$$

where f is a focal length of the lens, x and y correspond to a distance from a geometric center of the lens in the x- and y-directions along a plane defined by the lens, respectively, xf and yf correspond to a distance from a geometric axis to the focal point in the x- and y-directions, respectively, and λ is a wavelength of an incident light.

Figure 15C:
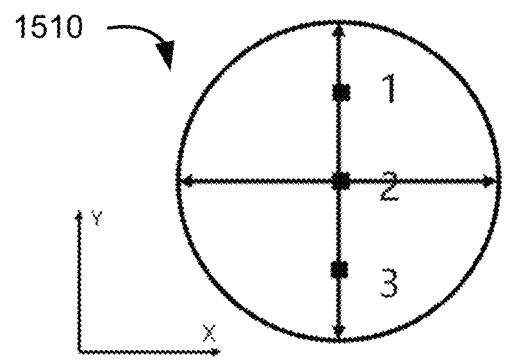
FIG. 15C illustrates a reflective polarization volume holographic off-axis lens in accordance with some embodiments.
Figure 15C:
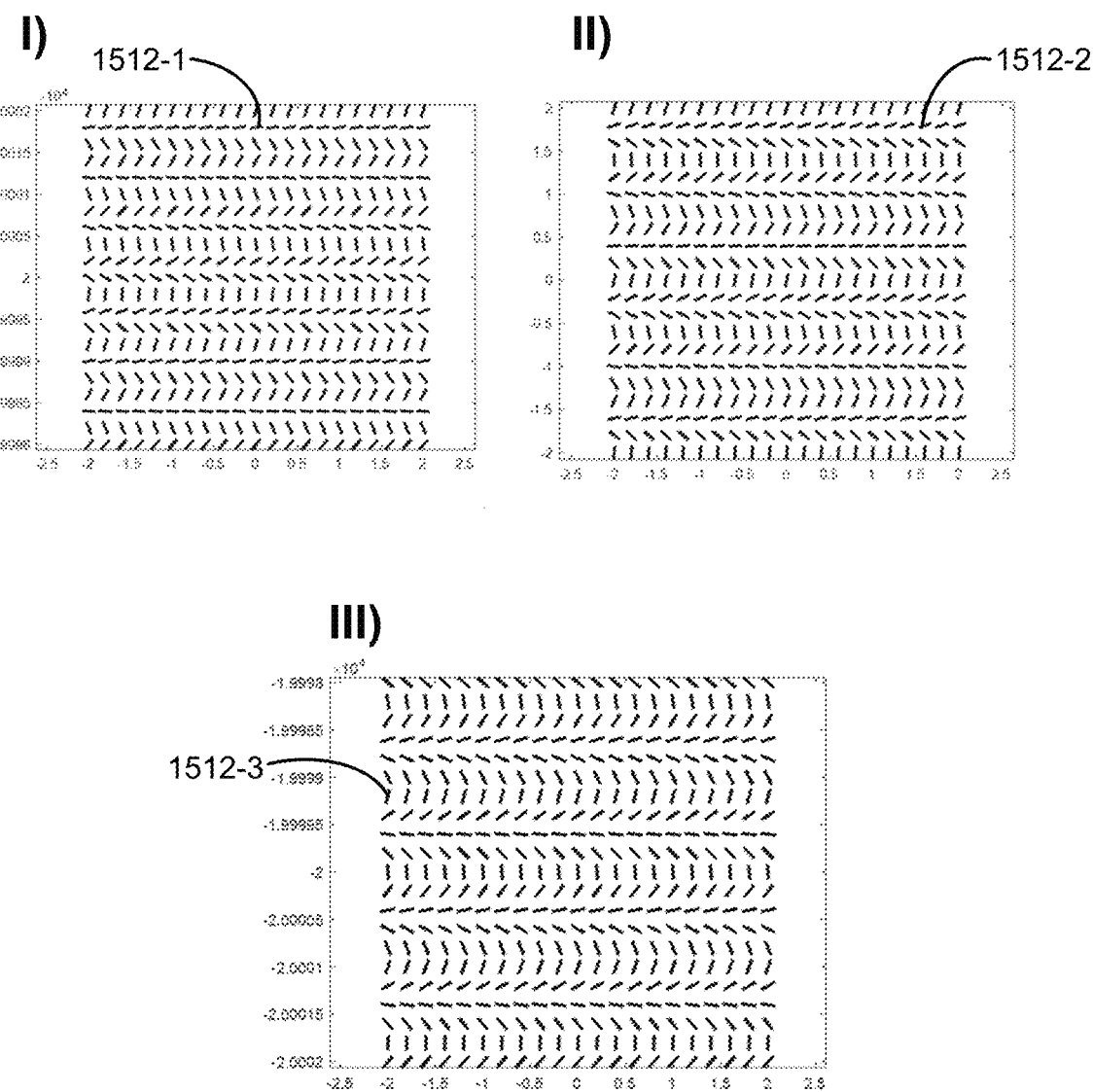

FIG. 15C illustrates reflective PVH off-axis lens 1510 in accordance with some embodiments. In some embodiments, reflective PVH off-axis lens 1510 is a reflective lens including anisotropic components (e.g., anisotropic components 1512) arranged in helical patterns as described above with respect to FIG. 10B. Reflective PVH off-axis lens 1510 includes a plurality of regions (e.g., regions 1, 2, and 3 shown in the front view of reflective PVH off-axis lens 1510 in FIG. 15C) having the anisotropic components arranged in distinct helical patterns. In FIG. 15C, region 2 is positioned at a geometric center of reflective PVH off-axis lens 1510 and an optical axis of PVH off-axis lens 1510 passes through region 1. Regions 1 and 3 are positioned at a first distance from the geometric center of reflective PVH off-axis lens 1510 on opposite sides of the geometric center (e.g., regions 1 and 3 correspond to geometrically asymmetric positions on PVH off-axis lens 1510). In some embodiments, region 1 includes anisotropic components 1512-1 arranged in a first helical pattern (e.g., as shown in Section I), region 2 includes anisotropic components 1512-2 arranged in a second helical pattern (e.g., as shown in Section II), and region 3 includes anisotropic components 1512-3 arranged in a third helical pattern (e.g., as shown in Section III). The first helical pattern, the second helical pattern, and the third helical pattern are distinct from each other. The anisotropic components of regions 1, 2, and 3 define distinct Bragg planes (e.g., local Bragg planes). The helical pattern of region 1 shown in Section I defines a first Bragg plane, the helical pattern of region 2 shown in Section II defines a second Bragg plane, and the helical pattern of region 3 shown in Section III defines a third Bragg plane. The first Bragg plane, the second Bragg plane, and the third Bragg plane define distinct angles with respect to a plane defined by reflective PVH off-axis lens 1510 (e.g., reference plane DD' in described with respect to FIG. 10B). Thus, regions 1, 2 and 3 are configured to redirect incident light in distinct directions so that light incident upon PVH off-axis lens 1510 is focused at a common focal point (e.g., as shown in Section III of FIG. 15A).

In some embodiments, an optical element have distinct regions of patterned isotropic component that contribute to distinct features of the optical element. In some embodiments, such regions are arranged adjacent to each other (e.g., like a checkerboard). In some embodiments, one or more regions of such optical element are fabricated by the methods described above with respect to FIG. 7.

In some embodiments, two or more of PVH elements described herein can be arranged in an array (e.g., an array of lenses, an array or gratings, an array of beam splitters, etc.). In some embodiments, the array corresponds to a microarray. For example, any of the lenses described with respect to FIGS. 12-15C can be used to form a lens array or a microlens array. In some embodiments, the array includes one type of PVH elements described herein (e.g., a transmissive aspherical lens array or a reflective off-axis lens array). In some embodiments, the array includes two or more type of PVH elements described herein (e.g., an alternating arrangement of a transmissive aspheric lens and a transmissive off-axis lens).

Figure 16:
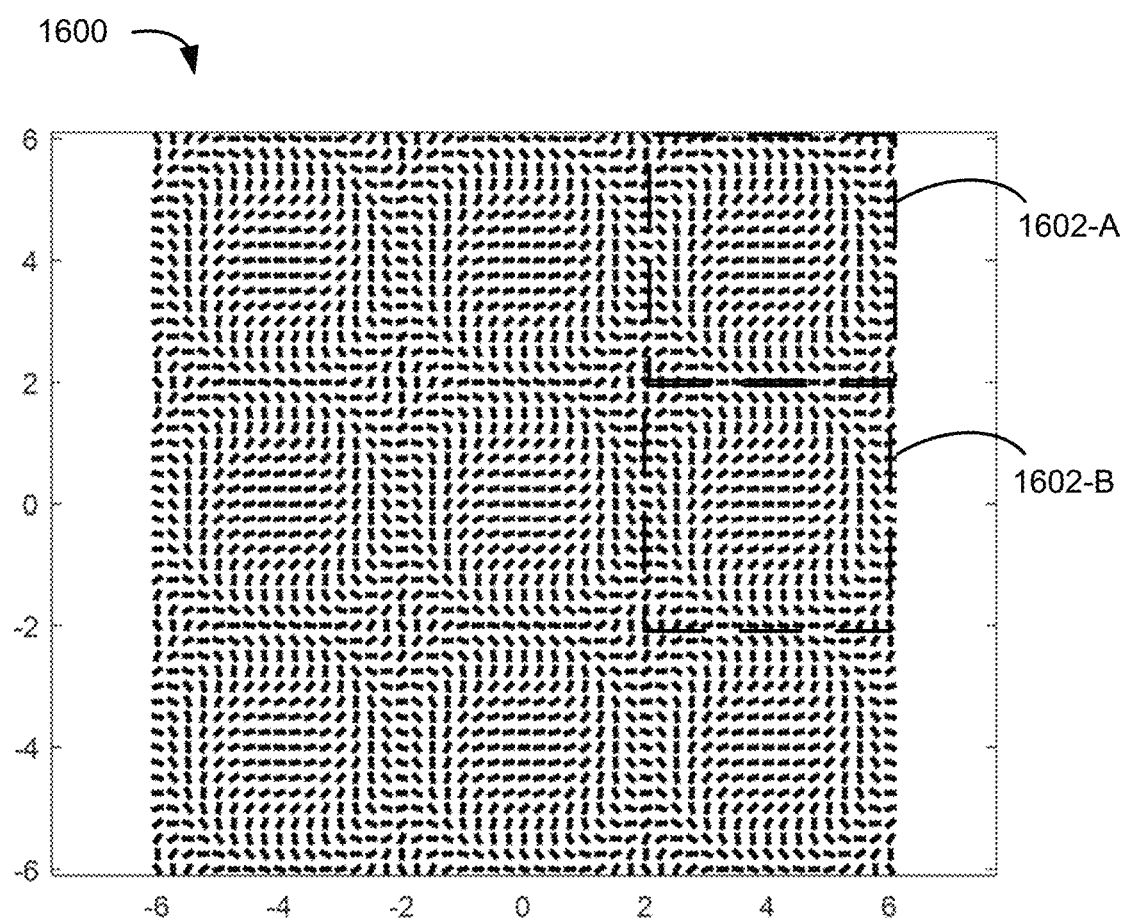
FIG. 16 illustrates a polarization volume holographic lens array in accordance with some embodiments.

FIG. 16 illustrates PVH lens array 1600 in accordance with some embodiments. PVH lens array 1600 includes nine portions (e.g., portion 1602-A, portion 1602-B, etc.) having anisotropic components arranged in identical patterns. In some embodiments, the patterns of portions 1602-A and 1602-B correspond to a spherical lens (e.g., PVH lens 1200 described above with respect to FIG. 12), and PVH lens array 1600 may form an array of nine spherical PVH lenses arranged in a 3×3 array. Portion 1602-A defines a first optical axis and portion 1602-B defines a second optical axis that is parallel to, and distinct from, the first optical axis (e.g., the first optical axis and the second optical axis do not intersect). In some embodiments, PVH lens array 1600 is a microlens array so that each portion 1602 of PVH lens array 1600 has a diameter ranging from a few micrometers to hundreds of micrometers.

Figure 17A:
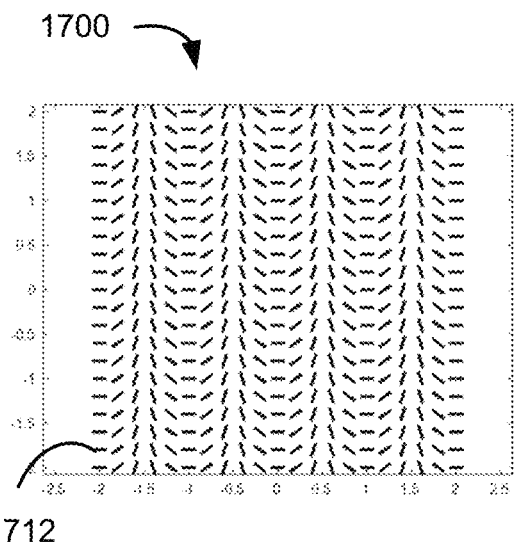
FIGS. 17A-17B illustrate polarization volume holographic deflectors in accordance with some embodiments.
Figure 17B:
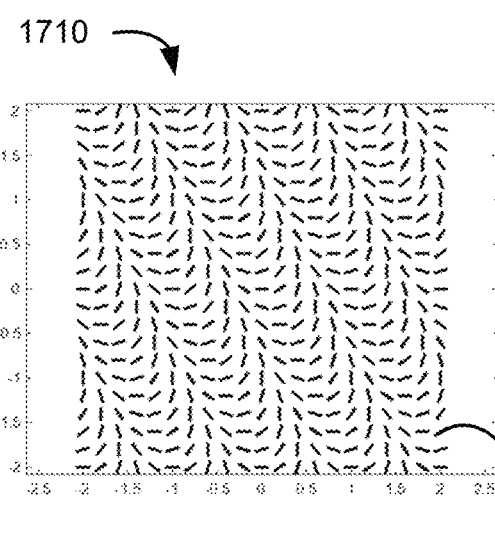

FIGS. 17A-17B illustrate PVH deflectors in accordance with some embodiments. A deflector (or a beam deflector) refers to an optical component that is capable of redirecting incident light.

In some embodiments, the PVH deflectors of FIGS. 17A and 17B include anisotropic components (e.g., anisotropic components 1712) arranged in cycloidal patterns as described above with respect to FIG. 10A. FIG. 17A illustrates PVH deflector 1700 having anisotropic components 1712 arranged in a first cycloidal pattern. The first cycloidal pattern defines a first Bragg plane and PVH deflector 1700 is configured to redirect light to a first direction. FIG. 17B illustrates PVH deflector 1710 having anisotropic components 1712 arranged in a second cycloidal pattern that is distinct from the first cycloidal pattern illustrated in FIG. 17A. The second cycloidal pattern defines a second Bragg plane and PVH deflector 1710 is configured to redirect light to a second direction that is distinct from the first direction.

Figure 17C:
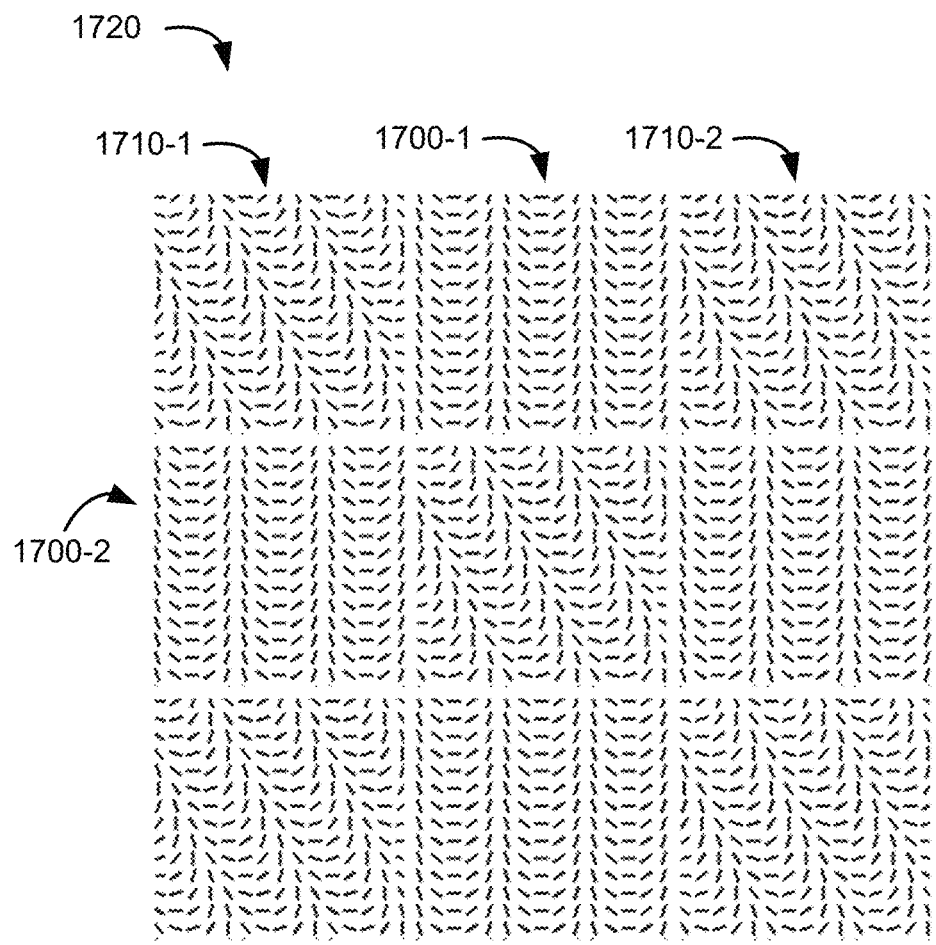
FIG. 17C illustrates polarization volume holographic deflector array in accordance with some embodiments.

In some embodiments, a deflector (or a beam deflector) includes a first portion redirecting a first portion of incident light in a first direction and a second portion distinct from the first portion redirecting a second portion of incident light also in the first direction (e.g., the first portion and the second portion are parallel to each other after being redirected by the deflector). In some embodiments, a deflector corresponds to a grating. FIG. 17C illustrates PVH deflector array 1720 in accordance with some embodiments. PVH deflector array 1720 includes a plurality of PVH deflectors 1700 (e.g., PVH deflectors 1700-1 and 1700-2) and 1710 (e.g., PVH deflectors 1710-1 and 1710-2) positioned adjacent to each other. In some embodiments, PVH deflectors 1700 and 1710 are positioned sequentially. For example, PVH deflector 1700-1 is disposed between PVH deflectors 1710-1 and 1710-2. In some embodiments, PVH deflectors 1700 and 1710 are arranged alternatingly so that they form a checkerboard array, as shown in FIG. 17C. In some embodiments, the cycloidal patterns of PVH deflectors 1700 and 1710 are discrete from each other (e.g., the cycloidal patterns of PVH deflectors 1700 and 1710 are discontinuous). PVH deflectors 1700 are configured to redirect light in the first direction and PVH deflectors 1710 are configured to redirect light in the second direction that is distinct from the first direction.

Due to the versatility of the PVH fabrication methods described with respect to FIGS. 3-7, PVH optical elements with anisotropic components arranged in a variety of patterns can be fabricated. In addition to PVH elements having the patterns described with respect to FIGS. 10A-17C, PVH elements with freeform waveforms (e.g., PVH elements having non-linear, non-parabolic phase profiles) can be achieved. Such components may be used as wavefront modifiers to form non-uniform and/or asymmetric wavefronts.

Figure 18A:
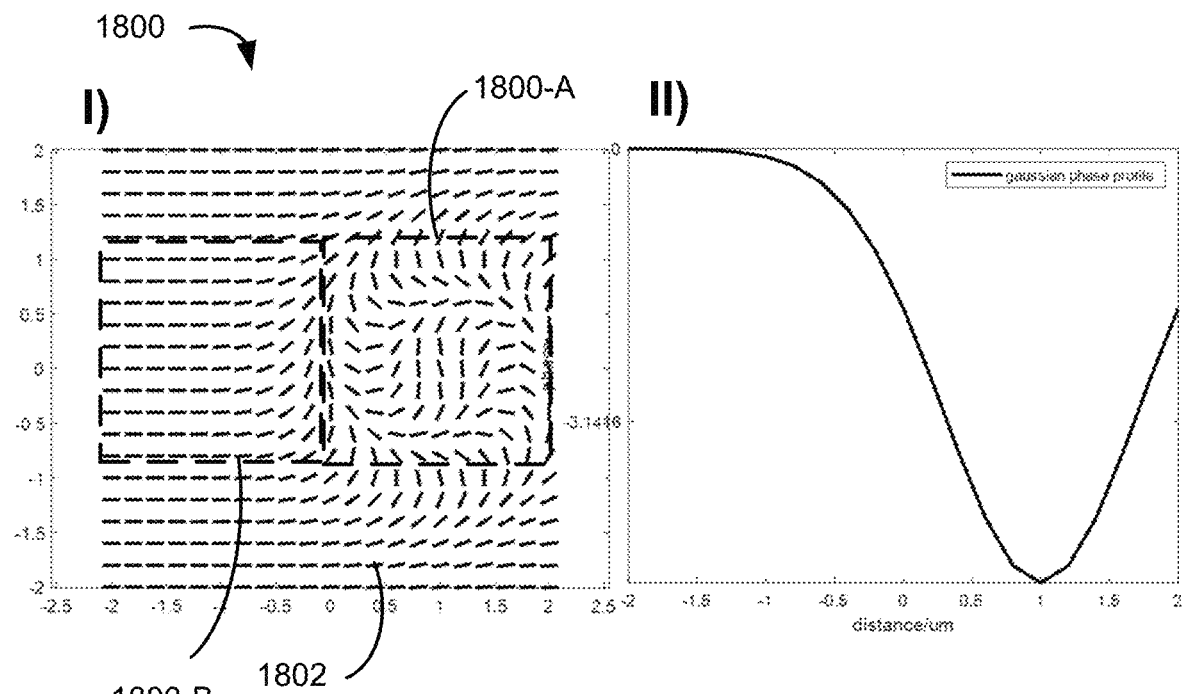
FIGS. 18A-18B illustrate polarization volume holographic wavefront modifiers in accordance with some embodiments.
Figure 18B:
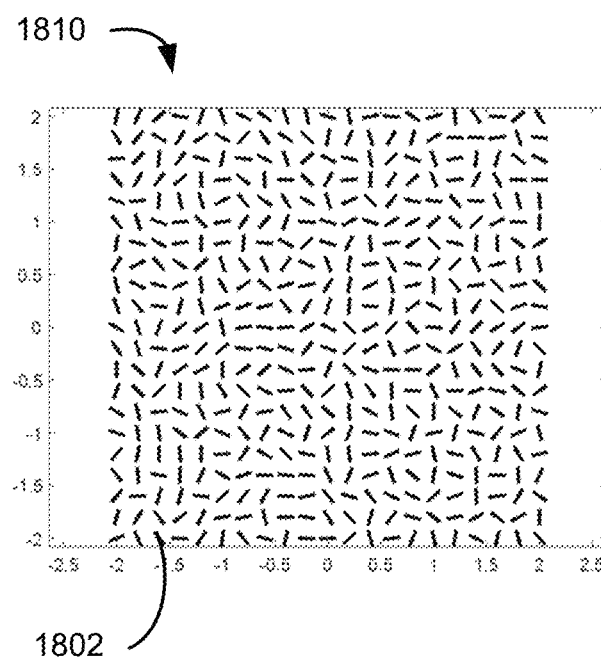

FIGS. 18A-18B illustrate PVH wavefront modifiers in accordance with some embodiments. Section I of FIG. 18A illustrates PVH wavefront modifier 1800 having first portion 1800-A including anisotropic components 1802 arranged in a first pattern (e.g., a cycloidal pattern) and second portion 1800-B including anisotropic components 1802 arranged in a second pattern that is distinct from the first pattern. In Section I of FIG. 18A, at least a portion of the pattern of portion 1800-B includes linearly arranged anisotropic components 1802. As shown, portion 1800-B is adjacent to portion 1800-A and the linear pattern of portion 1800-B changes to the cycloidal pattern of portion 1800-A gradually and continuously so that a phase profile of PVH wavefront modifier is continuous, as shown in Section II of FIG. 18A.

FIG. 18B is yet another example of a PVH wavefront modifier. PVH wavefront modifier 1810 in FIG. 18B includes anisotropic components 1802 arranged in an alignment pattern across an area of PVH wavefront modifier 1810. Wavefront modifiers, such as PVH wavefront modifiers 1800 and 1810, may be used for changing a wavefront of an incident light in a variety of ways.

In some embodiments, PVH elements, such as those described with respect to FIGS. 10A-18B, are operable in two or more states. In some embodiments, a PVH element includes liquid crystals (e.g., anisotropic components 1002 described with respect to FIG. 10A) that are switchable between different states by applying a different electric field. For example, the first voltage is applied (e.g., zero voltage is applied) while the PVH element is in a first state, and the liquid crystals are arranged in cycloidal or helical patterns as described with respect to FIGS. 10A and 10B, respectively. While the PVH element is in the first state, the liquid crystals redirect light having a matching polarization handedness. While the PVH element is in a second state, a second voltage is applied (e.g., a non-zero voltage is applied) across the liquid crystals and the liquid crystals having a rod-like shape are aligned linearly along with the applied voltage. For example, while the PVH element is in the second state, the liquid crystals are in a homeotropic configuration. In a homeotropic configuration, liquid crystals having the rod-like shape align perpendicular to a substrate supporting the respective liquid crystal. While the PVH element is in the second state, the liquid crystals cease to redirect light and instead transmit light without changing its polarization or direction, regardless of polarization, incident angle or wavelength of the light.

In some embodiments, a PVH element operating in the two or more states includes a surface alignment layer (e.g., alignment layers 210 and 211 in FIGS. 2A and 2B, respectively). In some embodiments, a PVH element operating in the two or more states includes one or more chiral dopants that enable self-orientation of the liquid crystals to form slanted cycloidal or helical patterns when no voltage is applied across the PVH element. In some embodiments, the alignment layer is a structured (e.g., grooved or patterned) surface. In some embodiments, the alignment layer includes a photoalignment layer. The alignment layer provides a surface anchoring energy that forces the liquid crystals to align in a desired direction (e.g., to form slanted helical or cycloidal patterns) on the alignment layer, when no voltage is applied (e.g., while the PVH element is in the first state). The alignment further extends into the bulk material thereby forming PVH elements described, e.g., with respect to FIGS. 10A-10B. In some embodiments, the one or more chiral dopants, when present, further assist in alignment of the liquid crystals to form the helical patterns.

Figure 19A:
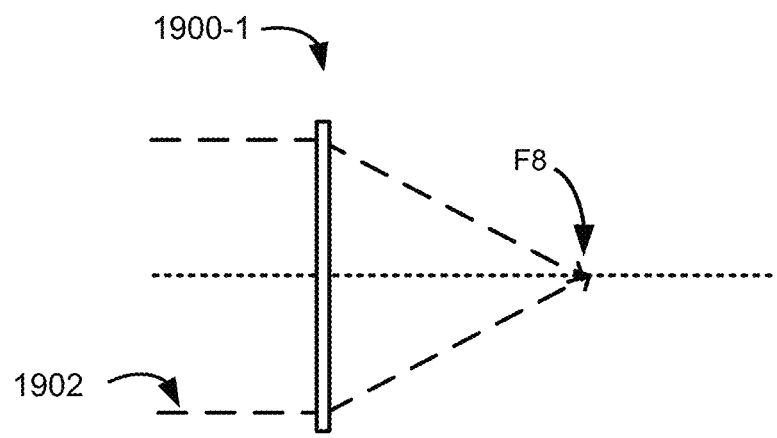
FIGS. 19A-19B illustrate operation of a tunable polarization volume holographic element in accordance with some embodiments.
Figure 19B:
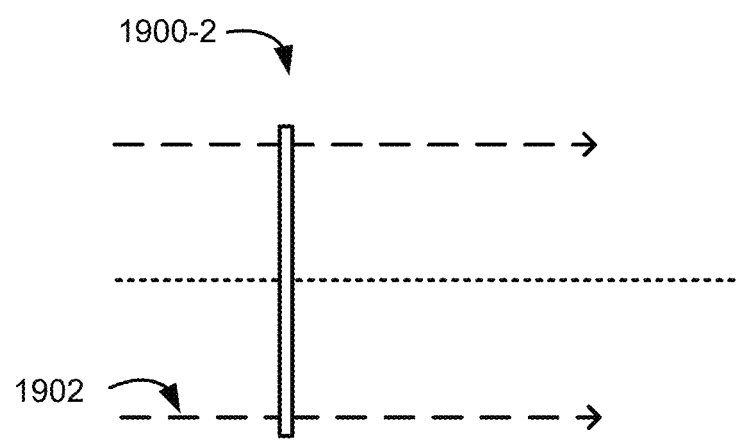

FIGS. 19A-19B illustrate operation of tunable PVH element 1900 in accordance with some embodiments. In some embodiments, PVH element 1900 corresponds to PVH lens 1200 described above with respect to FIG. 12. In FIG. 19A, PVH element 1900 is in the first state (e.g., indicated as PVH element 1900-1). While PVH element 1900 is in the first state, no voltage is applied across PVH element 1900-1. While PVH element 1900 is in the first state, PVH element 1900-1 is configured to redirect light 1902 having a matching polarization handedness toward focal point F8. In FIG. 19B, a voltage has been applied across PVH element 1900 and PVH element 1900 is in the second state (e.g., indicated as PVH element 1900-2). While PVH element 1900 is in the second state, the liquid crystals of PVH element 1900-2 are aligned in accordance with the electric field generated by the applied voltage. While PVH element 1900 is in the second state, PVH element 1900-2 does not redirect light 1902 and therefore light 1902 is transmitted while maintaining its polarization and direction.

In some embodiments, PVH element 1900 is operable in a plurality states for focusing light at distinct focal distances. For example, while PVH element 1900 is in a third state, PVH element 1900 is configured to redirect light 1902 toward a first focal point (e.g., the first focal point being distinct from focal point F8, such as located further away from, or closer to, PVH element 1900 than focal point F8) and while PVH element 1900 is in a fourth state, PVH element 1900 is configured to redirect light 1902 toward a second focal point (e.g., the second focal point being distinct from focal point F8 and the first focal point). In some embodiments, such effect of a tunable focal distance is achieved by a surface alignment and electric field design. In some embodiment, such effect of the tunable focal distance is achieved with a stack of two or more PVH elements (e.g., stack 1120 in FIG. 11C) that are individually switchable. For example, a stack includes a first PVH element and a second PVH element that are operable in the first and second state independently (e.g., no voltage is applied across the first PVH element in a first state while concurrently a voltage is applied across the second PVH element in a second state). For example, when the first PVH element and the second PVH element are both in the first state, the stack of PVH elements redirects light toward a first focal distance. When the first PVH element is in the second state and the second PVH element is in the first state, the stack of PVH elements redirects the light toward a second focal distance. When the first PVH element is in the first state and the second PVH element is in the second state, the stack of PVH elements redirects the light toward a third focal distance. The first, second, and third focal distances are distinct from each other. When the first PVH element and the second PVH element are both in the second state, the stack of PVH elements does not cause convergence of incident light.

In light of these principles, we now turn to certain embodiments.

In accordance with some embodiments, a first layer of anisotropic material (e.g., transmissive PVH element 1000 FIG. 10A or reflective PVH element 1010 in FIG. 10B) extends along a first plane (e.g., reference plane AA' in FIG. 10A or reference plane DD' in FIG. 10B) and includes anisotropic components (e.g., anisotropic components 1002 or 1012 in FIGS. 10A and 10B, respectively) being parallel to a second plane non-parallel and non-perpendicular to the first plane. For example, anisotropic components 1002 are parallel to reference plane BB' that is non-parallel and non-perpendicular to reference plane AA' in FIG. 10A. Anisotropic components 1012 are parallel to reference plane EE' that is non-parallel and non-perpendicular to reference plane DD' in FIG. 10B. The anisotropic components are arranged in cycloidal or helical patterns (e.g., cycloidal patterns in FIG. 10A or helical patterns in FIG. 10B). The cycloidal or helical patterns define one or more Bragg planes (e.g., Bragg planes 1006 or 1016 in FIGS. 10A and 10B, respectively) that are non-parallel and non-perpendicular to the first plane and either substantially parallel or substantially perpendicular to the second plane. For example, Bragg plane 1006 is substantially perpendicular to plane BB' in FIG. 10A and Bragg plane 1016 is substantially parallel to plane EE' in FIG. 10B. In some embodiments, "substantially parallel" refers to an angle range of +/−15 degrees from parallel (i.e., 0 degree angle) and "substantially perpendicular" refers to an angle range of +/−15 degrees from perpendicular (i.e., 90 degree angle). In some embodiments, the helical patterns define a helical axis (e.g., helical pattern 1014 defines helical axis FF') that is non-parallel and non-perpendicular to the first plane. In some embodiments, the cycloidal patterns define a rotation plane (e.g., a plane along which the anisotropic components roll along such as reference plane BB' in FIG. 10A) that is non-parallel and non-perpendicular to the first plane.

In some embodiments, the optical element is one of: a grating, a lens, a beam splitter, a beam deflector, a disperser, a wavefront modifier, or an optical scanner (e.g., FIG. 11D)

In some embodiments, the anisotropic components are arranged in the cycloidal patterns, the one or more Bragg planes are substantially perpendicular to the second plane, and the optical element is a transmissive optical element (e.g., FIG. 10A).

In some embodiments, the anisotropic components are arranged in the helical patterns, the one or more Bragg planes are substantially parallel to the second plane, and the optical element is a reflective optical element (e.g., FIG. 10B).

In some embodiments, the first layer of anisotropic material includes a first region (e.g., region 2 of PVH lens 1200 in FIG. 12) having anisotropic components arranged in a first cycloidal or helical pattern (e.g., anisotropic components 1202-2 arranged in a cycloidal pattern in Section II of FIG. 12). The first pattern defines a first Bragg plane of the one or more Bragg planes for redirecting a first portion of first light to a first direction (e.g., region 2 redirects a portion of light 1204 toward focal point F1).

In some embodiments, the first layer of anisotropic material also includes a second region (e.g., region 3 of PVH lens 1200 in FIG. 12), distinct from the first region. The second region has anisotropic components arranged in a second cycloidal or helical pattern distinct from the first cycloidal or helical pattern (e.g., anisotropic components 1202-3 arranged in a cycloidal pattern in Section III of FIG. 12). The second pattern defining a second Bragg plane, non-parallel to the first Bragg plane, of the one of more Bragg planes is for redirecting a second portion, distinct from the first portion, of the first light to a second direction distinct from the first direction (e.g., region 3 redirects a portion of light 1204 toward focal point F1).

In some embodiments, the first portion of the first light and the second portion of the first light do not intersect with each other (e.g., transmissive PVH element 1000-*d* in FIG. 11D operating as a deflector or a grating that directs light into non-intersecting directions).

In some embodiments, the first cycloidal or helical pattern is discrete from the second cycloidal or helical pattern (e.g., PVH deflector 1700 is discrete from PVH deflector 1710 in PVH deflector array 1720 in FIG. 17C). For example, the first cycloidal or helical pattern is not continuous to the second cycloidal or helical pattern.

In some embodiments, the first layer of anisotropic material also includes a third region. The third region is distinct from the first region and the second region (e.g., PVH deflector array 1720 includes PVH deflectors 1710-1, 1700-1, and 1710-2). In some embodiments, the third region is not adjacent to the first region (e.g., the second region is located between the first region and the third region). The third region has anisotropic components arranged in a third cycloidal or helical pattern that corresponds to the first cycloidal or helical pattern. The third pattern defines a third Bragg plane of the one of more Bragg planes for redirecting a third portion of the first light to the first direction. The third Bragg plane is parallel to the first Bragg plane and the third portion of the first light is distinct from the first portion and the second portion of the first light.

In some embodiments, respective regions of the first layer of anisotropic material have anisotropic components arranged in cycloidal or helical patterns for redirecting light impinging on the respective regions to intersect at a common focal point (e.g., region 2 of PVH lens 1200 redirects a portion of light 1204 toward focal point F1 and region 3 of PVH lens 1200 redirects a different portion of light 1204 toward focal point F1 in FIG. 12).

In some embodiments, the first region and the second region are located at a first distance from a first axis passing through a geometric center of the optical element (e.g., PVH lens 1200 is a symmetric lens). The first Bragg plane defined by the first region has a first angle relative to the first plane and the second Bragg plane defined by the second region has the first angle relative to the first plane. However, the first Bragg plane and the second Bragg plane may not be parallel to each other (e.g., the first Bragg plane and the second Bragg plane are mirror images of each other).

In some embodiments, the first region is at a first distance from a first axis passing through a geometric center of the optical element and being perpendicular to the first plane. The second region is at a second distance greater than the first distance from the first axis. For example, region 2 of PVH lens 1200 is at a first distance from an axis passing through a geometric center (e.g., optical axis 1201) of PVH lens 1200 in FIG. 12. Region 3 of PVH lens 1200 is at a second distance greater than the first distance from the axis passing through the geometric center. The first Bragg plane defined by the first region has a first angle relative to the first plane and the second Bragg plane defined by the second region has a second angle, distinct from the first angle, relative to the first plane.

In some embodiments, the common focal point is located on a first axis passing through a geometric center of the optical element and being perpendicular to the first plane (e.g., PVH lens 1200 in FIG. 12 is an on-axis lens having optical axis 1201 passing through a geometric center of the lens. The optical axis 1201 is perpendicular to a plane defined by PVH lens 1200, and the focal point of PVH lens 1200 is located on the optical axis 1201).

In some embodiments, the common focal point is located away from a first axis passing through a geometric center of the optical element and being perpendicular to the first plane (e.g., PVH off-axis lens 1500 in FIGS. 15A and 15B is an off-axis lens that is located away from a central ray axis).

In some embodiments, one or more regions (e.g., regions 2 and 2' of PVH axicon 1400 in FIG. 14) of the first layer of anisotropic material have a first distance from a second axis perpendicular to the first plane. The one or more regions have anisotropic components arranged in cycloidal or helical patterns for redirecting light impinging on the one or more regions having the first distance from the second axis to intersect at a first location on the second axis (e.g., a portion of light 1404 redirected by regions 2 and 2' intersect at focal point F3). One or more regions (e.g., regions 3 and 3' of PVH axicon 1400) of the first layer of anisotropic material have a second distance, distinct from the first distance (e.g., greater than the first distance), from the second axis. The one or more regions have anisotropic components arranged in cycloidal or helical patterns for redirecting light impinging on the one or more regions having the second distance from the second axis to intersect at a second location (e.g., focal point F4) distinct from the first location on the second axis (e.g., the first location has a first focal distance to PVH axicon 1400 and the second location has a second focal distance, greater than the first focal distance, to PVH axicon 1400).

In some embodiments, the first layer of anisotropic material includes a plurality of regions with anisotropic components arranged in respective cycloidal or helical patterns (e.g., portions 1800-A and 1800-B of PVH wavefront modifier 1800 in FIG. 18A). Cycloidal or helical patterns of respective regions change continuously from cycloidal or helical patterns of adjacent regions, for modifying a wavefront of the first light.

In some embodiments, the optical element further includes a second layer of anisotropic material extends along the first plane and is optically coupled with the first layer of anisotropic material. The second layer of anisotropic material includes anisotropic components being parallel to the second plane arranged in cycloidal or helical patterns non-parallel and non-perpendicular to the first plane. The cycloidal or helical patterns of the anisotropic material of the second layer of anisotropic material define one or more Bragg planes that are non-parallel and non-perpendicular to the first plane and either substantially parallel or substantially perpendicular to the second plane. For example, stack 1120 of PVH elements in FIG. 11C includes transmissive PVH elements 1000-1 and 1000-2 coupled to each other.

In some embodiments, the first layer of anisotropic material (e.g., transmissive PVH element 1000-1 in FIG. 11C) is for redirecting light having a first wavelength range while transmitting light having a second wavelength range distinct from the first wavelength range. The second layer of anisotropic material (e.g., transmissive PVH element 1000-2) is for redirecting the light having the second wavelength range while transmitting the light having the first wavelength range.

In some embodiments, the first layer of anisotropic material is for redirecting light having a first polarization (e.g., transmissive PVH element 1000-1 in FIG. 11C) while transmitting light having a second polarization that is distinct from the first polarization. The second layer of anisotropic material (e.g., transmissive PVH element 1000-2) is for redirecting the light having the second polarization while transmitting the light having the first polarization.

In some embodiments, the first layer of anisotropic material includes a first portion and a second portion, distinct from and adjacent to, the first portion (e.g., portion 1602-A and portion 1602-B). The anisotropic material in the first portion and the anisotropic material in the second portion have a corresponding alignment pattern.

In some embodiments, the optical element (e.g., tunable PVH element 1900 in FIGS. 19A and 19B) is operable in a plurality of states, including a first state and a second state distinct from the first state. The anisotropic material of the first layer has the anisotropic components arranged in the cycloidal or helical patterns non-parallel and non-perpendicular to the first plane while the optical element is in the first state (e.g., FIG. 19A). The anisotropic material of the first layer does not have the anisotropic components arranged in the cycloidal or helical patterns non-parallel and non-perpendicular to the first plane while the optical element is in the second state (e.g., FIG. 19B). In some embodiments, the anisotropic material of the first layer align in a direction perpendicular to the first plane while the optical element is in the second state.

Although various drawings illustrate operations of particular components or particular groups of components with respect to one eye, a person having ordinary skill in the art would understand that analogous operations can be performed with respect to the other eye or both eyes. For brevity, such details are not repeated herein.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical element, comprising:
a first layer of anisotropic material extending along a first plane and including cycloidal or helical patterns non-parallel and non-perpendicular to the first plane, wherein each cycloidal or helical pattern includes a plurality of discrete anisotropic components, and the cycloidal or helical patterns of the anisotropic material define one or more Bragg planes that are either substantially parallel or substantially perpendicular to the cycloidal or helical patterns.

2. The optical element of claim 1, wherein the optical element is one of: a grating, a lens, a beam splitter, a beam deflector, a disperser, a wavefront modifier, or an optical scanner.

3. An optical element, comprising:
a first layer of anisotropic material extending along a first plane and including cycloidal patterns non-parallel and non-perpendicular to the first plane, wherein the cycloidal patterns of the anisotropic material define one or more Bragg planes that are substantially perpendicular to the anisotropic material defining the cycloidal patterns, and the optical element is a transmissive optical element.

4. An optical element, comprising:
a first layer of anisotropic material extending along a first plane and including helical patterns non-parallel and non-perpendicular to the first plane, wherein the helical patterns of the anisotropic material define one or more Bragg planes that are substantially parallel to the anisotropic material defining the helical patterns, and the optical element is a reflective optical element.

5. The optical element of claim 2, wherein:
the first layer of anisotropic material includes a first region having a first cycloidal or helical pattern, the first pattern defining a first Bragg plane of the one or more Bragg planes for redirecting a first portion of first light to a first direction.

6. The optical element of claim 5, wherein:
the first layer of anisotropic material also includes a second region, distinct from the first region, having a second cycloidal or helical pattern distinct from the first cycloidal or helical pattern, the second pattern defining a second Bragg plane, non-parallel to the first Bragg plane, of the one of more Bragg planes for redirecting a second portion, distinct from the first portion, of the first light to a second direction distinct from the first direction.

7. The optical element of claim 6, wherein:
the first portion of the first light and the second portion of the first light do not intersect with each other.

8. The optical element of claim 6, wherein:
the first layer of anisotropic material also includes a third region, distinct from the first region and the second region, having a third cycloidal or helical pattern that corresponds to the first cycloidal or helical pattern, the third pattern defining a third Bragg plane, parallel to the first Bragg plane, of the one of more Bragg planes for redirecting a third portion, distinct from the first portion and the second portion, of the first light to the first direction.

9. The optical element of claim 6, wherein:
respective regions of the first layer of anisotropic material have cycloidal or helical patterns for redirecting light impinging on the respective regions to intersect at a common focal point.

10. The optical element of claim 9, wherein:
the first region and the second region are located at a first distance from a first axis passing through a geometric center of the optical element;
the first Bragg plane defined by the first region has a first angle relative to the first plane; and
the second Bragg plane defined by the second region has the first angle relative to the first plane.

11. The optical element of claim 9, wherein:
the first region is at a first distance from a first axis passing through a geometric center of the optical element and being perpendicular to the first plane, and the second region is at a second distance greater than the first distance from the first axis; and
the first Bragg plane defined by the first region has a first angle relative to the first plane; and
the second Bragg plane defined by the second region has a second angle, distinct from the first angle, relative to the first plane.

12. The optical element of claim 9, wherein:
the common focal point is located on a first axis passing through a geometric center of the optical element and being perpendicular to the first plane.

13. The optical element of claim 9, wherein:
the common focal point is located away from a first axis passing through a geometric center of the optical element and being perpendicular to the first plane.

14. The optical element of claim 9, wherein:
one or more regions, of the first layer of anisotropic material, having a first distance from a second axis perpendicular to the first plane have cycloidal or helical patterns for redirecting light impinging on the one or more regions having the first distance from the second axis to intersect at a first location on the second axis; and
one or more regions, of the first layer of anisotropic material, having a second distance, distinct from the first distance, from the second axis have cycloidal or helical patterns for redirecting light impinging on the one or more regions having the second distance from the second axis to intersect at a second location distinct from the first location on the second axis.

15. The optical element of claim 6, wherein:
the first layer of anisotropic material includes a plurality of regions with respective cycloidal or helical patterns, and cycloidal or helical patterns of respective regions change continuously from cycloidal or helical patterns of adjacent regions, for modifying a wavefront of the first light.

16. The optical element of claim 1, further including:
a second layer of anisotropic material extending along the first plane and optically coupled with the first layer of anisotropic material, the second layer of anisotropic material including cycloidal or helical patterns non-parallel and non-perpendicular to the first plane, wherein the cycloidal or helical patterns of the anisotropic material of the second layer of anisotropic material define one or more Bragg planes that that are either substantially parallel or substantially perpendicular to the one or more cycloidal or helical patterns of the second layer of anisotropic material.

17. The optical element of claim 16, wherein:
the first layer of anisotropic material is for redirecting light having a first wavelength range while transmitting light having a second wavelength range distinct from the first wavelength range; and
the second layer of anisotropic material is for redirecting the light having the second wavelength range while transmitting the light having the first wavelength range.

18. The optical element of claim 16, wherein:
the first layer of anisotropic material is for redirecting light having a first polarization while transmitting light having a second polarization that is distinct from the first polarization; and
the second layer of anisotropic material is for redirecting the light having the second polarization while transmitting the light having the first polarization.

19. The optical element of claim 1, wherein:
the first layer of anisotropic material includes a first portion and a second portion, distinct from and adjacent to, the first portion; and
the anisotropic material in the first portion and the anisotropic material in the second portion have a corresponding alignment pattern.

20. The optical element of claim 1, wherein:
the optical element is operable in a plurality of states, including a first state and a second state distinct from the first state;
the anisotropic material of the first layer has the cycloidal or helical patterns non-parallel and non-perpendicular to the first plane while the optical element is in the first state; and
the anisotropic material of the first layer does not have the cycloidal or helical patterns non-parallel and non-perpendicular to the first plane while the optical element is in the second state.

* * * * *